(12) United States Patent (10) Patent No.: US 8,314,760 B2
Sasabayashi et al. (45) Date of Patent: *Nov. 20, 2012

(54) LIQUID CRYSTAL DISPLAY AND METHOD OF MANUFACTURING THE SAME

(75) Inventors: Takashi Sasabayashi, Osaka (JP); Arihiro Takeda, Osaka (JP); Kazuya Ueda, Osaka (JP); Yoshio Koike, Osaka (JP); Hideaki Tsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

This patent is subject to a terminal disclaimer.

(21) Appl. No.: 12/827,030

(22) Filed: Jun. 30, 2010

(65) Prior Publication Data

US 2010/0265442 A1 Oct. 21, 2010

Related U.S. Application Data

(62) Division of application No. 11/299,799, filed on Dec. 12, 2005, now Pat. No. 7,859,500, which is a division of application No. 10/796,783, filed on Mar. 9, 2004, now Pat. No. 7,262,824.

(30) Foreign Application Priority Data

| Mar. 18, 2003 | (JP) | 2003-073553 |
| Mar. 31, 2003 | (JP) | 2003-095319 |
| Mar. 31, 2003 | (JP) | 2003-096779 |
| Feb. 24, 2004 | (JP) | 2004-048296 |

(51) Int. Cl.
*G09G 3/36* (2006.01)

(52) U.S. Cl. ............. 345/87; 345/89; 345/95; 345/204; 345/690; 349/42; 349/141

(58) Field of Classification Search ............ 345/87–100, 345/204, 690; 349/129–144, 42, 43, 152
See application file for complete search history.

(56) References Cited

U.S. PATENT DOCUMENTS

| 4,840,460 A | 6/1989 | Bernot et al. |
| 5,204,659 A | 4/1993 | Sarma |
| 5,319,480 A | 6/1994 | McCartney |
| 5,321,535 A | 6/1994 | Ukai et al. |

(Continued)

FOREIGN PATENT DOCUMENTS

EP 0 884 626 12/1998

(Continued)

*Primary Examiner* — Quan-Zhen Wang
*Assistant Examiner* — Jennifer Nguyen
(74) *Attorney, Agent, or Firm* — Greer, Burns & Crain, Ltd.

(57) ABSTRACT

A liquid crystal display including a pair of substrates; a liquid crystal sealed between the substrates; alignment regulating structures formed on at least one of the substrates; and a plurality of pixel regions having both of a first area in which the alignment regulating structures are disposed at first intervals and which has a first threshold voltage for driving of the liquid crystal and a second area in which the alignment regulating structures are disposed at second intervals smaller than the first intervals and which has a second threshold voltage lower than the first threshold voltage. Each of the first intervals is a distance between adjacent alignment regulating structures along a direction parallel to one of the substrates in the first area and each of the second intervals is a distance between adjacent alignment regulating structures along a direction parallel to one of the substrates in the second area.

20 Claims, 57 Drawing Sheets

U.S. PATENT DOCUMENTS

| | | | |
|---|---|---|---|
| 5,473,455 A * | 12/1995 | Koike et al. | 349/124 |
| 5,477,351 A | 12/1995 | Takahara et al. | |
| 5,519,519 A | 5/1996 | Nakajima et al. | |
| 5,559,615 A | 9/1996 | Takei et al. | |
| 5,897,187 A * | 4/1999 | Aoki et al. | 349/144 |
| 5,923,311 A | 7/1999 | Edwards | |
| 5,969,781 A * | 10/1999 | Matsuyama et al. | 349/130 |
| 6,081,315 A | 6/2000 | Matsuyama et al. | |
| 6,306,469 B1 | 10/2001 | Serbutoviez et al. | |
| RE37,591 E | 3/2002 | Shimada et al. | |
| 6,507,381 B1 | 1/2003 | Katsuya et al. | |
| 6,633,356 B1 | 10/2003 | Kataoka et al. | |
| 6,710,827 B2 | 3/2004 | Kubo et al. | |
| 6,781,665 B2 | 8/2004 | Nakanishi et al. | |
| 6,856,373 B2 | 2/2005 | Sekido et al. | |
| 7,262,824 B2 * | 8/2007 | Sasabayashi et al. | 349/129 |
| 7,286,200 B2 * | 10/2007 | Inoue et al. | 349/144 |
| 7,289,178 B2 | 10/2007 | Sasabayashi et al. | |
| 7,511,789 B2 * | 3/2009 | Inoue et al. | 349/129 |
| 2001/0020992 A1 | 9/2001 | Takeda et al. | |
| 2001/0030726 A1 | 10/2001 | Yoshida et al. | |
| 2002/0050966 A1 | 5/2002 | Asao et al. | |
| 2003/0048401 A1 | 3/2003 | Hanaoka et al. | |
| 2003/0058374 A1 * | 3/2003 | Takeda et al. | 349/33 |
| 2003/0095229 A1 | 5/2003 | Inoue et al. | |
| 2003/0160750 A1 | 8/2003 | Ueda et al. | |
| 2006/0097972 A1 | 5/2006 | Takeuchi et al. | |

FOREIGN PATENT DOCUMENTS

| | | |
|---|---|---|
| JP | 11-242225 | 9/1999 |
| JP | 11-326927 | 11/1999 |
| JP | 2000-356773 | 12/2000 |
| JP | 2002-229518 | 8/2002 |
| JP | 2002-357830 | 12/2002 |
| JP | 2003-177408 | 6/2003 |
| JP | 2003-255305 | 9/2003 |
| JP | 2003-287755 | 10/2003 |
| KR | 2000-0028957 | 5/2000 |

* cited by examiner

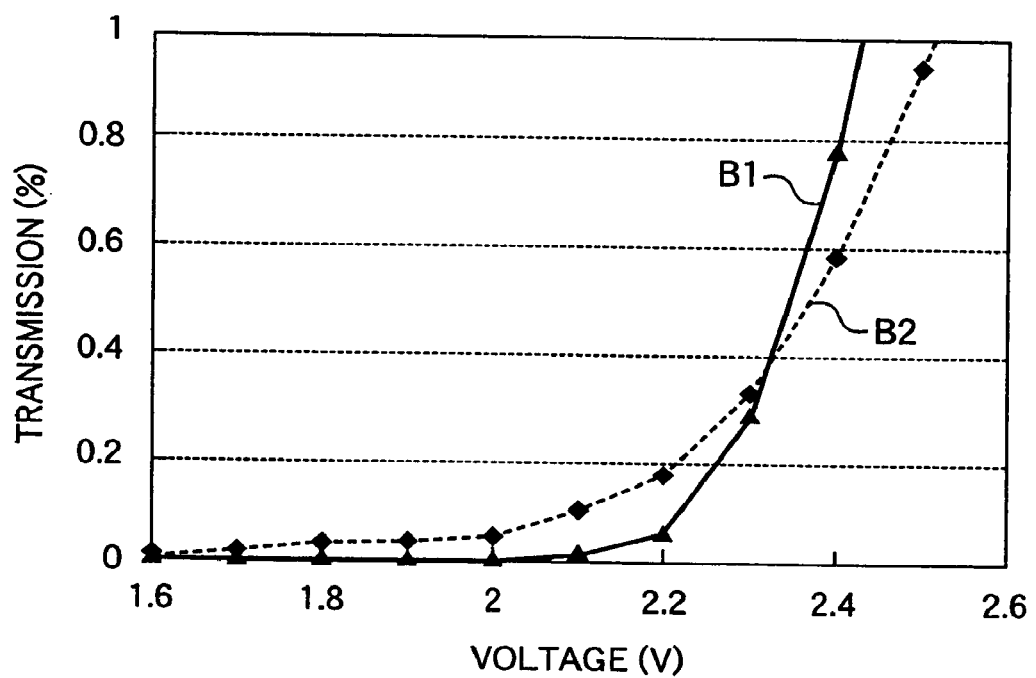

ONE PIXEL

ONE PIXEL

FIG.37
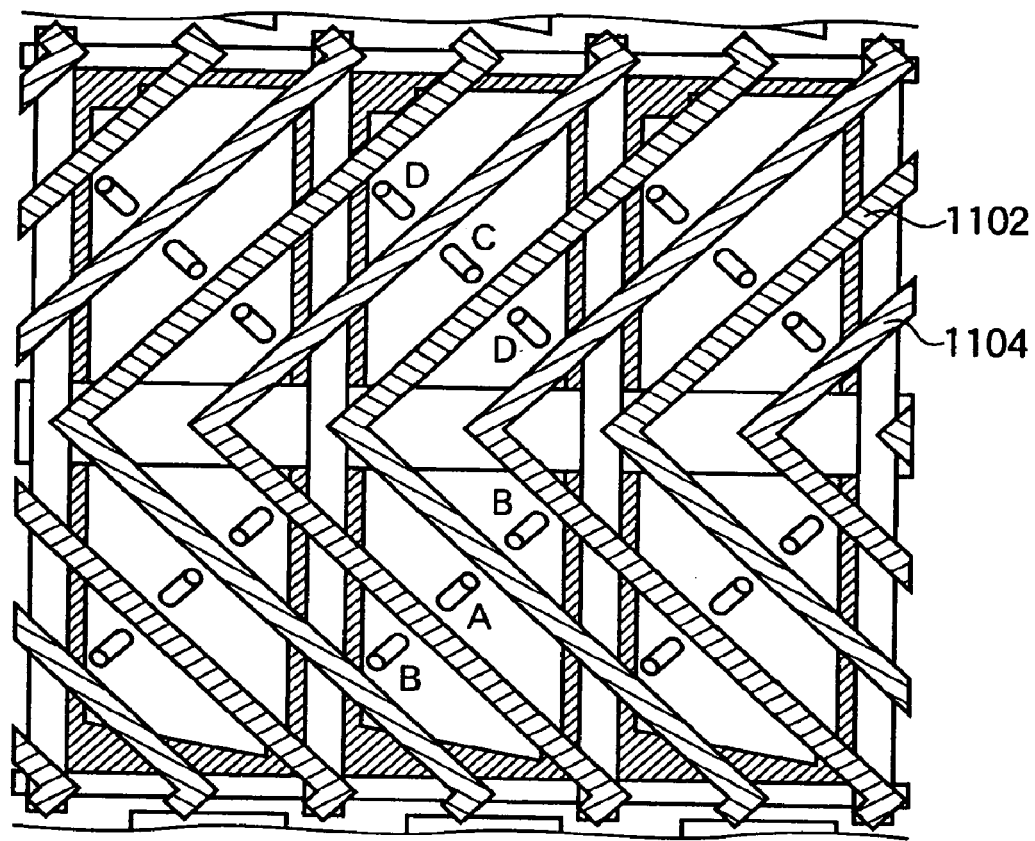
DOMAIN DIRECTION

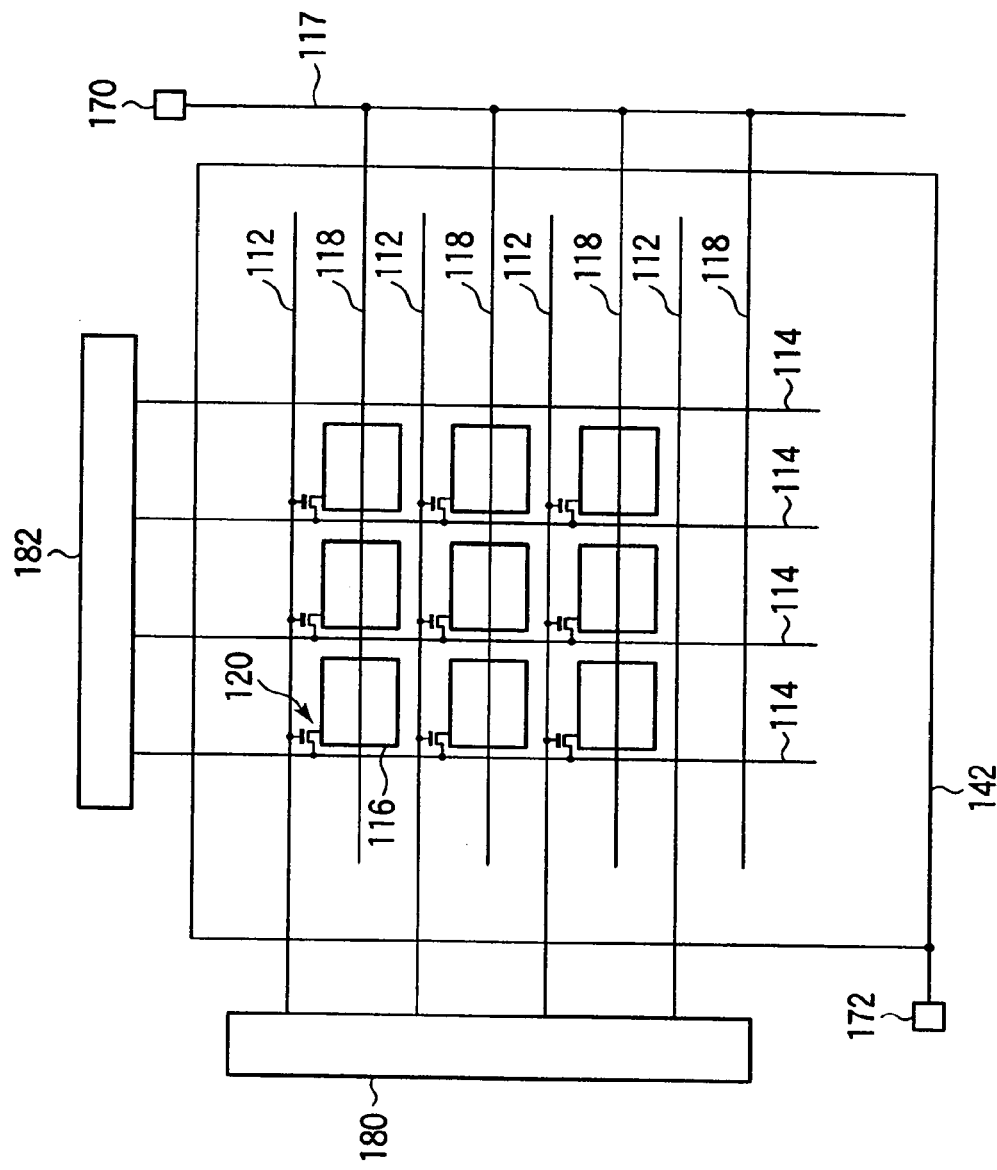

FIG.69A
FIG.69B
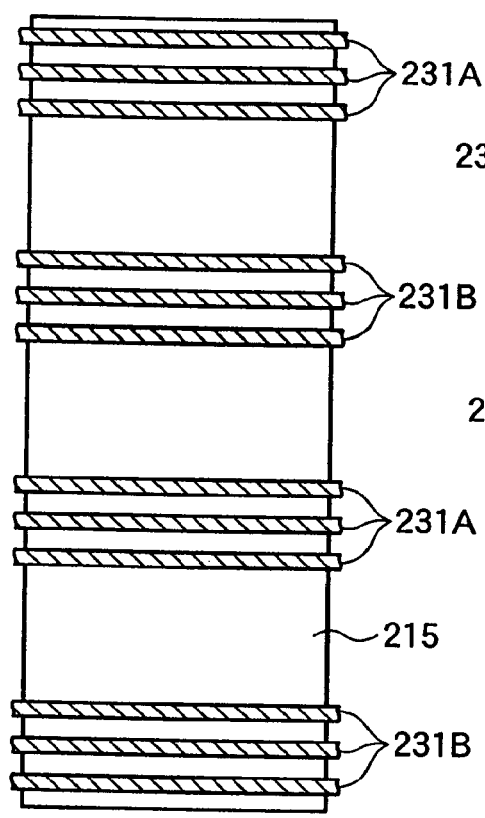
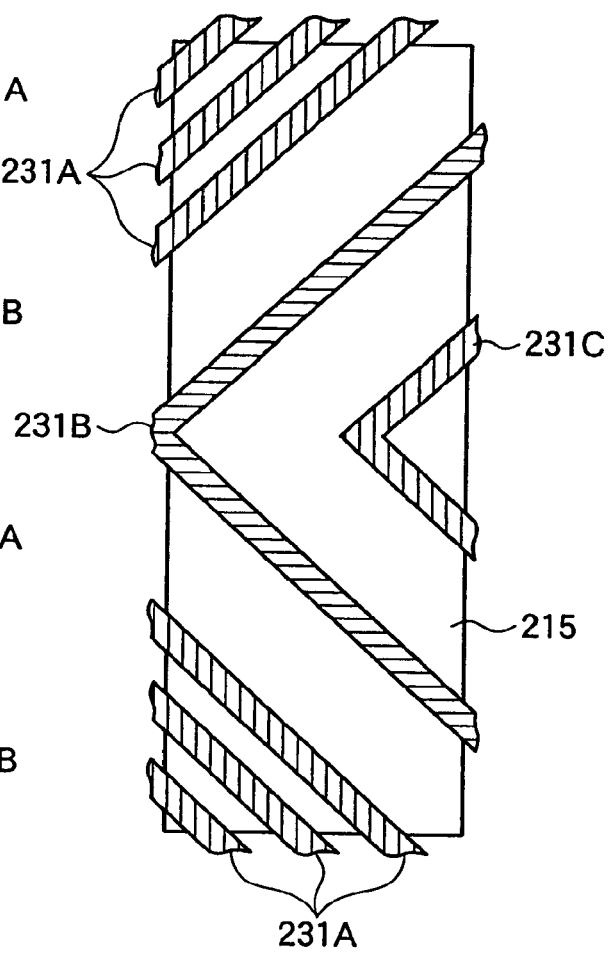

LIQUID CRYSTAL DISPLAY AND METHOD OF MANUFACTURING THE SAME

This is a divisional of application Ser. No. 11/299,799, filed Dec. 12, 2005, which is a divisional of application Ser. No. 10/796,783, filed Mar. 9, 2004, which is now U.S. Pat. No. 7,262,824, which issued on Aug. 28, 2007.

BACKGROUND OF THE INVENTION

1. Field of the Invention

The present invention relates to a liquid crystal display used as a display section of an electronic apparatus and a method of manufacturing the same, and more particularly to an MVA type liquid crystal display having high viewing angle characteristics and a method of manufacturing the same.

2. Description of the Related Art

Recently, liquid crystal displays are widely used in various applications taking advantage of their features such as low profiles and light weights, low-voltage drivability and low power consumption. Further, some liquid crystal displays are available with display characteristics comparable to those of CRTs and are therefore being put in use as monitors and television receivers for which CRTs have been dominantly used.

Among liquid crystal displays that are currently in practical use, MVA (Multi-domain Vertical Alignment) displays are one of types which exhibit high display characteristics comparable to those of CRTs. In an MVA type liquid crystal display (hereinafter referred to as "MVA-LCD"), liquid crystal molecules are aligned substantially perpendicularly to a substrate surface when no voltage is applied. When a voltage is applied, the liquid crystal molecules are aligned in a predetermined direction that is regulated by alignment regulating structures formed on a substrate surface. Alignment regulating structures include protrusions, recesses, and blanks (slits) in an electrode.

FIG. 37 shows a configuration of three pixels of a common MVA-LCD. As shown in FIG. 37, linear protrusions 1102 and 1104 in a zigzag configuration constituted by dielectric bodies are formed on a pair of substrates provided opposite to each other, respectively. The linear protrusions 1102 formed on one of the substrates and the linear protrusions 1104 formed on the other substrate are disposed alternately. Thus, liquid crystal molecules are tilted in a different direction in each of regions A, B, C and D. Liquid crystal molecules in one pixel are tilted in four directions in the regions A, B, C and D, respectively, each of the directions being at a differential angle of about 90°. Thus, four domains of alignment are obtained.

Patent Document 1: JP-A-2000-356773
Patent Document 2: JP-A-2002-357830
Patent Document 3: Japanese Patent No. 2947350
Patent Document 4: JP-A-H11-242225

FIG. 38A is a graph showing transmittance-voltage characteristics (T-V characteristics) of the MVA-LCD shown in FIG. 37. The abscissa axis represents voltages (V) applied to the liquid crystal, and the ordinate axis represents transmittances (%) of light. The line X1 in the graph indicates T-V characteristics in a direction perpendicular to the display screen (hereinafter referred to as "square direction"), and the line X2 indicates T-V characteristics in an upward direction at a polar angle of 60° to the display screen (hereinafter referred to as "oblique direction"). A polar angle is an angle to a line perpendicular to the display screen. The display mode of the MVA-LCD is the normally black mode in which a voltage (absolute value) applied to the liquid crystal is decreased to display black and increased to display white. As shown in FIG. 38A, when voltages (in the range from about 2.2 to 2.9 V) in the neighborhood of a region where a threshold voltage is exceeded are applied, transmittances in the oblique direction are higher than those in the square direction.

FIG. 38B is an enlarged view of the neighborhood of the threshold voltage in the graph shown in FIG. 38A. As shown in FIG. 38B, for example, when a voltage (about 2.3 V) which provides a transmittance of 0.2% in the square direction is applied, transmittance in the oblique direction increases to about 2.5% as indicated by the arrow in the figure. In particular, when a voltage slightly in the excess of the threshold voltage is applied, since the value of the resultant transmittance itself is small, transmittance in the oblique direction increases significantly relative to transmittance in the square direction. This results in a problem in that an image displayed in halftones appears whitish in the oblique direction because of degradation of gradation/viewing angle characteristics. It is desired to mitigate this phenomenon because it can reduce display quality of an MVA-LCD.

SUMMARY OF THE INVENTION

It is an object of the invention to provide a liquid crystal display which can achieve high viewing angle characteristics and a method of manufacturing the same.

The above object is achieved by a liquid crystal display characterized in that it has a pair of substrates provided opposite to each other, a liquid crystal sealed between the pair of substrates, alignment regulating structures formed on at least either of the pair of substrates for regulating the alignment of the liquid crystal, and a plurality of pixel regions having both of a first area in which the alignment regulating structures are disposed at first intervals and which has a first threshold voltage for driving of the liquid crystal and a second area in which the alignment regulating structures are disposed at second intervals smaller than the first intervals and which has a second threshold voltage lower than the first threshold voltage.

As described above, the invention makes it possible to provide a liquid crystal display which can achieve high viewing angle characteristics.

BRIEF DESCRIPTION OF THE DRAWINGS

FIG. 4 is a graph showing T-V characteristics of the MVA-LCD;

FIG. 37 shows a configuration of a liquid crystal display according to the related art;

FIG. 39 schematically shows a configuration of a liquid crystal display which constitutes a base of a fourth mode for carrying out the invention;

FIGS. 69A and 69B show configurations and patterns of the protrusions of Embodiment 6-1 in the sixth mode for carrying out the invention;

DETAILED DESCRIPTION OF THE PREFERRED EMBODIMENTS (First Mode for Carrying Out the Invention)

Figure 1A:
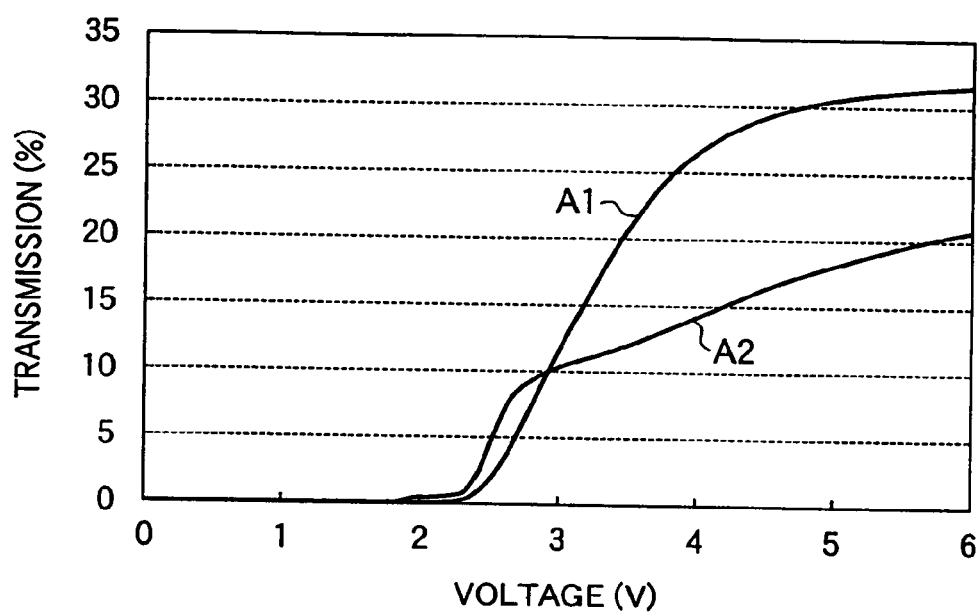
FIGS. 1A and 1B are graphs showing T-V characteristics of a liquid crystal display in a first mode for carrying out the invention.
Figure 1B:
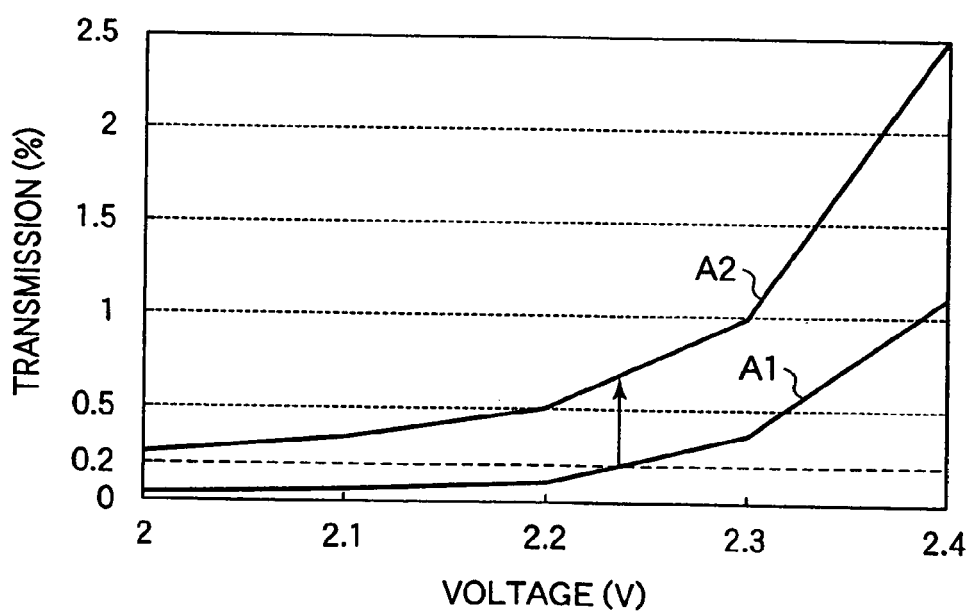
Figure 38A:
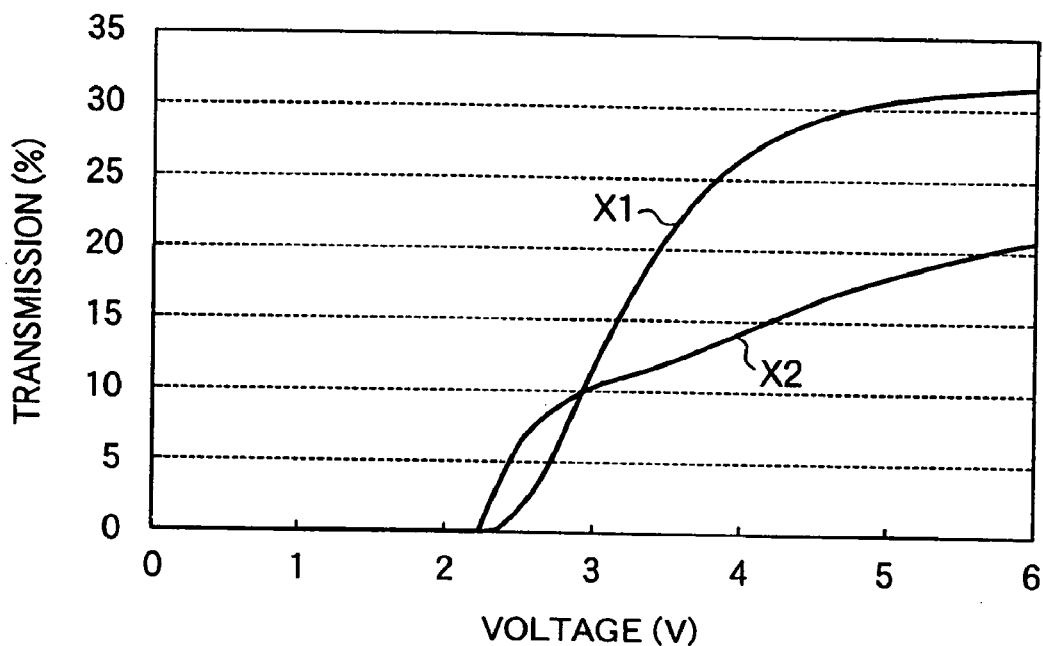
FIGS. 38A and 38B are graphs showing T-V characteristics of the liquid crystal display according to the related art.
Figure 38B:
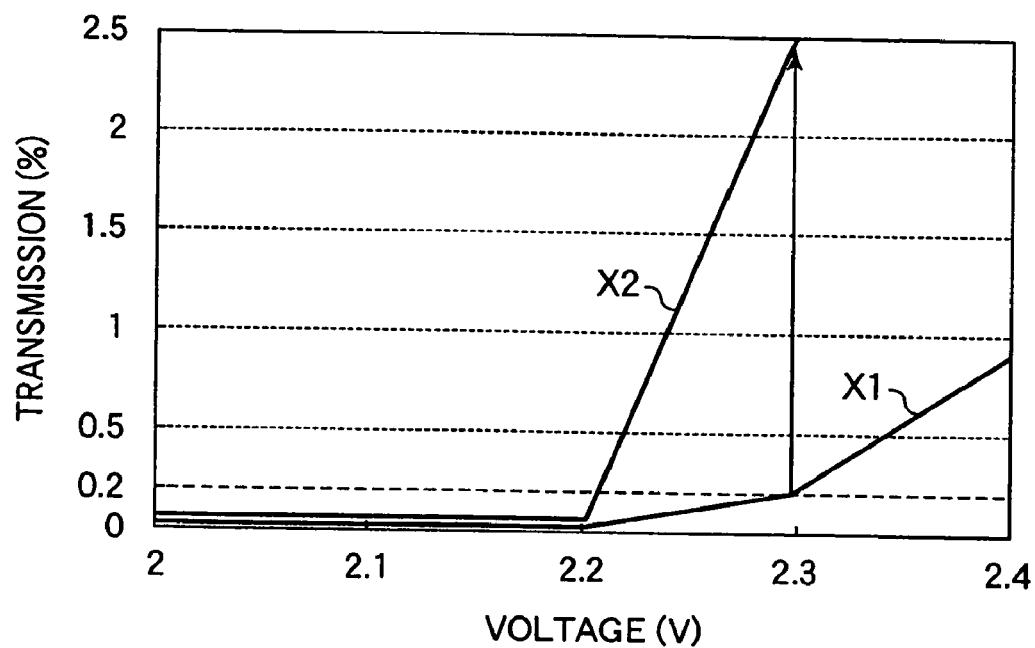

A liquid crystal display in a first mode for carrying out the invention will be described with reference to FIGS. 1A to 10. First, a technique which constitutes the basis of the present mode for carrying out the invention will be described. One method for solving the problem that a displayed image appears whitish in an oblique direction is a technique in which both of areas having different threshold voltages are provided in one pixel. For example, an area having a threshold voltage (about 2.2 V) as shown in FIGS. 38A and 38B and an area having a threshold voltage lower than the same are both provided in one pixel. FIG. 1A is a graph showing T-V characteristics of an MVA-LCD utilizing the above-described technique. FIG. 1B is an enlarged view of the neighborhood of a threshold voltage in the graph shown in FIG. 1A. The abscissa axis represents voltages (V) applied to the liquid crystal, and the ordinate axis represents light transmittances (%). The line A1 in the graph indicates T-V characteristics in a square direction and, the line A2 indicates T-V characteristics in an oblique direction.

As shown in FIGS. 1A and 1B, when a voltage that provides a transmittance of 0.2% in the square direction is applied, the transmittance in the oblique direction increases to about 0.7% as indicated by the arrow in FIG. 1B. The transmittance in the oblique direction can be suppressed to one-thirds or less of that of the MVA LCD according to the related art shown in FIGS. 38A and 38B, which is a significant improvement in display quality. This technique makes it possible to suppress the increase in transmittance in the oblique direction relative to transmittance in the square direction, thereby improving display quality significantly. The provision of an area having a low threshold voltage in addition to an area having a normal threshold voltage is advantages also in suppressing any increase in a driving voltage of a liquid crystal.

Figure 2:
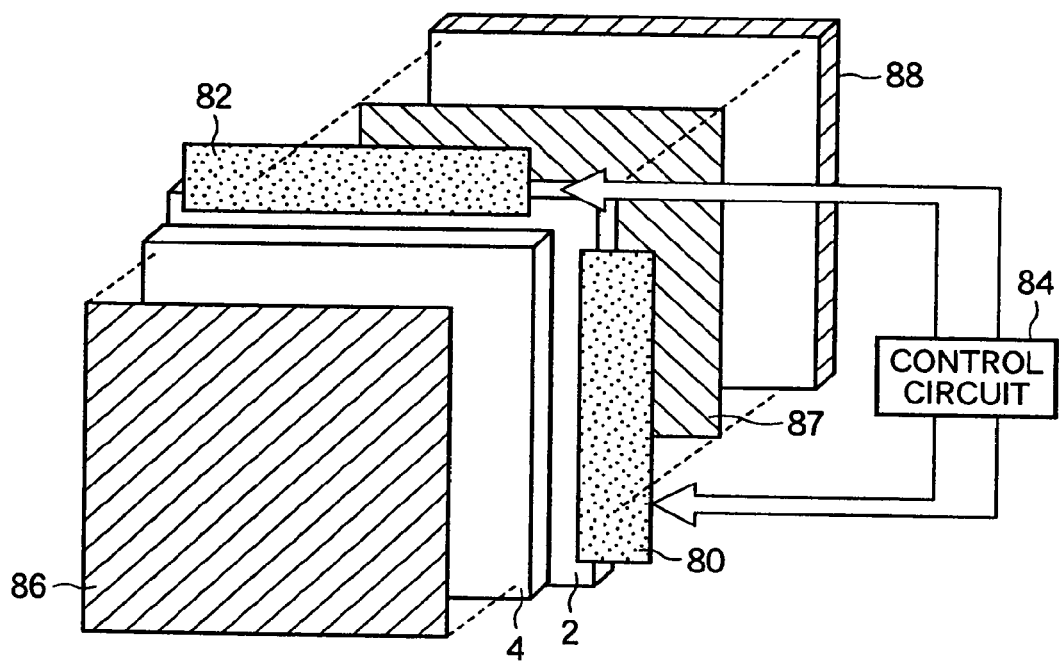
FIG. 2 shows a schematic configuration of the liquid crystal display in the first mode for carrying out the invention.

The liquid crystal display in the present mode for carrying out the invention will now be described. FIG. 2 shows a schematic configuration of the liquid crystal display in the present mode for carrying out the invention. As shown in FIG. 2, the liquid crystal display has gate bus lines and data bus lines formed such that they intersect each other with an insulation film interposed between them and a TFT substrate 2 having a TFT and a pixel electrode formed at each pixel. The liquid crystal display also has an opposite substrate 4 having a common electrode formed thereon and a liquid crystal (not shown) sealed between the substrates 2 and 4.

A gate bus line driving circuit 80 loaded with a driver IC for driving the plurality of gate bus lines and a data bus line driving circuit 82 loaded with a driver IC for driving the plurality of data bus lines are provided on the TFT substrate 2. The driving circuits 80 and 82 output scan signals and data signals to predetermined gate bus lines and data bus lines based on predetermined signals output by a control circuit 84. A polarizer 86 is provided on a surface of the TFT substrate 2 opposite to the surface where the elements are formed, and a backlight unit 88 is attached to a surface of the polarizer 86 opposite to the TFT substrate 2. A polarizer 87 in a crossed Nicols relationship with the polarizer 86 is attached to a surface of the opposite substrate 4 opposite to the surface on which the common electrode is formed.

Figure 3:
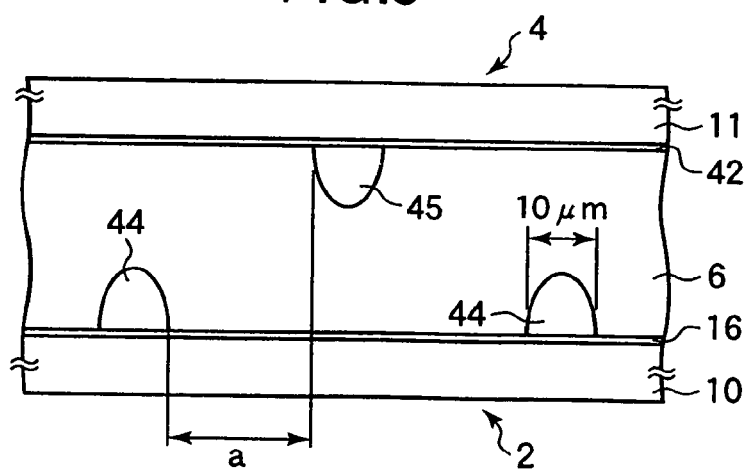
FIG. 3 is a sectional view showing a configuration of an MVA-LCD.

In order to decrease a threshold voltage of the MVA-LCD, it is effective to make intervals between alignment regulating structures smaller. FIG. 3 shows a schematic sectional configuration of the MVA-LCD. As shown in FIG. 3, the TFT substrate 2 has a pixel electrode 16 formed at each pixel region on a glass substrate 10. A plurality of linear protrusions 44 which are alignment regulating structures for regulating the alignment of the liquid crystal are formed in parallel with each other on the pixel electrode 16. On the contrary, the opposite substrate 4 has a common electrode 42 which is formed substantially on an entire surface of a glass substrate 11. A plurality of linear protrusions 45 are formed in parallel with each other on the common electrode 42. The protrusions 44 and 45 are alternately arranged when viewed in a direction perpendicular to the surfaces of the substrates. In a common MVA-LCD, the width of the protrusions 44 and 45 is, for example, 10 µm, and intervals a between edges of the protrusions 44 and respective edges of the protrusions 45 are, for example, 25 µm.

FIG. 4 is a graph showing T-V characteristics of the MVA LCD. The line B1 in the graph indicates T-V characteristics achieved when the intervals a between the protrusions 44 and 45 are 25 µm, and the line B2 indicates T-V characteristics achieved when the intervals a are 7.5 µm. As shown in FIG. 4, whereas the threshold voltage is about 2.1 V when the intervals a are 25 µm, the threshold voltage is about 1.7 V when the intervals a are 7.5 µm. Thus, the threshold voltage can be lower, the smaller the intervals a between the protrusions 44 and 45. That is, both of areas having different threshold voltages can be provided in one pixel by forming areas having different intervals a in the single pixel.

When a threshold voltage difference between the areas having different threshold voltages is 0.3 V or more, the effect of the invention of improving viewing angle characteristics can be achieved. Preferably, a significant effect is achieved at a threshold voltage difference of 0.5 V or more, and a very significant improvement is achieved at a difference of 0.7 V or more.

FIGS. 5A to 5F show examples of patterns of disposition of alignment regulating structures in the area in which the intervals a are small and in which the threshold voltage is low. In the example shown in FIG. 5A, grid-like protrusions 44 are formed on the TFT substrate 2, and grid-like protrusions 45 are formed on the opposite substrate 4 with an offset from the protrusions 44 by half a pitch.

Figure 5A:
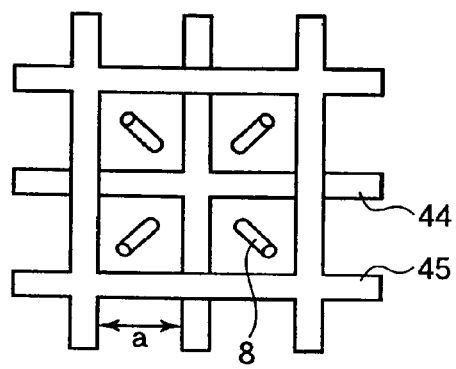
FIGS. 5A to 5F show examples of patterns in which alignment regulating structures are disposed.
Figure 5B:
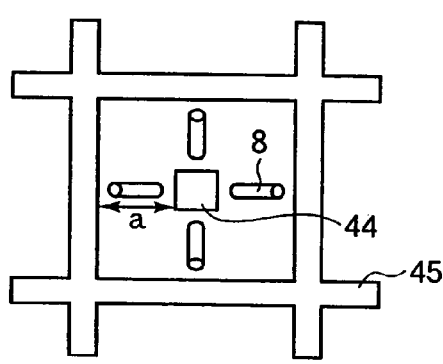

In the example shown in FIG. 5B, a point-like protrusion 44 is formed on the TFT substrate 2. Grid-like protrusions 45 are formed on the opposite substrate 4. The point-like protrusion 44 is disposed substantially in the middle of a gap between the grid-like protrusions 45.

Figure 5C:
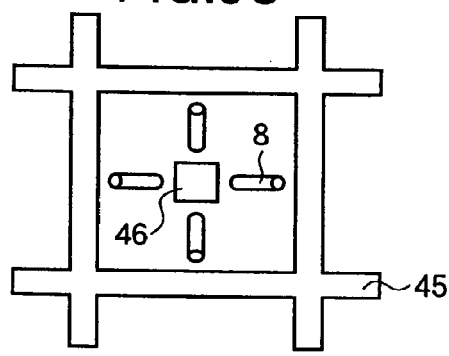

In the example shown in FIG. 5C, a point-like electrode blank (slit) 46 is formed on the TFT substrate 2 instead of the protrusion 44 shown in FIG. 5B.

Figure 5D:
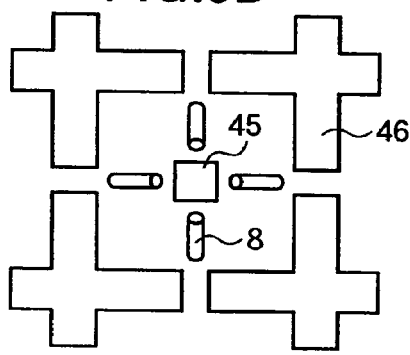

In the example shown in FIG. 5D, grid-like slits 46 are formed on the TFT substrate 2. A point-like protrusion 45 is formed on the opposite substrate 4. The point like protrusion 45 is disposed substantially in the middle of a gap between the grid-like slits 46 (that is, a region where an electrode is formed).

Figure 5E:
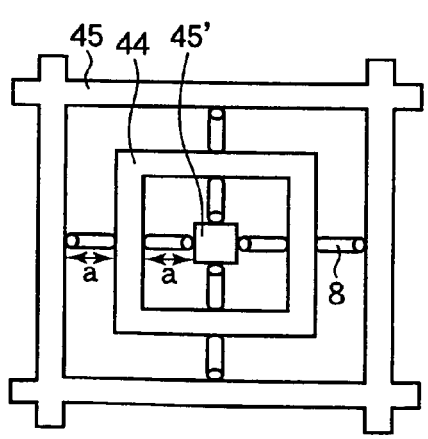

In the example shown in FIG. 5E, the opposite substrate 4 is formed with grid-like protrusions 45 and a point-like protrusion 45' disposed substantially in the middle of a gap between the protrusions 45. A frame-like protrusion 44 is formed between the protrusions 45 and 45' on the TFT substrate 2.

Figure 5F:
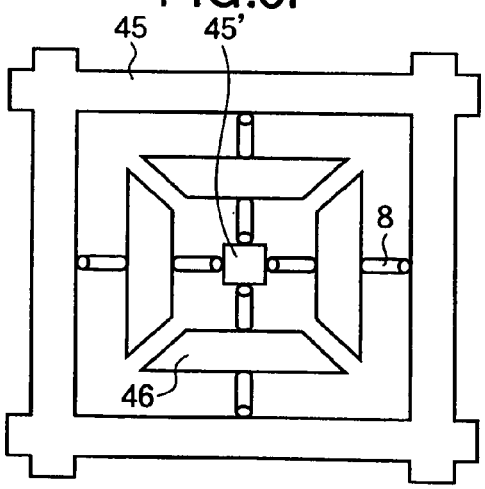

In the example shown in FIG. 5F, frame-like slits 46 are formed on the TFT substrate 2 instead of the protrusion 44 shown in FIG. 5E.

In the configurations shown in FIGS. 5A to 5F, liquid crystal molecules 8 are radially tilted in four directions each of which is at a differential angle of about 90°. The intervals a of alignment regulating structures are desirably 15 µm or less in an area having small intervals a and a low threshold voltage in a pixel region. Intervals a of 15 µm or less result in a significant effect of improving viewing angle characteristics because they provide a significant effect of decreasing the threshold voltage of the liquid crystal. The invention is not limited to those patterns of disposition of alignment regulating structures.

Figure 6:
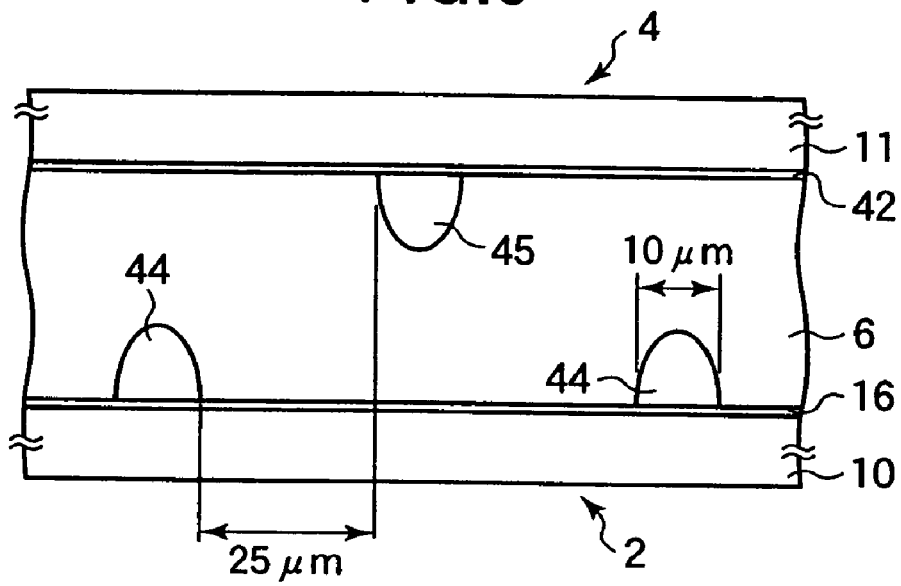
FIG. 6 is a sectional view showing disposition of protrusions in a pixel.

FIG. 6 is a sectional view showing disposition of protrusions in a pixel. As shown in FIG. 6, linear protrusions 44 and 45 formed in parallel with each other are disposed at intervals of 25 µm.

Figure 7:
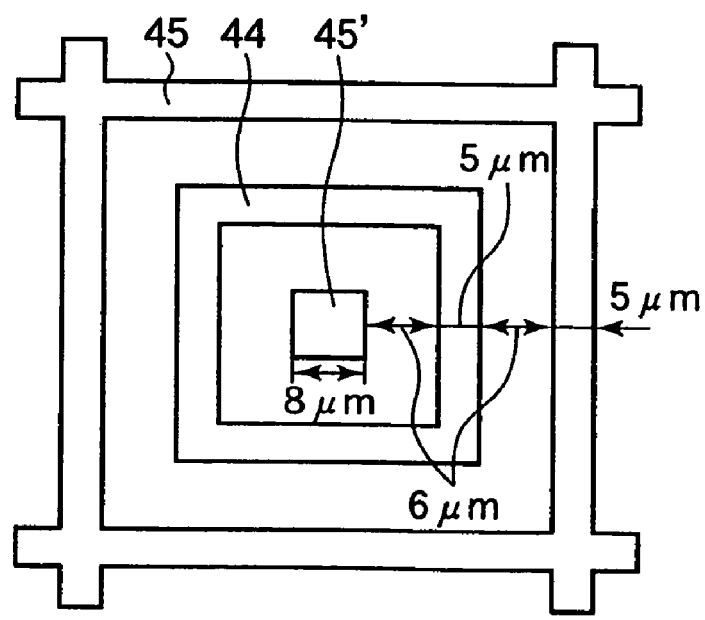
FIG. 7 shows disposition of protrusions in a pixel as viewed in a direction perpendicular to substrate surfaces.

FIG. 7 shows disposition of protrusions formed in a pattern different from that of the protrusions shown in FIG. 6, the disposition being shown in a direction perpendicular to substrate surfaces. As shown in FIG. 7, grid-like protrusions 45 having a width 5 µm and a substantially square protrusion 45' having a width of 8 µm are formed on the opposite substrate 4. A frame-like protrusion 44 having a width of 5 µm is formed on the TFT substrate 2. The intervals between the protrusions 44 and 45' and the intervals between the protrusions 44 and 45 are both 6 µm and are smaller than the intervals of 25 µm between the protrusions 44 and 45 shown in FIG. 6.

Figure 8:
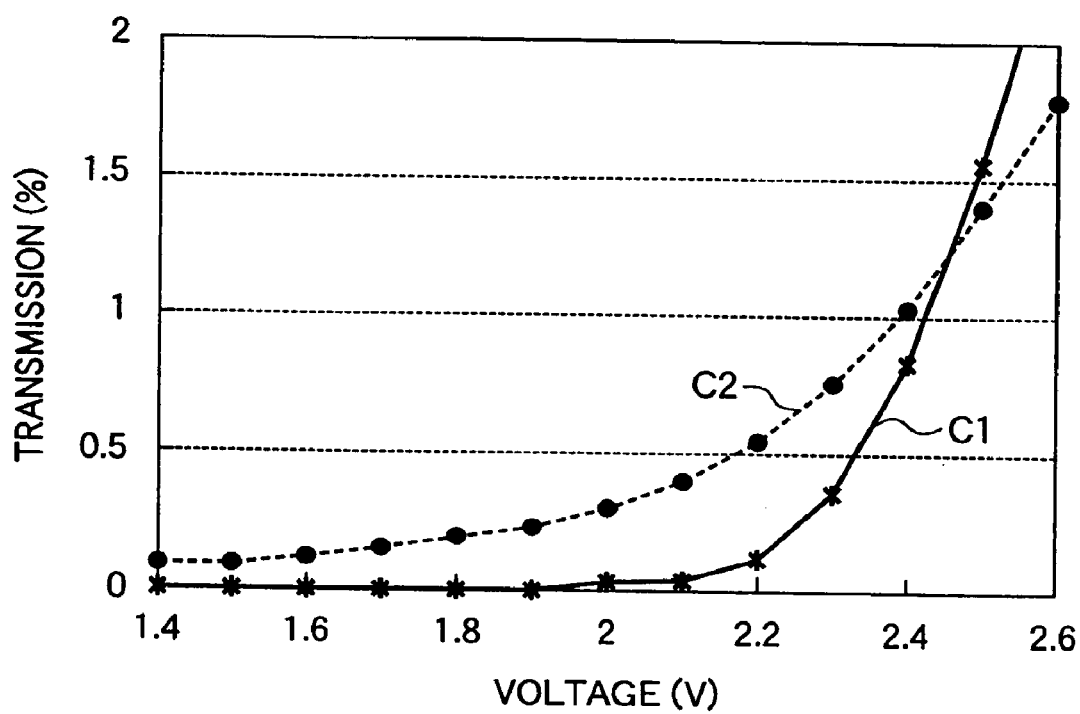
FIG. 8 is a graph showing a comparison between T-V characteristics achieved with the configuration shown in FIG. 6 and T-V characteristics achieved with the configuration shown in FIG. 7.

FIG. 8 is a graph showing a comparison between T-V characteristics achieved with the configuration shown in FIG. 6 and T-V characteristics achieved with the configuration shown in FIG. 7. The line C1 in the graph indicates the T-V characteristics achieved with the configuration shown in FIG. 6, and the line C2 indicates the T-V characteristics achieved with the configuration shown in FIG. 7. As shown in FIG. 8, in the configuration shown in FIG. 7 in which protrusions are disposed at smaller intervals, the threshold voltage is lower than that in the configuration shown in FIG. 6. Therefore, when both of the configurations shown in FIGS. 6 and 7 are provided in one pixel, areas having different threshold voltages can be formed in the single pixel. Since the difference between the threshold voltages is 0.7 V or more, the viewing angle characteristics of the MVA-LCD can be significantly improved in the present mode for carrying out the invention.

<Embodiment 1-1>

Figure 9:
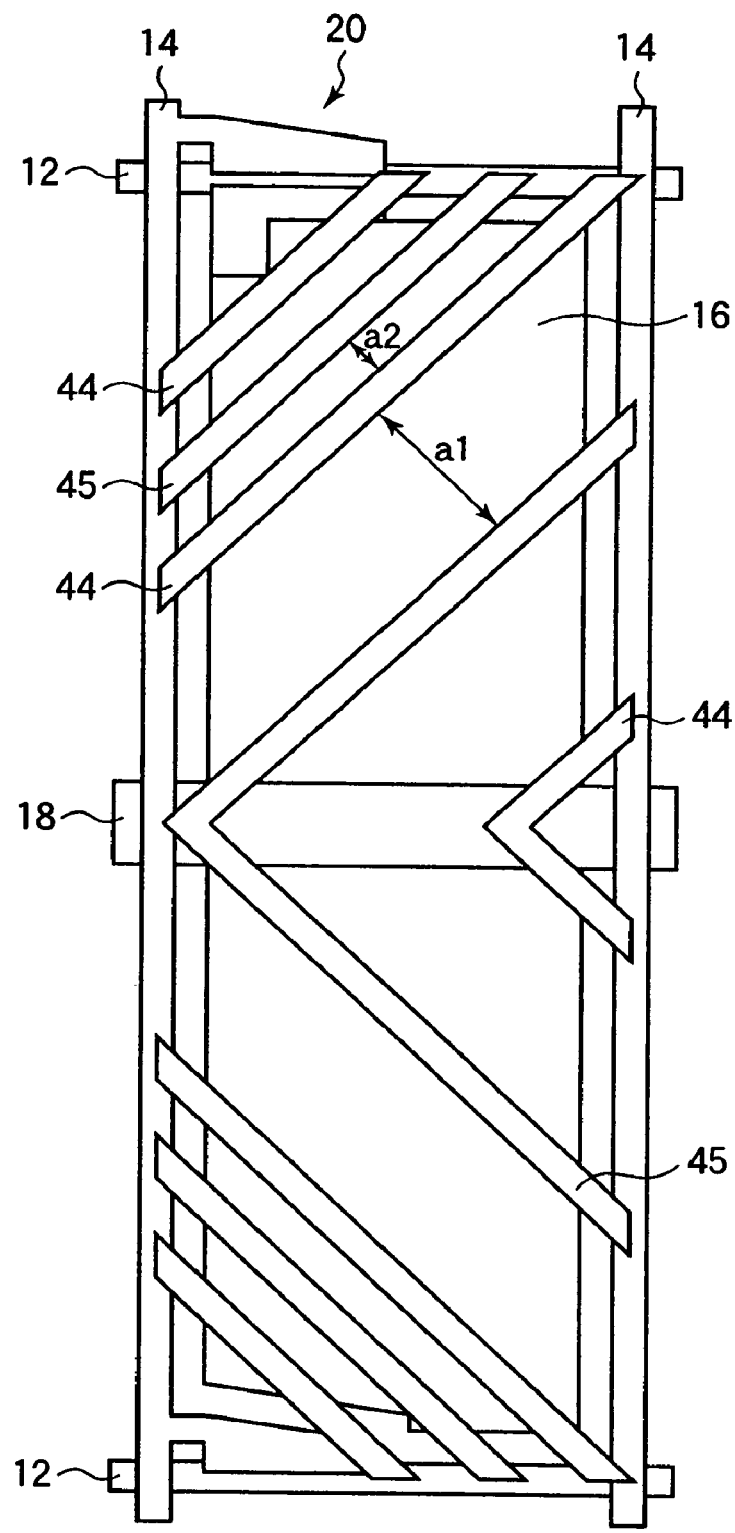
FIG. 9 shows a configuration of a liquid crystal display according to Embodiment 1-1 in the first mode for carrying out the invention.

A liquid crystal display according to Embodiment 1-1 in the present mode for carrying out the invention will be described with reference to FIGS. 9 and 10. FIG. 9 shows the disposition of alignment regulating structures in one pixel of the liquid crystal display of the present embodiment. As shown in FIG. 9, a plurality of gate bus lines 12 (two of which are shown in FIG. 9) extending in the horizontal direction in the figure are formed at intervals of, for example, 300 µm on a TFT substrate 2 of the liquid crystal display. A plurality of drain bus lines 14 (two of which are shown in FIG. 9) extending in the vertical direction in the figure are formed at intervals of, for example, 100 µm such that they intersect the gate bus lines 12 with an insulation film (not shown) interposed between them. A TFT 20 is formed in the vicinity of each of intersections between the gate bus lines 12 and the drain bus lines 14. Storage capacitor bus lines 18 are formed such that they extend across rectangular pixel regions defined by the gate bus lines 12 and the drain bus lines 14 substantially in the middle of the regions. A pixel electrode 16 is formed at each of the pixel regions.

Linear protrusions 44 extending diagonally relative to edges of the pixel regions are formed on the TFT substrate 2. The protrusions 44 are formed by applying a resist on the entire surface of the substrate to form a resist layer and by patterning the resist layer using a photolithographic process.

A color filter resin layer and a common electrode are formed on an opposite substrate 4 which is provided opposite to the TFT substrate 2. Protrusions 45 are formed on the opposite substrate 4, the protrusions 45 being disposed in parallel with the protrusions 44 and with an offset from the same by half a pitch. The protrusions 45 are formed by applying a resist on the entire surface of the substrate to form a resist layer and by patterning the resist layer using a photolithographic process.

Intervals a2 between the protrusions 44 and 45 in top left and bottom left areas of the pixel region are smaller than intervals a1 between the protrusions 44 and 45 in the rest of the pixel region. Thus, areas having different threshold voltages are both present in one pixel.

Although not shown, vertical alignment films are formed on surfaces of the substrate 2 and 4 opposite to each other. A nematic liquid crystal having negative dielectric anisotropy is sealed between the substrates 2 and 4 which are combined together with spacers interposed between them. Polarizers are respectively applied to surfaces of the substrates 2 and 4 constituting the exterior of the panel, the polarizers being disposed such that their absorption axes are orthogonal to each other.

<Embodiment>1-2

Figure 10:
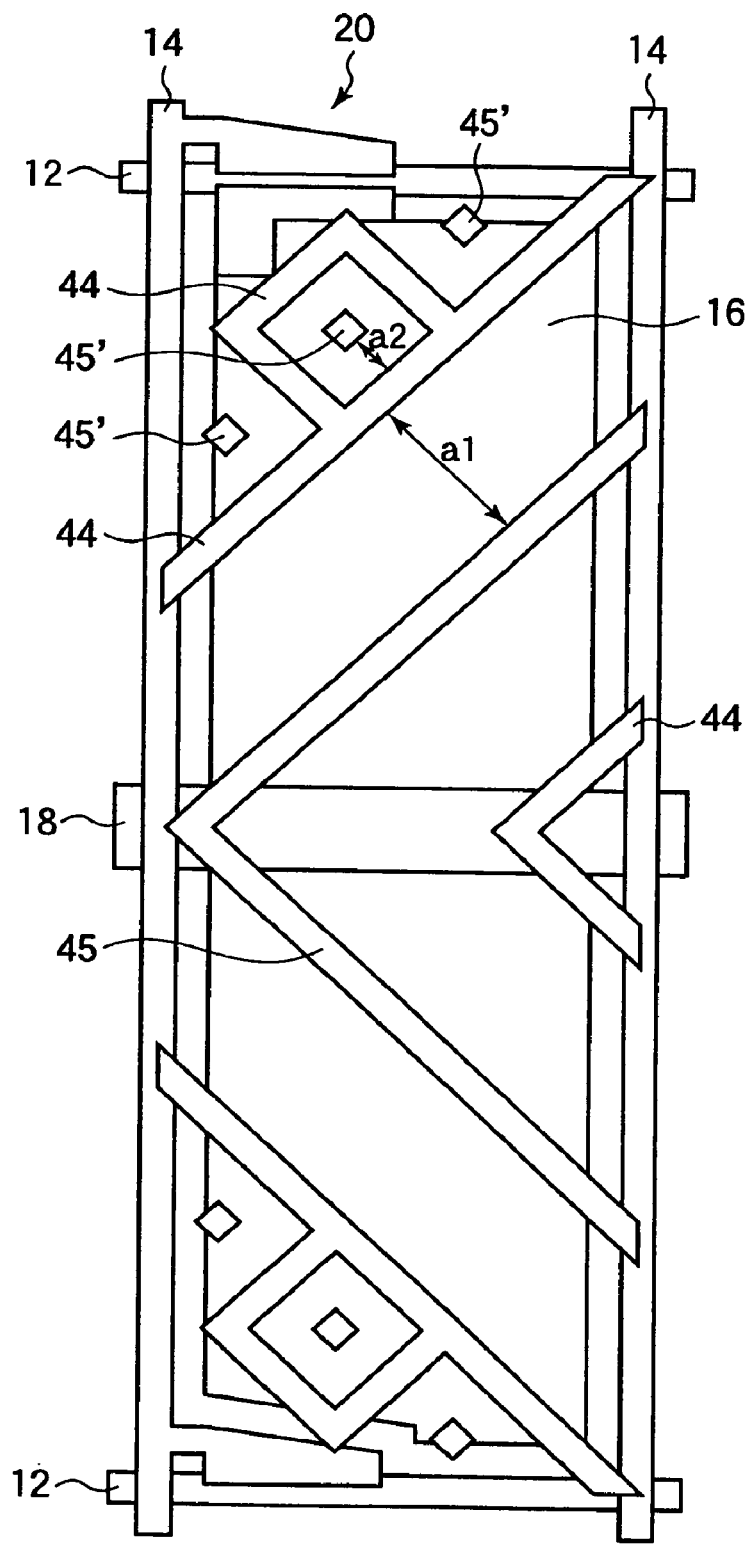
FIG. 10 shows a configuration of a liquid crystal display according to Embodiment 1-2 in the first mode for carrying out the invention.

FIG. 10 shows Embodiment 1-2 of a liquid crystal display in the present mode for carrying out the invention. As shown in FIG. 10, a point-like protrusion 45' and a frame-like protrusion 44 disposed to surround the protrusion 45' are formed in each of top left and bottom left areas of a pixel region. Intervals a2 between the protrusions 44 and 45' in those areas are smaller than intervals a1 between the protrusions 44 and 45 in the rest of the pixel region. Thus, areas having different threshold voltages are both present in one pixel.

<Embodiment 1-3>

Figure 11:
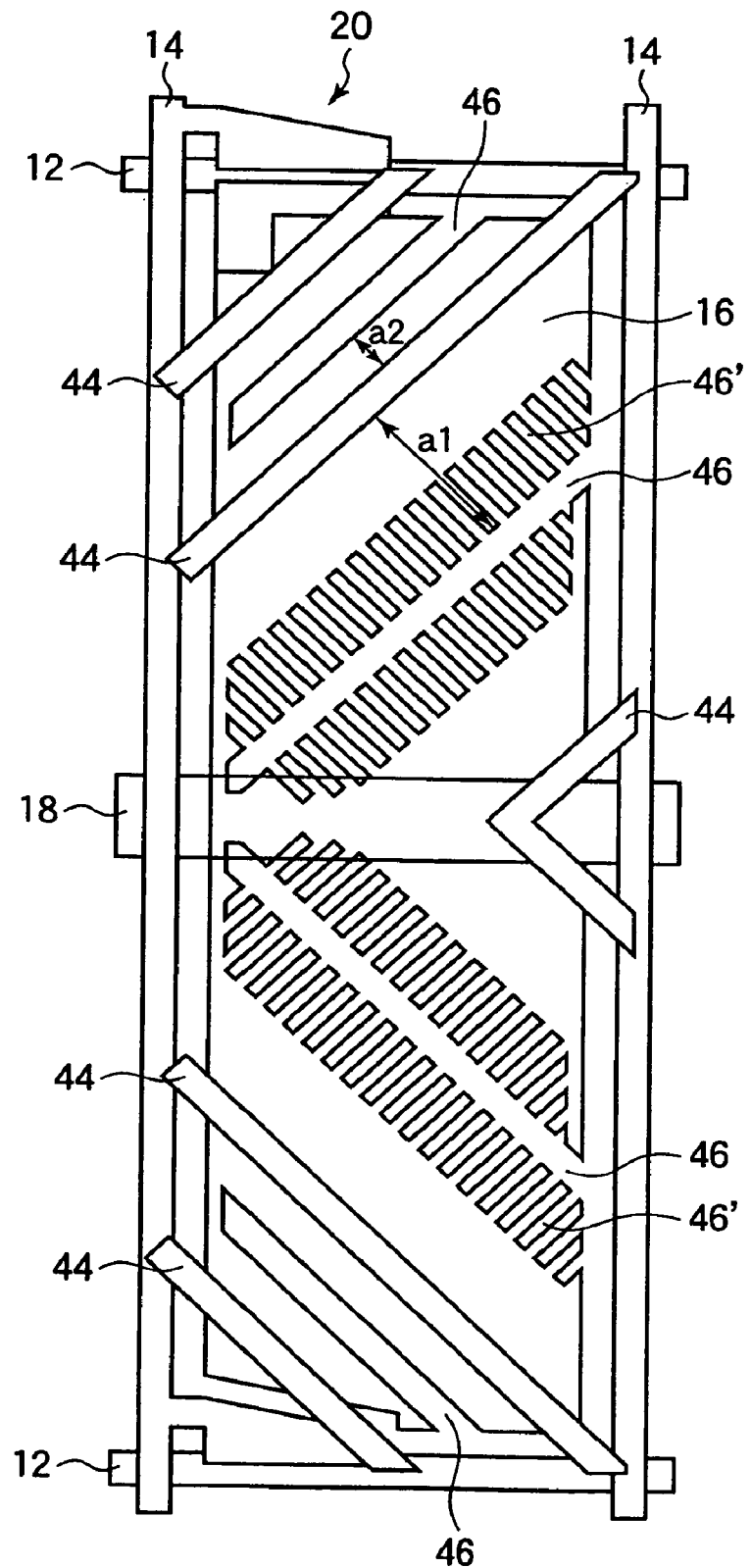
FIG. 11 shows a configuration of a liquid crystal display according to Embodiment 1-3 in the first mode for carrying out the invention.

FIG. 11 shows the disposition of alignment regulating structures in one pixel of a liquid crystal display in the present mode for carrying out the invention. As shown in FIG. 11, no linear protrusion as shown in FIG. 9 is formed on a TFT substrate 2, and slits 46 which are partial blanks in an electrode film of a pixel electrode 16 are formed instead. A plurality of slits 46' having a space width smaller than that of the slits 46 are formed substantially orthogonally to directions in which the slits 46 extend, the series of protrusions 46' being arranged in two extending directions of the slits 46 that converge toward a storage capacitor bus line 18 located in the middle of the pixel. An aligning direction can be more reliably regulated by providing the slits 46'.

Linear protrusions 44 are formed on an opposite substrate 4 which is provided opposite to the TFT substrate 2 and on which a color filter resin layer and a common electrode are formed, the linear protrusions 44 being disposed in parallel with the slits 46 with an offset from the same by half a pitch. The protrusions 44 are formed by applying a resist on the entire surface of the substrate to form a resist layer and by patterning the resist layer using a photolithographic process.

Intervals a2 between the protrusions 44 and the slits 46 in top left and bottom left areas of the pixel region are smaller than intervals a1 between the protrusions 44 and the slits 46 in the rest of the pixel region. Thus, areas having different threshold voltages are both present in one pixel.

As thus described, not only protrusions but also recesses or slits formed on an electrode may be used as domain regulating units, and a combination of those features may alternatively be used. As shown in FIG. 11, patterns in the form of stripes may have a bent section, and they may be accompanied by fine slits or fine protrusions for assisting domain regulation along a part or whole of the same.

In the present mode for carrying out the invention, areas having different threshold voltages can be both provided in one pixel. Since this prevents a displayed image from appearing whitish in an oblique direction, an MVA type liquid crystal display having high viewing angle characteristics can be provided.

(Second Mode for Carrying Out the Invention)

A liquid crystal display and a method of manufacturing the same in a second mode for carrying out the invention will now be described with reference to FIGS. 12 to 27. In a Japanese patent application (numbered 2002-52303) by the present applicant, a technique is proposed in which a photo-setting composition mixed in a liquid crystal is set with a different pre-tilt angle in part of one pixel, as a technique for solving the problem that a display image displayed in halftones appears whitish in an oblique direction. According to this technique, areas having different T-V characteristics such as threshold voltages can be formed in one pixel to improve gradation/viewing angle characteristics.

However, in order to vary T-V characteristics in one pixel, the pre-tilt angle of liquid crystal molecules must be increased at least in part of the pixel. A problem has thus arisen in that leakage of light is likely to occur to result in a reduced contrast ratio at the time of full black display. In order to obtain different pre-tilt angles, it has been necessary to apply voltages at a plurality of levels to the liquid crystal layer in setting a photo-setting composition by irradiating it with light. Further, a high optical irradiation energy is required to ensure the pre-tilt of liquid crystal molecules. It is therefore desired to improve production tact at steps for manufacturing liquid crystal displays.

It is an object of the present mode for carrying out the invention to provide a liquid crystal display which can achieve high viewing angle characteristics and which can be manufactured with simple manufacturing steps and to provide a method of manufacturing the same.

Figure 12:
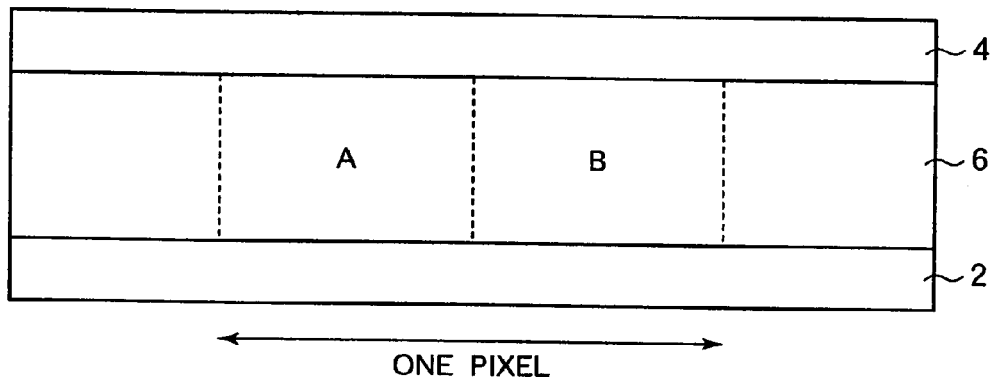
FIG. 12 is a sectional view showing a configuration of a liquid crystal display in a second mode for carrying out the invention.
Figure 13:
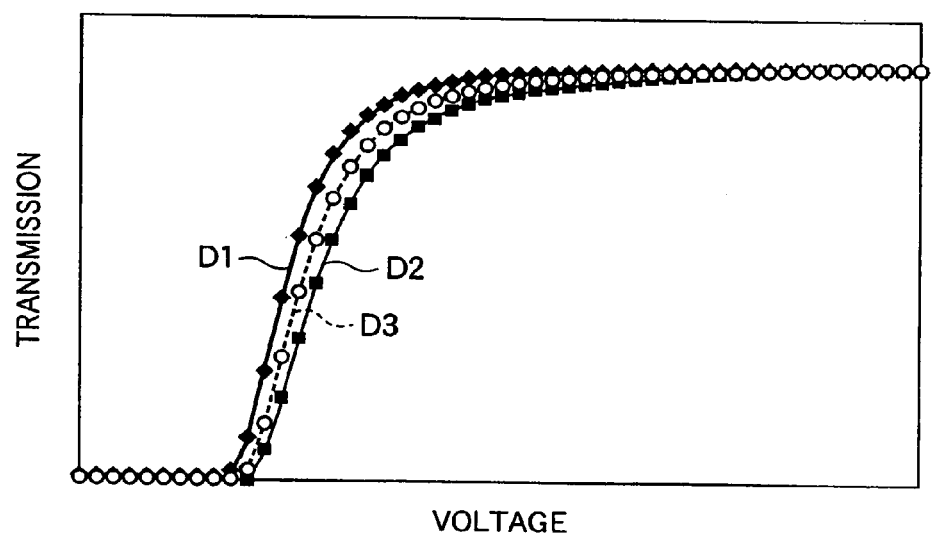
FIG. 13 is a graph showing T-V characteristics of the liquid crystal display in the second mode for carrying out the invention.

A principle behind the present mode for carrying out the invention will now be described. FIG. 12 is a sectional view of a region substantially equivalent to one pixel showing a configuration of a liquid crystal display in the present mode for carrying out the invention. As shown in FIG. 12, a pixel region is divided in areas A and B which are different from each other in T-V characteristics. FIG. 13 is a graph showing T-V characteristics in each of the areas. The abscissa axis represents voltages applied to the liquid crystal, and the ordinate axis represents light transmittances. The line D1 in the graph indicates T-V characteristics in the area A, and the line D2 indicates T-V characteristics in the area B. The line D3 indicates composite T-V characteristics obtained in the pixel as a whole including the areas A and B. As already described, high viewing angle characteristics can be achieved by providing both of the areas A and B having different T-V characteristics in one pixel.

Figure 14:
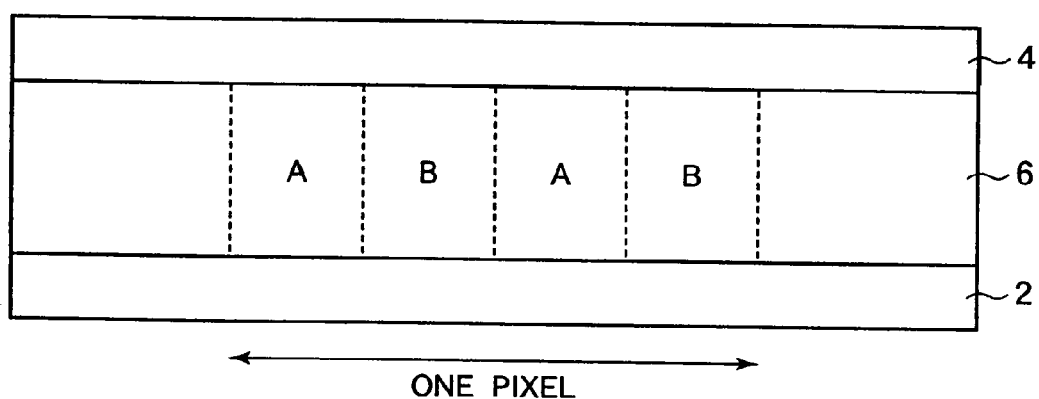
FIG. 14 is a sectional view showing another configuration of a liquid crystal display in the second mode for carrying out the invention.

FIG. 14 is a sectional view of a region substantially equivalent to one pixel showing another configuration of a liquid crystal display in the present mode for carrying out the invention. The same effect can be achieved when each of the areas A and B is divided into a plurality of parts as shown in FIG. 14. Alternatively, a pixel region may be divided into three or more regions A, B, C, and so on which are different from each other in T-V characteristics.

Figure 15A:
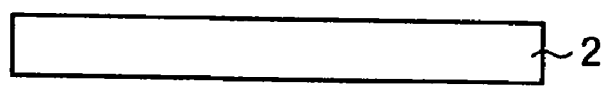
FIGS. 15A to 15F are sectional views taken in processes showing a method of manufacturing a liquid crystal display according to the related art.
Figure 15B:
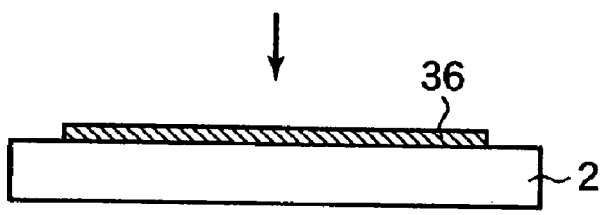
Figure 15C:
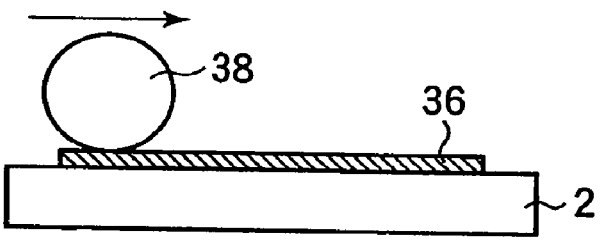

A method of manufacturing a liquid crystal display in the present mode for carrying out the invention will now be described in comparison to the related art. FIGS. 15A to 15F are sectional views taken in processes showing a method of manufacturing a liquid crystal display according to the related art. First, transparent electrodes and so on are formed on a glass substrate (or plastic substrate) to fabricate a TFT substrate 2 (or opposite substrate 4) as shown in FIG. 15A. Next, as shown in FIG. 15B, a printing process is used to apply a polyimide resin to the TFT substrate 2 and is baked at a high temperature to form an alignment film 36. The baking at a high temperature may not be performed when a plastic substrate is used, and a resin that is baked at a low temperature is frequently used as the material to form the alignment film 36 in such cases. Rubbing is then performed using a rubbing roller 38 as shown in FIG. 15C if necessary.

Figure 15D:
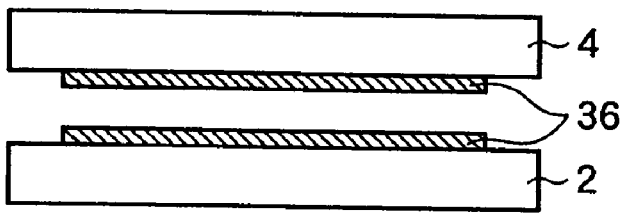
Figure 15E:
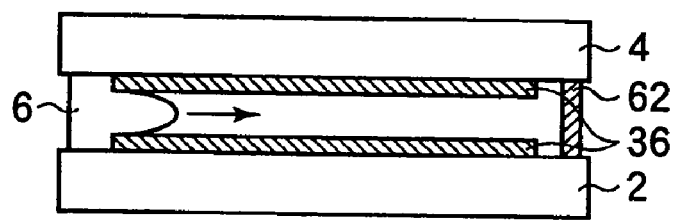
Figure 15F:
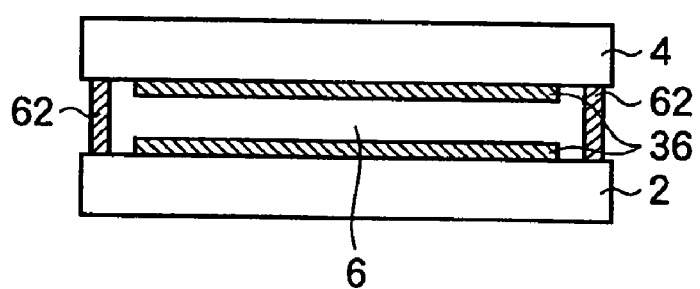

Next, as shown in FIG. 15D, an opposite substrate 4 on which an alignment film 36 has been formed at similar steps is combined with the TFT substrate 2 with a seal material 62 interposed between them. Next, as shown in FIG. 15E, a liquid crystal 6 is injected through a liquid crystal injection hole and is sealed to complete a liquid crystal display as shown in FIG. 15F.

Figure 16A:
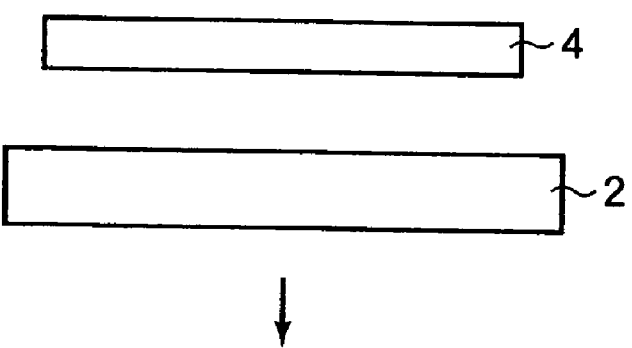
FIGS. 16A to 16C are sectional views taken in processes showing a method of manufacturing a liquid crystal display in the second mode for carrying out the invention.
Figure 16B:
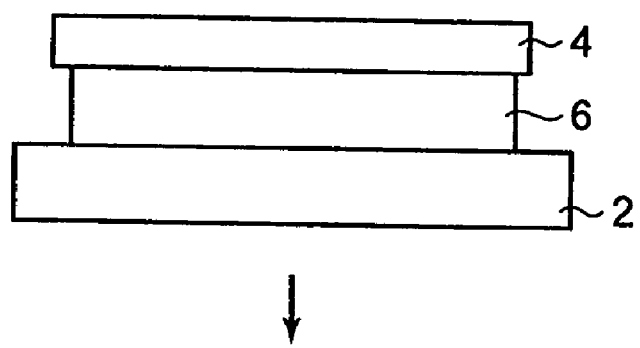
Figure 16C:
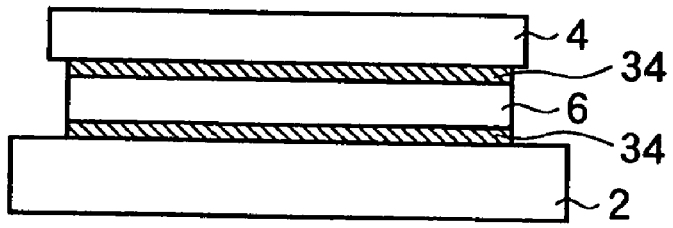

FIGS. 16A to 16C are sectional views taken in processes showing a method of manufacturing a liquid crystal display in the present mode for carrying out the invention. First, as shown in FIG. 16A, a TFT substrate 2 and an opposite substrate 4 having no alignment film 36 formed thereon are combined together with a sealing material (not shown) interposed between them. Next, as shown in FIG. 16B, a liquid crystal 6 mixed with a photo-setting resin which is an alignment assisting material is injected between the substrates 2 and 4. The liquid crystal 6 is then irradiated with light to set the photo-setting resin in the vicinity of the substrates 2 and 4, thereby forming alignment controlling layers 34 as shown in FIG. 16C. No voltage is applied to the liquid crystal 6 at the step of irradiating the liquid crystal 6 with light.

Figure 17A:
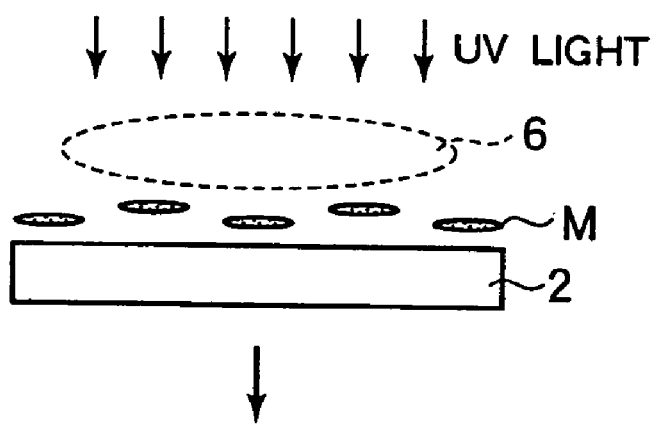
FIGS. 17A to 17C are sectional views showing the flow of the formation of alignment controlling layers.
Figure 17B:
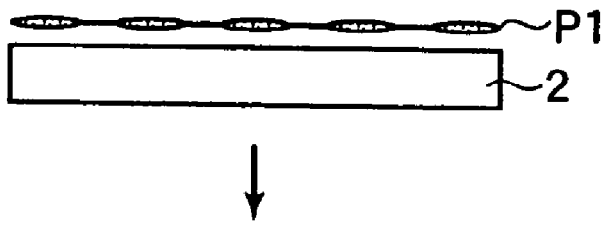
Figure 17C:
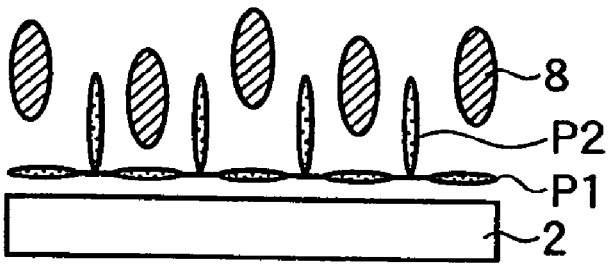

FIGS. 17A to 17C are sectional views showing the flow of the formation of the alignment controlling layers 34. As shown in FIGS. 17A and 17B, the photo-setting resin (monomers) M in the liquid crystal 6 at an interface with the substrate 2 is polymerized into a polymer P1 when irradiated with UV light. When irradiation with UV light is further continued, as shown in FIG. 17C, polymers P2 are formed which are aligned perpendicularly to the polymer P1 at the interface with the substrate, and the polymers P1 and P2 function as a vertical alignment controlling layer to align liquid crystal molecules 8 vertically.

The method of manufacturing a liquid crystal display in the present mode for carrying out the invention is characterized in that the alignment film 36 is not formed on the substrates 2 and 4 or is formed only in part of a pixel region unlike the method of manufacturing a liquid crystal display according to the related art. The alignment of the liquid crystal 6 is controlled by the alignment controlling layers 34. When no alignment film 36 is formed, a liquid crystal display can be fabricated without steps which involve heating of the substrates at a high temperature including the step for forming the alignment controlling layers 34. Since this allows plastic substrates or very thin glass substrates to be used as the TFT substrate 2 and the opposite substrate 4, freedom in selecting substrates is increased. In the present mode for carrying out the invention, no voltage is applied to the liquid crystal 6 when the alignment controlling layers 34 are formed. Thus, steps for manufacturing the liquid crystal display are simplified.

According to the above-described techniques in the related art, different T-V characteristics are achieved in one pixel primarily by varying the tilting angle of liquid crystal molecules relative to the substrates. On the contrary, in the present mode of carrying out the invention, liquid crystal molecules are tilted at the same angle in one pixel, and different T-V characteristics are achieved in one pixel utilizing a difference between anchoring energies applied by alignment controlling layers 34 to liquid crystal molecules. A continued study revealed that it is difficult to utilize a difference between anchoring energies in a liquid crystal display panel assembled after forming vertical alignment films because the anchoring energies become too high. In the present mode for carrying out the invention, however, since no vertical alignment film is formed (or formed only in part of a pixel region), a liquid crystal display panel having small anchoring energies can be fabricated. It is therefore easy to provide different anchoring energies in a pixel.

In the present mode for carrying out the invention, since liquid crystal molecules are not required to have a great pre-tilt angle, leakage of light can be avoided when black is displayed. This makes it possible to provide a liquid crystal display having improved gradation/viewing angle characteristics and a high contrast ratio.

Figure 18A:
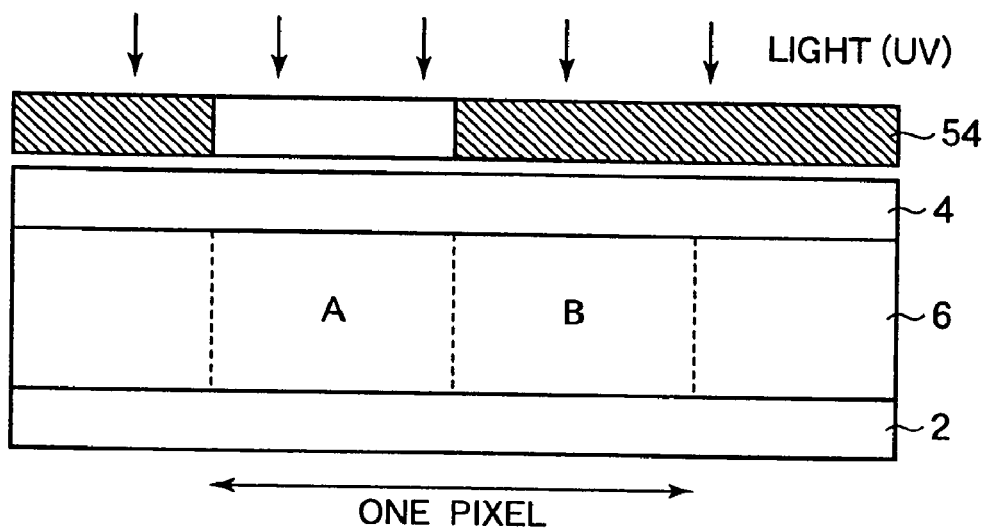
FIGS. 18A and 18B are sectional views showing a method of forming alignment controlling layers having different anchoring energies in one pixel.
Figure 18B:
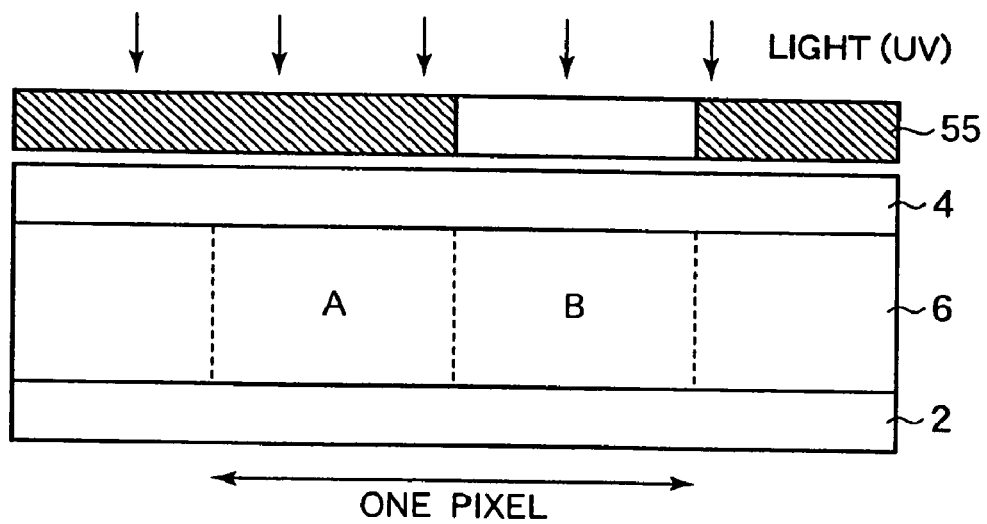

FIGS. 18A and 18B show a method of forming alignment controlling layers 34 having different anchoring energies in one pixel. First, as shown in FIG. 18A, an area A of one pixel of a liquid crystal panel formed by injecting a liquid crystal 6 mixed with a photo-setting resin between substrates 2 and 4 is irradiated with, for example, a predetermined dose of UV light using an exposure mask 54. Next, as shown in FIG. 18B, an area B of the same pixel is irradiated with UV light in a dose different from that mentioned above using an exposure mask 55 formed with a shielding pattern that is complementary to the exposure mask 54. By irradiating the area A and the area B in the single pixel with UV light in different doses, alignment controlling layers 34 having different anchoring energies are formed in the areas A and B. Therefore, different T-V characteristics (threshold voltages) can be achieved in the areas A and B in the single pixel.

Figure 19:
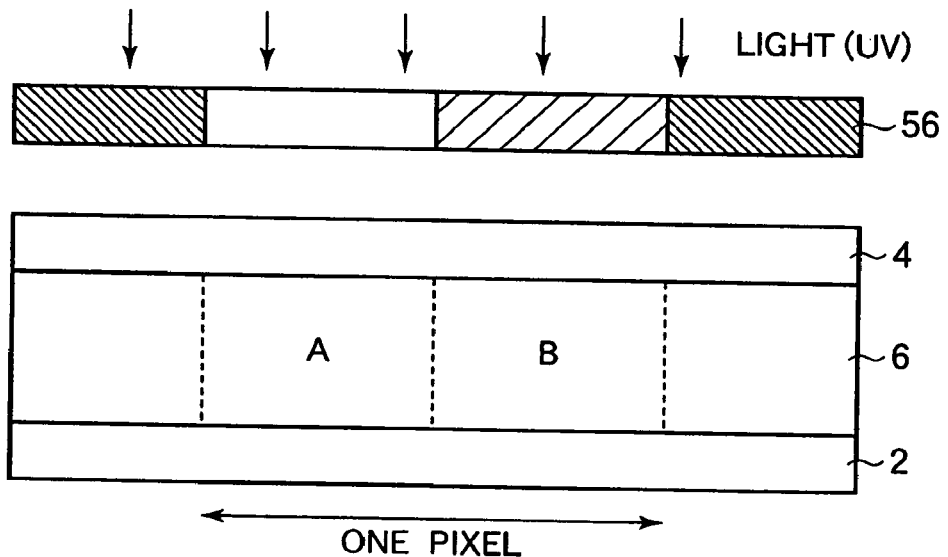
FIG. 19 is a sectional view showing another example of a method of forming alignment controlling layers having different anchoring energies in one pixel.

FIG. 19 shows another example of a method of forming alignment controlling layers 34 having different anchoring energies in one pixel. As shown in FIG. 19, an exposure mask 56 whose transmittance varies depending on areas is used to irradiate areas A and B in one pixel with UV light having different irradiation intensities. According to this method, since alignment controlling layers 34 having different anchoring energies are obtained through full plate exposure, manufacturing steps are further simplified.

Figure 20:
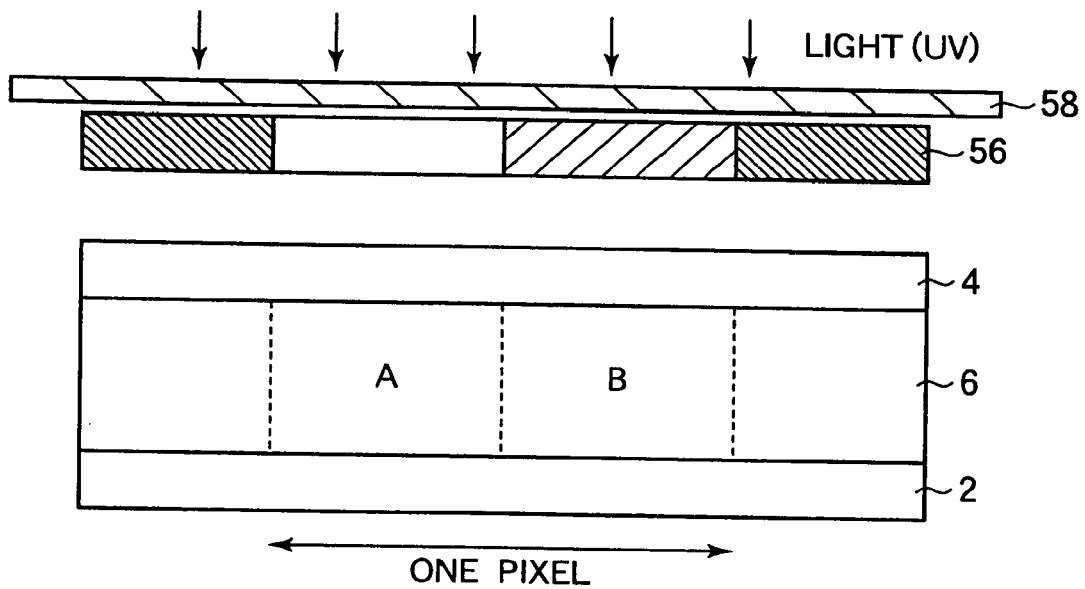
FIG. 20 is a sectional view showing still another example of a method of forming alignment controlling layers having different anchoring energies in one pixel.

FIG. 20 shows still another example of a method of forming alignment controlling layers 34 having different anchoring energies in one pixel. As shown in FIG. 20, an optical band-pass filter 58 is used to vary the wavelength of UV light that enters a liquid crystal 6. It is also advantageous to use a plurality of band-pass filters 58 at the time of irradiation with UV light. For example, a predetermined band-pass filter 58 is used for irradiation with UV light up to a certain phase of irradiation; another band-pass filter 58 is used for irradiation with UV light up to a certain subsequent phase of irradiation; and irradiation with UV light is thereafter performed using no band-pass filter 58.

Figure 21:
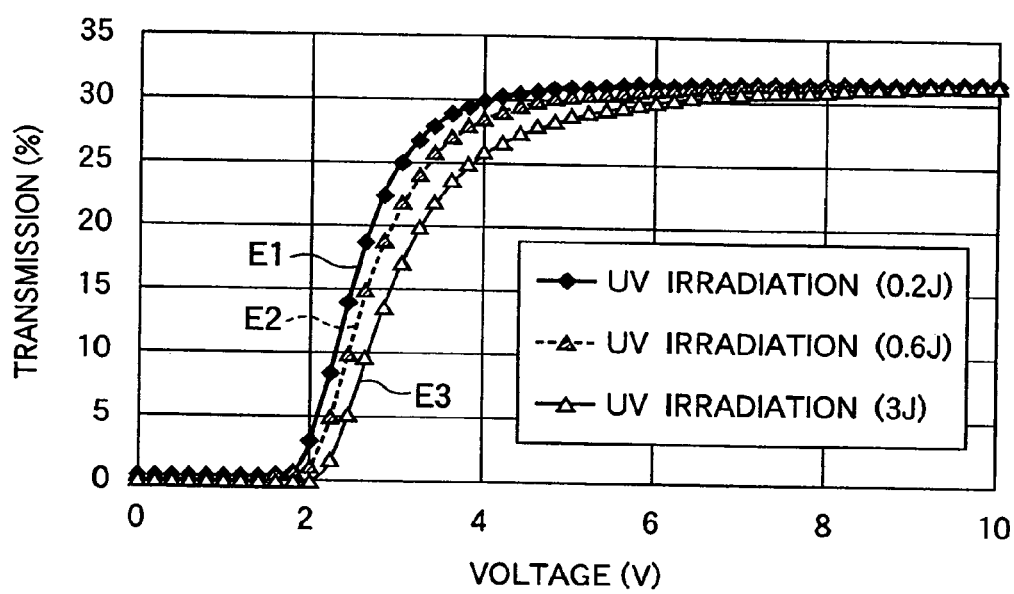
FIG. 21 is a graph showing dependence of a T-V curve on the dose of irradiation with light.

FIG. 21 is a graph showing dependence of a T-V curve on the dose of irradiation with light (total energy). The line E1 represents a T-V curve resulting from a UV irradiation dose of 0.2 J (a small UV irradiation dose). The line E2 represents a T-V curve resulting from a UV irradiation dose of 0.6 J (a medium UV irradiation dose). The line E3 represents a T-V curve resulting from a UV irradiation dose of 3 J (a large UV irradiation dose). As shown in FIG. 21, liquid crystal molecules stand up earlier when the dose of UV irradiation is small because the anchoring energies of the alignment controlling layers 34 are small. The anchoring energies of the alignment controlling layers 34 increase with the dose of UV irradiation, and the T-V curve is shifted toward a high voltage side.

Figure 22:
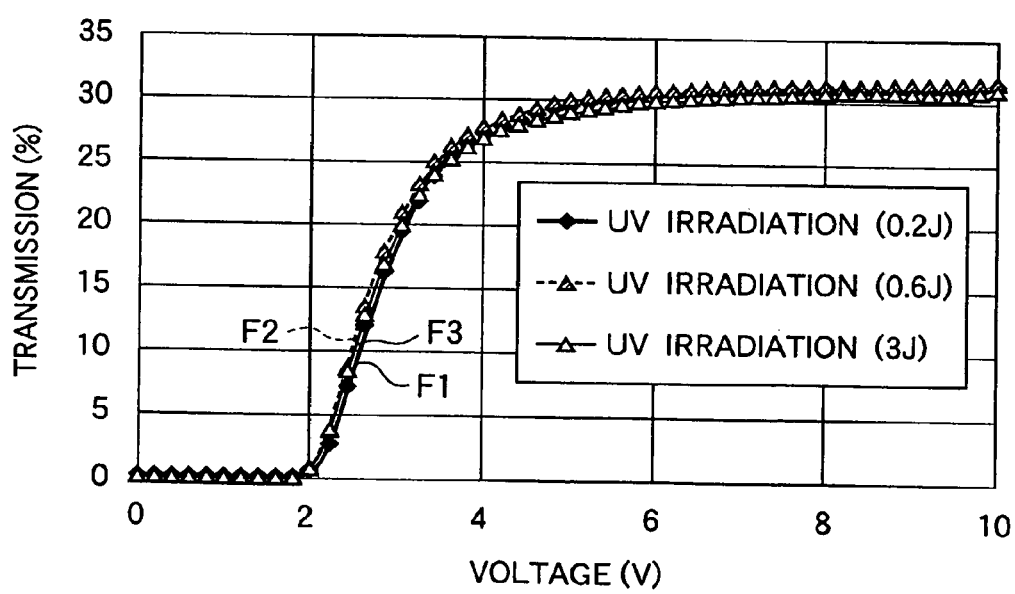
FIG. 22 is a graph showing dependence of T-V characteristics on the dose of irradiation with light in a case wherein an optical initiator is used.

In this example, no optical initiator (polymerization initiator) is used in the photo-setting resin in the mixed liquid crystal. Since no optical initiator is used, an anchoring energy difference can be more easily made available. FIG. 22 is a graph showing dependence of T-V characteristics on the dose of irradiation with light in a case wherein an optical initiator is used. The line F1 represents a T-V curve resulting from a UV irradiation dose of 0.2 J (a small UV irradiation dose). The line F2 represents a T-V curve resulting from a UV irradiation dose of 0.6 J (a medium UV irradiation dose). The line F3 represents a T-V curve resulting from a UV irradiation dose of 3 J (a large UV irradiation dose). The optical initiator is added such that it is about 2 to 10%, by weight, of the total amount of a monofunctional monomer and a bifunctional monomer. A comparison between FIGS. 22 and 21 indicates that differences between the T-V curves depending on the different doses of UV irradiation are small when an optical initiator is used. It is therefore preferable to use no optical initiator in order to make an anchoring energy difference available.

Figure 23:
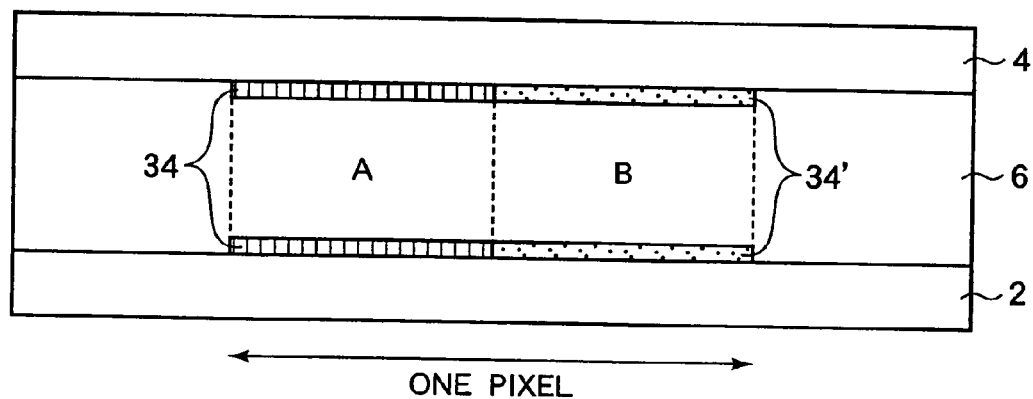
FIG. 23 is a sectional view showing a configuration of a liquid crystal display fabricated according to a method of manufacturing a liquid crystal display in the second mode for carrying out the invention.

FIGS. 23 to 26 show sectional configurations of a liquid crystal display fabricated according to the method of manufacturing a liquid crystal display in the present mode for carrying out the invention. As shown in FIG. 23, alignment controlling layers 34 having a predetermined anchoring energy are formed in an area A of a pixel region. In an area B, alignment controlling layers 34' having an anchoring energy different from that in the area A are formed.

Figure 24:
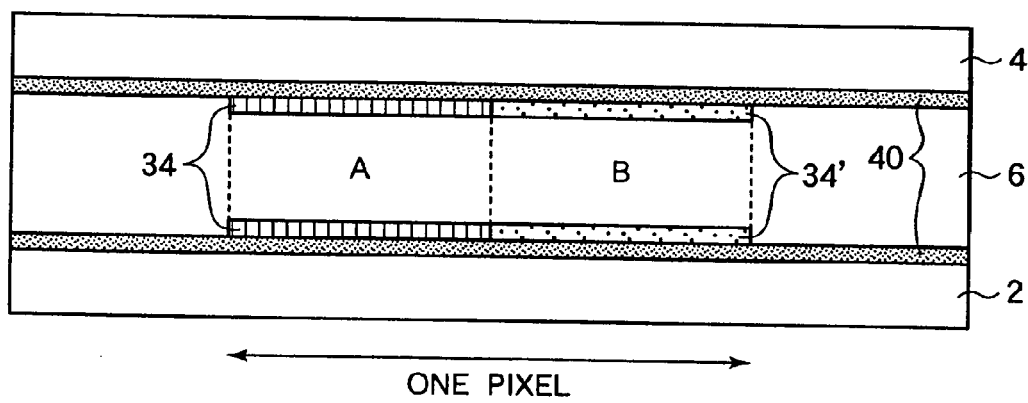
FIG. 24 is a sectional view showing a configuration of a liquid crystal display fabricated according to the method of manufacturing a liquid crystal display in the second mode for carrying out the invention.

The alignment controlling layers 34 and 34' may alternatively be formed after forming underlying layers 40 on substrates 2 and 4 as shown in FIG. 24. For example, the underlying layers 40 are partially pre-processed such that they have different degrees of surface activity to make the alignment controlling layers 34 and 34' definitely different from each other, thereby providing a great difference between their anchoring energies.

Figure 25:
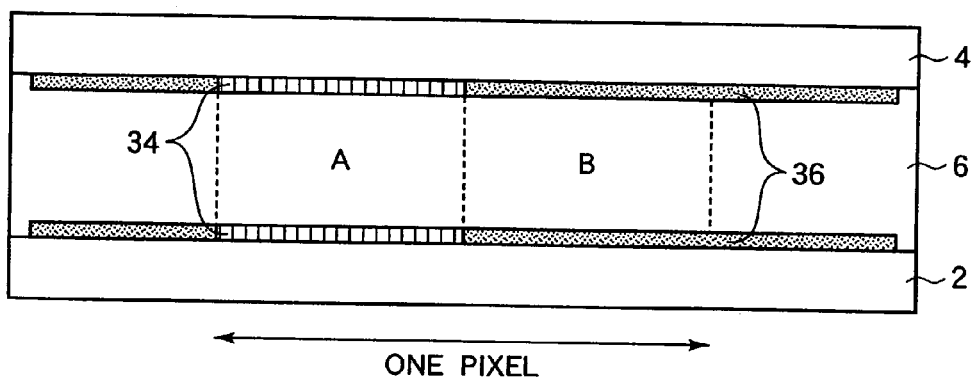
FIG. 25 is a sectional view showing a configuration of a liquid crystal display fabricated according to the method of manufacturing a liquid crystal display in the second mode for carrying out the invention.

As shown in FIG. 25, vertical alignment films 36 may be formed as the underlying layers. For example, the vertical alignment films 36 are patterned such that the alignment controlling layers 34 are selectively formed in the area A in which the vertical alignment films 36 are removed and such that vertical alignment films 36 are used as they are in the region B without forming the alignment controlling layers 34.

Figure 26:
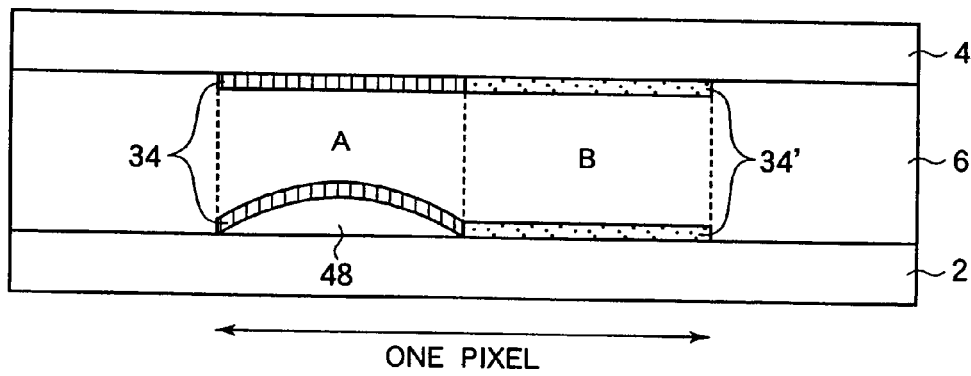
FIG. 26 is a sectional view showing a configuration of a liquid crystal display fabricated according to the method of manufacturing a liquid crystal display in the second mode for carrying out the invention.

It is also advantageous to use the present mode for carrying out the invention for substrates having an irregular section 48 on a surface thereof, as shown in FIG. 26. Specifically, since irregular sections 48 formed on substrates 2 and 4 are leveled by, for example, a CF resin layer or linear protrusions, there is no need for providing a leveling layer. This simplifies manufacturing steps and reduces manufacturing costs. In the case of a reflective liquid crystal display, alignment controlling layers 34 may be directly formed on a surface of a reflective electrode having a tilt angle. Although it is sometimes difficult to form a alignment film 36 on a substrate having an irregular section 48 on a surface thereof or a substrate used in a reflective liquid crystal display using a printing process, an alignment controlling layer 34 can be uniformly formed in the present mode for carrying the invention.

Figure 27:
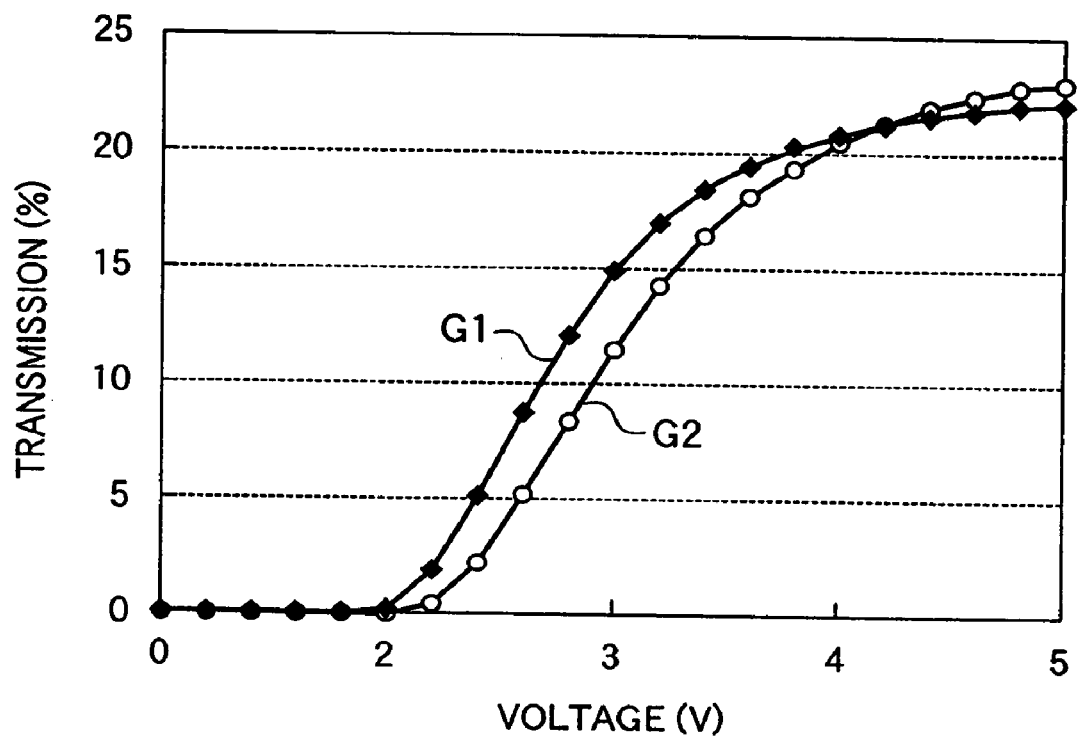
FIG. 27 is a graph showing T-V characteristics in an area having alignment controlling layers and showing T-V characteristics in an area having vertical alignment films formed therein.

FIG. 27 is a graph showing T-V characteristics in an area having alignment controlling layers 34 formed therein of a liquid crystal display panel having a configuration as shown in FIG. 6 and showing T-V characteristics in an area having vertical alignment films 36 formed therein of the same panel. The line G1 indicates the T-V characteristics in the area having the alignment controlling layers 34 formed therein, and the line G2 indicates the T-V characteristics in the area having the vertical alignment films 36 formed therein. As shown in FIG. 27, an anchoring energy and a threshold voltage in the area having the alignment controlling layers 34 formed therein are smaller than those in the area having the vertical alignment films 36 formed therein. It is easier to provide different anchoring energies in a pixel, in a liquid crystal display panel formed with alignment controlling layers 34 and no vertical alignment film 36 or a liquid crystal display panel having alignment controlling layers 34 formed in areas in which vertical alignment films 36 have been removed through patterning, than in a liquid crystal display panel having vertical alignment films 36 formed on entire surfaces thereof.

The description will now be continued with reference to specific embodiments.

<Embodiment 2-1>

Each of a pair of glass substrates having a transparent electrode constituted by an ITO patterned thereon was cleaned. Bead spacers having a diameter of 4.0 μm (manufactured by Fine Chemicals Division, Sekisui Chemical Co., Ltd.) were dispersed on either of the substrates, and a thermosetting seal (manufactured by Mitsui Chemicals, Inc) was applied to the other substrate with a dispenser. The substrates were then combined to fabricate an open cell. A liquid crystal (manufactured by Merck and having $\Delta\epsilon=-4.8$) and a resin were mixed in a weight ratio of 98:2. The resin was a mixture of a monofunctional monomer (dodecyl acrylate manufactured by Wako Pure Chemical Industries, Ltd.) and a bifunctional monomer (manufactured by Merck) in a weight ratio of 15:1. The mixed liquid crystal thus prepared was charged in the open cell using vacuum injection, and the injection hole was thereafter sealed with a visible-light-setting resin to fabricate a liquid crystal cell. The liquid crystal cell was irradiated with UV light having an intensity of 1 mW/cm$^2$. At this time, an area A was formed by irradiating it with UV light having a dose 0.2 J using an exposure mask 54 for shielding an area B from light, and the area B was formed by irradiating it with UV light having a dose of 3 J using an exposure mask 55 for shielding the area A from light. Thus, a liquid crystal panel was fabricated which had different T-V characteristics in a pixel depending on locations. Each of the areas A and B was formed like stripes having a width of 20 μm. Measurement of T-V characteristics using a λ/4 plate revealed that there was a significant improvement of gradation/viewing angle characteristics.

<Embodiment 2-2>

Open cells and a mixed liquid crystal similar to those in Embodiment 2-1 were used to fabricate three types of liquid crystal panels. The liquid crystal panels were irradiated with UV light in three different doses (0.2 J, 0.6 J and 3 J) without using the exposure masks 54 and 55. As a result of measurement of T-V characteristics performed in the same way as in Embodiment 2-1, it was observed that the liquid crystal panels had different T-V characteristics as shown in the graph of FIG. 21.

<Embodiment 2-3>

Liquid crystal panels were fabricated under the same conditions as those in Embodiment 2-2 except that a polymerization initiator was mixed in the mixed liquid crystal. The polymerization initiator used was Irgacure 651 (manufactured by Ciba Specialty Chemicals Holding Inc.). A small amount of the polymerization initiator was added to reach 2.5% by weight of the amount of the monofunctional monomer and the bifunctional monomer that were mixed. Three types of liquid crystal panels were fabricated by using three different doses of irradiation (0.2 J, 0.6 J and 3 J) just as done in Embodiment 2-2. Measurement of T-V characteristics of the liquid crystal panels revealed that it was difficult to provide the liquid crystal panels with different T-V characteristics as in the graph shown in FIG. 22 and that it was preferable to add no polymerization initiator.

(Third Mode for Carrying Out the Invention)

A liquid crystal display and a method of manufacturing the same in a third mode for carrying out the invention will now be described with reference to FIGS. 28 to 36. MVA mode and In-Plane Switching (IPS) mode displays are well known as liquid crystal displays which have high display quality and, in particular, high viewing angle characteristics.

Figure 28:
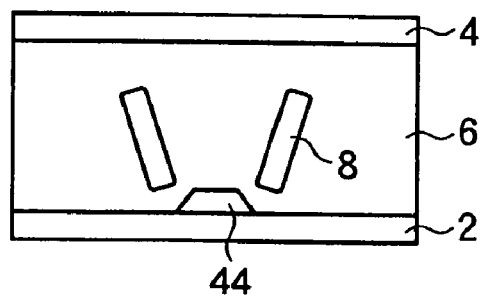
FIG. 28 shows a schematic sectional configuration of an MVA-LCD.

FIG. 28 shows a schematic sectional configuration of an MVA-LCD. As shown in FIG. 28, the MVA-LCD has a TFT substrate 2, an opposite substrate 4, and a liquid crystal 6 sealed between the substrates 2 and 4. The liquid crystal 6 has negative dielectric constant anisotropy. For example, a linear protrusion 44 as an alignment regulating structure is formed on the TFT substrate 2. Although not shown, vertical alignment films are formed on surfaces of the substrates 2 and 4 opposite to each other. When no voltage is applied to the liquid crystal 6, liquid crystal molecules 8 in the vicinity of the protrusion 44 are tilted toward directions normal to inclined surfaces of the protrusion 44 from a direction perpendicular to the substrate surfaces. By applying a predetermined voltage to the liquid crystal 6, the liquid crystal molecules 8 are tilted in different directions, the protrusion 44 serving as a boundary between the tilts. The MVA LCD has high viewing angle characteristics because the tilting direction of the liquid crystal molecules 8 is divided into, for example, four directions in one pixel.

Figure 29:
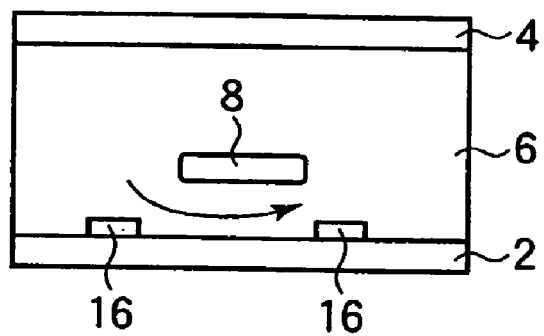
FIG. 29 shows a schematic sectional configuration of an IPS mode liquid crystal display.

FIG. 29 shows a schematic sectional configuration of an IPS mode liquid crystal display. As shown in FIG. 29, in the IPS mode liquid crystal display, a predetermined voltage is applied between pixel electrodes 16 formed like comb-teeth on a TFT substrate 2 to switch liquid crystal molecules 8 by the action of a horizontal electric field in parallel with the substrate. The IPS mode liquid crystal display has high viewing angle characteristics because the liquid crystal molecules 8 are always substantially in parallel with the substrates.

However, those liquid crystal displays still have problems. For example, the viewing angle characteristics of an MVA-LCD become insufficient at the time of a gradation change. In the case of an IPS mode liquid crystal display, sufficiently high contrast cannot be achieved in a direction square to the same. An MVA-CLD has problems with gradation/viewing angle characteristics including the problem that an image displayed in halftones appears whitish in an oblique direction or appears with different tints when viewed in oblique and square directions. On the contrary, in the IPS mode, contrast in a square direction is limited to about 200 to 300 because of the horizontal alignment. Contrast in an oblique direction at an angle of 45° is not sufficient compared to that of an MVA-LCD. Improvement of transmittance is also desired. There is another problem that undesirable coloring occurs when black display is viewed in an oblique direction. As thus described, even liquid crystal displays in the above-described excellent operation modes have merits and demerits, and further improvements are desired for them.

The present mode for carrying out the invention is aimed at improving gradation/viewing angle characteristics which are a problem of vertical alignment type liquid crystal displays in particular. Besides the above-described display methods, the halftone-grayscale method is known as a technique for improving viewing angle characteristics. According to the halftone-grayscale method, viewing angle characteristics are improved by varying a threshold voltage for a liquid crystal in one pixel to provide a mixture of different T-V characteristics. One approach to this is a technique in which different voltages are applied to a liquid crystal utilizing capacitive coupling. However, a problem has arisen in that steps for manufacturing a liquid crystal display become complicated and in that the structure of a liquid crystal display becomes complicated. In the present mode for carrying out the invention, a threshold voltage is easily controlled in a pixel of a vertical alignment type liquid crystal display to achieve a significant improvement of gradation/viewing angle characteristics consequently.

Figure 30:
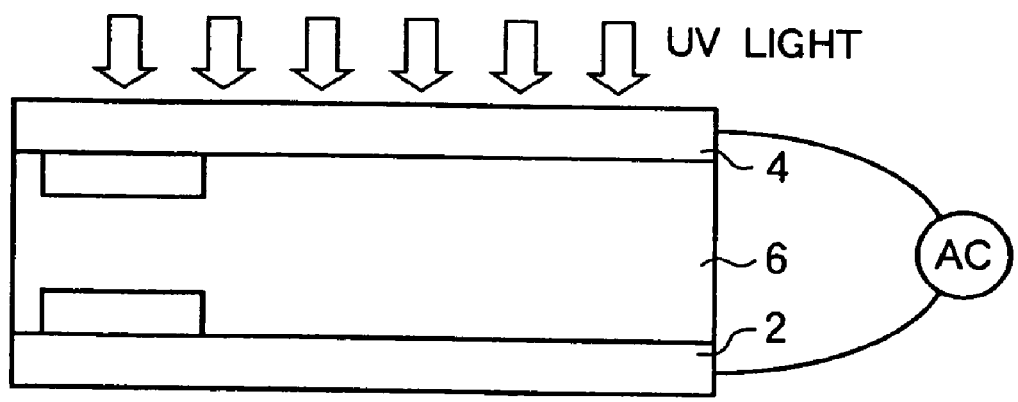
FIG. 30 is a sectional view of a region substantially equivalent to one pixel showing a configuration of a liquid crystal display in a third mode for carrying our the invention.

First, a principle behind the present mode for carrying out the invention will be described. FIG. 30 is a sectional view of a region substantially equivalent to one pixel showing a configuration of a liquid crystal display in the present mode for carrying out the invention. As shown in FIG. 30, a certain area of the pixel has a cell thickness smaller than that in the rest of the pixel. It is known that the response time of a liquid crystal is inversely proportionate to the square of the cell thickness in general. Specifically, the time of a response to the application of voltage is relatively short in the region having the smaller cell thickness, and the time of a response to the application of the voltage is relatively long in the other region having the greater cell thickness. In the present mode for carrying out the invention, this phenomenon is used to provide a different pre-tilt angle in part of a pixel. The liquid crystal 6 used is added with a reactive monomer.

A voltage that is a repetition of an off-voltage (for displaying black in a vertical alignment type normally black mode) and an on-voltage (for displaying white in the vertical alignment type normally black mode) is applied between a pixel electrode 16 (not shown) on a TFT substrate 2 and a common electrode 42 on an opposite substrate 4, the voltage being applied at a frequency appropriately selected based on the speed of response of the liquid crystal. The off-voltage is a voltage which causes no change in the alignment of liquid crystal molecules 8. The on-voltage is a voltage that is sufficient to provide the molecules with a pre-tilt angle. The frequency is basically set such that the liquid crystal will respond in the area of quick response and will not respond in the area of slow response at that frequency. It should be noted that the "on-voltage" and "off-voltage" are not necessarily voltages at which the liquid crystal display panel is actually driven. The voltages are chosen such that a pre-tilt angle is provided (or a threshold voltage changes) as a result of polymerization and solidification of a monomer, and values higher than an actual driving voltage are used in general. An acrylate type or methacrylate type monomer which is polymerized when irradiated with UV light is used as the monomer. The monomer is polymerized and solidified when it is irradiated with UV light with a voltage applied thereto.

Figure 31:
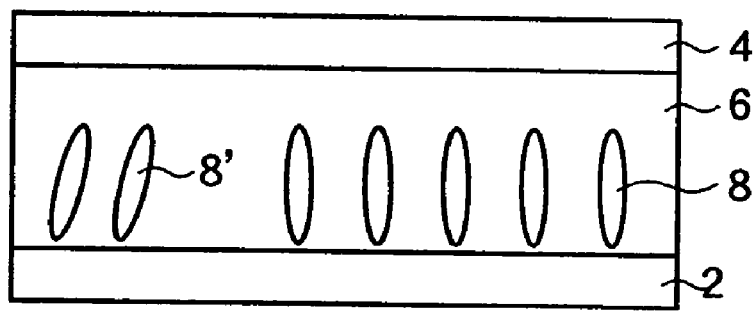
FIG. 31 is a sectional view of a region substantially equivalent to one pixel showing a pre-tilt angle of liquid crystal molecules of the liquid crystal display in the third mode for carrying out the invention.

FIG. 31 is a sectional view of a region substantially equivalent to one pixel showing a pre-tilt angle of liquid crystal molecules of the liquid crystal display in the present mode for carrying out the invention. As shown in FIG. 31, the pre-tilt angle of liquid crystal molecules 8' changes (from 90° to about 85°) in an area of quick response in part of the pixel, and the pre-tilt angle of liquid crystal molecules 8 in another area of slow response undergoes substantially no change (or stays at about 90°).

Figure 32:
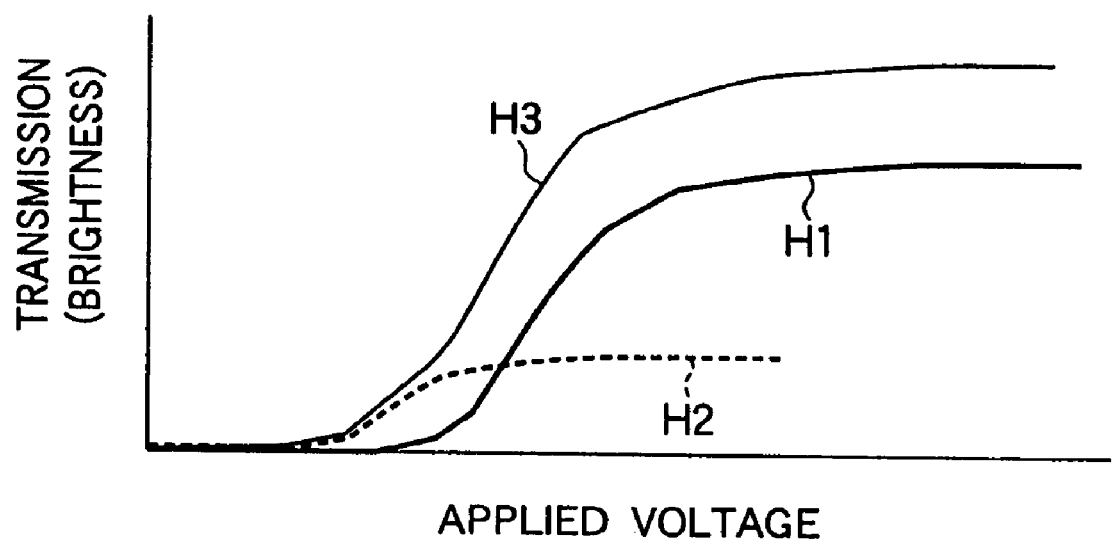
FIG. 32 is a graph showing T-V characteristics of the liquid crystal display in the third mode for carrying out the invention.

FIG. 32 is a graph showing T-V characteristics of the liquid crystal display in the present mode for carrying out the invention. The line H1 indicates T-V characteristics of the area in which the pre-tilt angle has not changed, and the line H2 indicates T-V characteristics of the area in which the pre-tilt angle has changed. The line H3 indicates composite T-V characteristics obtained throughout the pixel. As shown in FIG. 32, the threshold voltage is decreased resulting in a change in T-V characteristics in the area where the pre-tilt angle has changed. Gradation/viewing angle characteristics of the pixel as a whole are improved because the T-V characteristics of those areas are combined.

In the present mode for carrying out the invention, areas having different speeds of response are formed in a pixel, and a driving voltage and frequency for polymerizing and solidifying a reactive monomer are chosen based on the response speeds of the liquid crystal, which makes it possible to provide a different pre-tilt angle in part of the pixel. The threshold voltage of the liquid crystal can be varied in the pixel by providing a different pre-tilt angle in a part thereof, which consequently makes it possible to improve gradation/viewing angle characteristics. In the present mode for carrying out the invention, it is possible to significantly improve gradation/viewing angle characteristics which have been an important problem of vertical alignment type liquid crystal displays using a simple method.

The description will now be continued with reference to specific embodiments.

<Embodiment 3-1>

Figure 33:
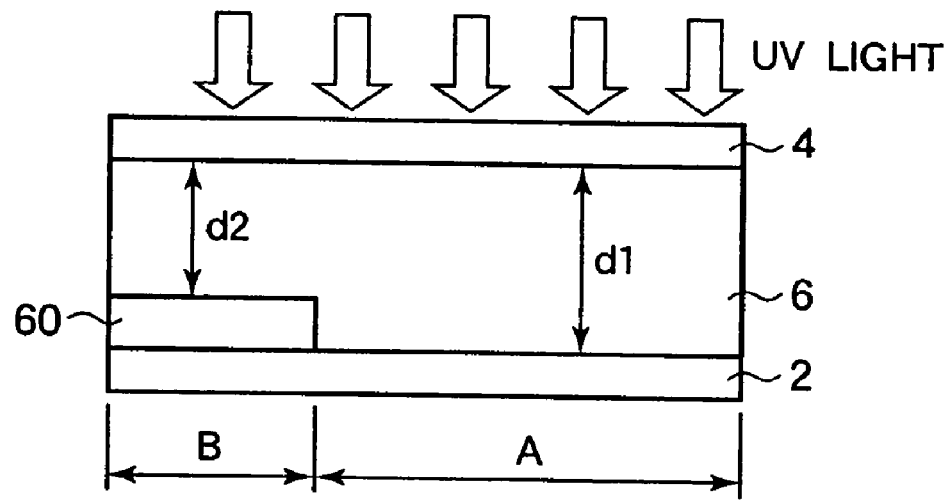
FIG. 33 is a sectional view of a region substantially equivalent to one pixel showing a configuration of a liquid crystal display according to Embodiment 3-1 in the third mode for carrying out the invention.

A description will now be made on a liquid crystal display and a method of manufacturing the same according to Embodiment 3-1 in the present mode for carrying the invention. FIG. 33 is a sectional view of a region substantially equivalent to one pixel showing a configuration of the liquid crystal display of the present embodiment. As shown in FIG. 33, one pixel is divided into an area A having a cell thickness d1 and an area B having a cell thickness d2 (<d1), and a pre-tilt angle is efficiently achieved in the area B in which a liquid crystal 6 responds quickly. The liquid crystal 6 has negative dielectric constant anisotropy ($\Delta\epsilon=-3.5$). Polyamic acid type vertical alignment films are used. A bifunctional acrylate or methacrylate having a liquid crystal skeleton was used as a reactive monomer to be mixed. The amount of the reactive monomer mixed in the liquid crystal was 0.4% by weight. The cell thickness d1 was about 4 μm, and the cell thickness d2 was 2 μm. A step was formed on a surface of a substrate by patterning a resin protective film 60 having a thickness of 2 μm.

Figure 34:
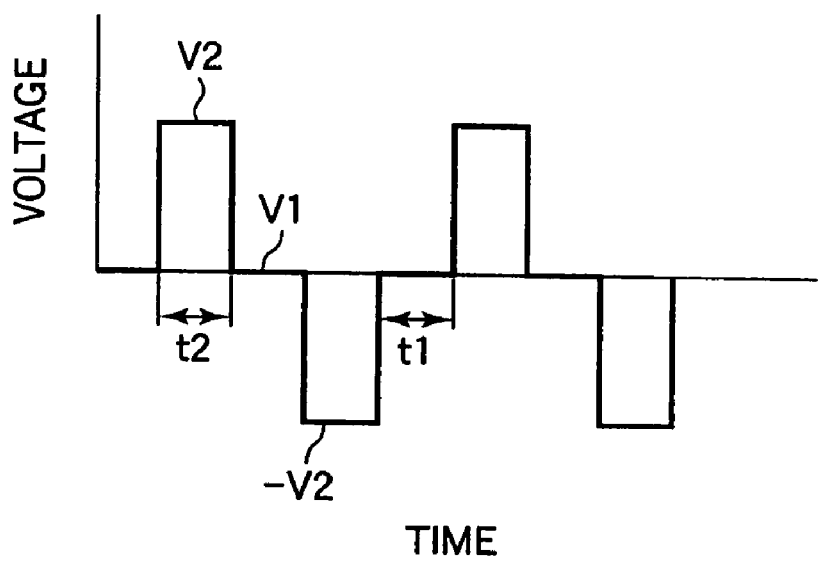
FIG. 34 is a graph showing how a voltage applied to a liquid crystal of Embodiment 3-1 in the third mode for carrying out the invention changes with time.

FIG. 34 is a graph showing how a voltage applied to the liquid crystal 6 of the present embodiment changes with time. A low voltage V1 was 0 V, and a high voltage V2 was 4 V. Times t1 and t2 were both 8 ms. The liquid crystal was irradiated with UV light of 10 J/cm$^2$ (equivalent to a UV 35 filter) while applying the voltage under such conditions. When the monomer in the liquid crystal is polymerized and solidified under such conditions, a polymer chain is formed in the area B at the interface between the area and the alignment film because the liquid crystal responds quickly in the area, the polymer chain following liquid crystal molecules which have been tilted. Thus, the liquid crystal molecules can be provided with a pre-tilt angle of 90° or less. On the contrary, in the area A, the liquid crystal responds more slowly because of the greater cell thickness, and substantially no tilt of liquid crystal molecules occurs in the area under the above-described conditions. Therefore, even if the monomer is solidified in this state, it will not impart a pre-tilt angle of 90° or less to liquid crystal molecules in that area because a polymer chain is formed such that it follows the liquid crystal molecules which are kept aligned vertically.

It is therefore possible to vary the threshold voltage for the liquid crystal between the areas A and B by varying the pre-tilt angle in the single pixel as thus described. That is, the threshold voltage in the area B is lower than that in the area A. Measurement of the threshold voltages in the two areas A and B revealed that there was a difference of about 0.5 V. The threshold voltages could be thus controlled using a relatively simple method as described above to improve gradation/viewing angle characteristics consequently.

The effect of improving viewing angle characteristics was observed when the area ratio between the areas B and A was about 1:10. A preferable area ratio depends on the difference between the threshold voltages. An experiment (observation of display) and a simulation have revealed that an area ratio in the range from 1:10 to 1:1 is preferable when the threshold voltage difference is in the range from 0.3 V to 1 V.

<Embodiment 3-2>

Figure 35:
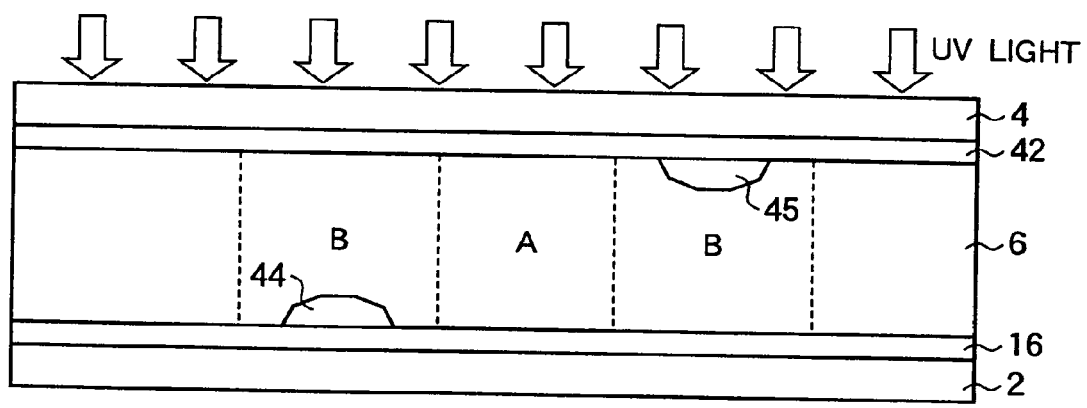
FIG. 35 shows a sectional configuration of a liquid crystal display which has areas with a different initial pre-tilt angle in some parts thereof.

A method of manufacturing a liquid crystal display according to Embodiment 3-2 in the present mode for carrying out the invention will now be described. The present embodiment is an example of the application of the present mode for carrying out the invention to a liquid crystal display having areas with a different initial pre-tilt angle in some parts thereof. An initial pre-tilt angle is a pre-tilt angle which is present before a polymer is solidified. FIG. 35 shows a sectional configuration of a liquid crystal display which has areas with a different initial pre-tilt angle in some parts thereof. In FIG. 35, alignment films are omitted from illustration. As shown in FIG. 35, linear protrusions (banks having low dielectric properties) 44 and 45 are formed on substrates 2 and 4, respectively. Thus, liquid crystal molecules in the vicinity of the protrusions 44 and 45 are provided with a predetermined initial pre-tilt angle. A voltage which changes with time as shown in FIG. 34 during polymerization of a monomer is applied to a liquid crystal 6 in the liquid crystal display having such a configuration, and this makes it possible to achieve a partial pre-tilt angle more efficiently. Specifically, the liquid crystal 6 which includes a polymeric monomer is irradiated with UV light while driving it in a way similar to the cyclic reset driving method, which makes it possible to efficiently provide a pre-tilt angle only in areas B where the liquid crystal 6 responds quickly. Polymerizing and driving conditions are substantially the same as those in Embodiment 3-1.

In the case of static driving that is commonly used, it is not possible to introduce great differences between pre-tilt angles of liquid crystal molecules at substrate interfaces in respective areas when there is not so great variation in the initial alignment of the liquid crystal molecules. Therefore, a sufficient threshold voltage difference cannot be provided even if a polymeric monomer is used. However, when driving similar to the cyclic reset driving method is used as in the present embodiment, a slight difference in initial alignment of liquid crystal molecules can be enlarged. By solidifying the polymeric monomer and fixing it at substrate interfaces in this state, an area having a greater threshold voltage difference (an area in which the pre-tilt angle becomes greater) can be consequently formed in one pixel. Therefore, the gradation/viewing angle characteristics of the liquid crystal display can be improved. Although an oblique electric field must be taken into consideration when the alignment of liquid crystal molecules in the vicinity of the protrusions 44 and 45 is discussed, the description has been focused on the initial pre-tilt angle only in order to avoid complicatedness.

Figure 36:
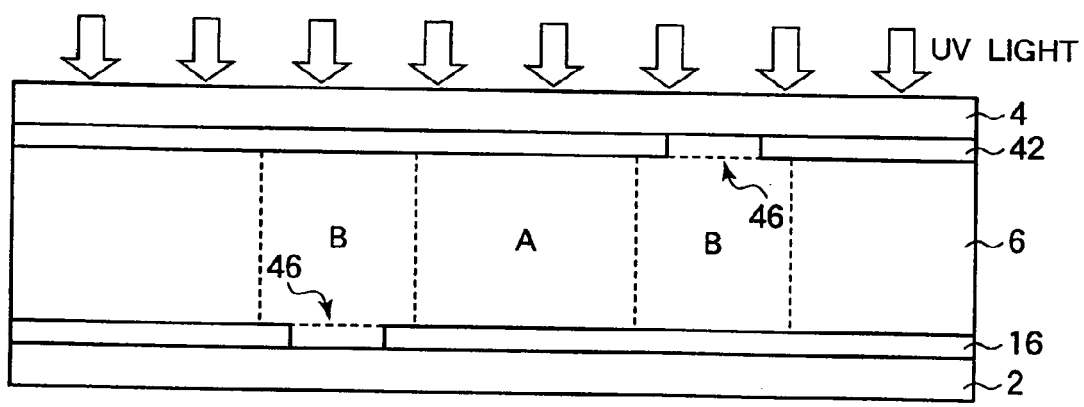
FIG. 36 shows a sectional configuration of a liquid crystal display having slits formed therein.

The impartment of a pre-tilt by typical oblique electric fields will now be described. FIG. 36 shows a sectional configuration of a liquid crystal display having slits formed therein. In FIG. 36, alignment films are omitted from illustration. As shown in FIG. 36, an electrode blank section (slit) 46 is formed on each of substrates 2 and 4. When the applied voltage is sufficiently low, the initial pre-tilt angle is substantially 90° in the entire area. When a voltage is applied to a liquid crystal 6, oblique electric fields are generated in the vicinity of the slits 44, the electric fields being different in direction from those in other areas. Liquid crystal molecules in the vicinity of the slits 44 are first tilted by the oblique electric fields. When the voltage is applied to the liquid crystal 6 using driving similar to the cyclic reset driving method as described above, the liquid crystal molecules in the vicinity of the slits 44 are tilted more greatly than those in the other areas.

Such alignment of liquid crystal molecules can be fixed by solidifying a polymeric monomer in this state. Polymerizing conditions and driving conditions are basically the same as those in Embodiment 1-1. According to the present embodiment, a liquid crystal display can be consequently fabricated with a structure which has a pre-tilt angle difference in a part thereof, and a definite threshold voltage difference is produced between an area B and another area A in the vicinity of the slits 46.

As described above, in the present mode for carrying out the invention, a definite threshold voltage difference can be produced in one pixel by making use of a difference between response speeds of a liquid crystal, a polymeric monomer, and driving similar to the cyclic reset driving method. It is therefore possible to provide a vertical alignment type liquid crystal display having high gradation/viewing angle characteristics.

(Fourth Mode for Carrying Out the Invention)

The present mode for carrying out the invention relates to a liquid crystal display used as a display section of a television receiver or an electronic apparatus and a method of manufacturing the same, more particularly, to a liquid crystal display in which a monomer or oligomer added in a liquid crystal is polymerized and a method of manufacturing the same.

A liquid crystal display has two substrates and a liquid crystal sealed between the substrates. In a liquid crystal display, optical switching is caused by electrical stimuli utilizing electro-optical anisotropy of a liquid crystal. A predetermined voltage is applied to a liquid crystal layer to control the tilting angle of liquid crystal molecules, thereby changing the direction of the axis of anisotropy of the refractivity of the liquid crystal molecules. Resultant optical rotation and birefringence are utilized to change light transmittance, and the luminance of each pixel of a liquid crystal display panel is thereby controlled. The vertical aligned (VA) mode is one of techniques for such a liquid crystal display panel. The VA mode has been put in practical use as an operation mode in which a wide viewing angle can be achieved, as typically experienced in an MVA (Multi-domain Vertical Alignment) type liquid crystal display (hereinafter referred to as "MVA-LCD").

In a VA mode liquid crystal display, however, a problem arises in that a displayed image in halftones appears whitish when viewed in a direction oblique to the display screen. As a method for solving this, a Japanese patent application (numbered 2002-52303) made by the present applicant has proposed a technique in which a plurality of areas having different pre-tilt angles of liquid crystal molecules are formed in one pixel to form areas having different rising voltages of T-V characteristics in the single pixel.

In a Japanese patent application (numbered 2001-98455) made by the present applicant, a technique as described below is proposed as a technique for providing a pre-tilt angle. A pre-tilt of liquid crystal molecules can be achieved by adding a monomer or oligomer which is optically or thermally reacted for polymerization in the liquid crystal in advance and by polymerizing the monomer or oligomer after the liquid crystal is injected. The pre-tilt angle can be varied by varying a voltage that is applied to the liquid crystal at the time of polymerization. The pre-tilt angle becomes smaller, the higher the applied voltage. A pre-tilt angle is an angle at which liquid crystal molecules are tilted with respect to a substrate surface when no voltage is applied to the liquid crystal layer. That is, "a reduction in a pre-tilt angle" means an increase in an angle of inclination from perfect vertical alignment or approaching to horizontal alignment.

It is an object of the present mode for carrying out the invention to provide a liquid crystal display which can achieve high display characteristics and a method of manufacturing the same.

The above object is achieved by a liquid crystal display characterized in that it has a pair of substrates provided opposite to each other, a storage capacitor bus line formed on either of the pair of substrates, a plurality of divisional areas which are a plurality of divisions of each of pixel regions arranged on either of the pair of substrates, a pixel electrode formed at each of the divisional areas, a thin film transistor formed at each of the divisional areas and connected to the pixel electrode, a common electrode formed on the other of the pair of substrates, a liquid crystal sealed between the pair of substrates, and a polymer obtained by polymerizing a polymeric component mixed in the liquid crystal while applying an AC voltage between the common electrode and the storage capacitor bus line.

A liquid crystal display in the fourth mode for carrying out the invention will be described with reference to FIGS. 39 to 49. First, a description will be made on a technique that constitutes a base of the present mode for carrying out the invention. In Japanese patent applications (numbered 2001-306906 and 2002-136128) made by the present applicant, a technique is disclosed in which an AC voltage is applied between a common electrode and a storage capacitor bus line as a method for applying a voltage to a liquid crystal layer when polymerizing a monomer or oligomer.

FIG. 39 schematically shows a configuration of a liquid crystal display in which the above-described technique is used. As shown in FIG. 39, a plurality of gate bus lines 112 extending in the horizontal direction in the figure are formed in parallel with each other on a TFT substrate. One end of each gate bus line 112 is connected to a gate bus line driving circuit 180 for driving the gate bus lines 112. A plurality of drain bus lines 114 extending in the vertical direction in the figure are formed in parallel with each other such that they intersect the gate bus lines 112 with an insulation film interposed between them. One end of each drain bus line 114 is connected to a drain bus line driving circuit 182 for driving the drain bus lines 114. A TFT 120 is formed in the vicinity of each of intersections between the gate bus lines 112 and the drain bus lines 114. A gate electrode of the TFT 120 is connected to the gate bus line 112, and a drain electrode of the same is connected to the drain bus line 114. A source electrode of the TFT is connected to a pixel electrode 116, a pixel electrode 116 being formed at each pixel.

A plurality of storage capacitor bus lines 118 are formed in parallel with the gate bus lines 112. A storage capacitor bus line 118 constitutes one electrode of a storage capacitor at each pixel. One end of each storage capacitor bus line 118 is electrically connected to a single common storage capacitor wiring 117. A common storage capacitor terminal 170 is provided at one end of the common storage capacitor wiring 117. A predetermined voltage Vcs can be applied to the common storage capacitor wiring 117 and the storage capacitor bus lines 118 through the common storage capacitor terminal 170.

A common electrode 142 is formed substantially on an entire surface of the opposite electrode. The common electrode 142 constitutes one electrode of a liquid crystal capacitance at each pixel. A common electrode terminal 172 is connected to the common electrode 142. A predetermined voltage Vc can be applied to the common electrode 142 through the common electrode terminal 172. The common storage capacitor wiring 117 and the common electrode 142 may be electrically connected after a step for polymerizing a monomer or oligomer to form a polymer.

Figure 40:
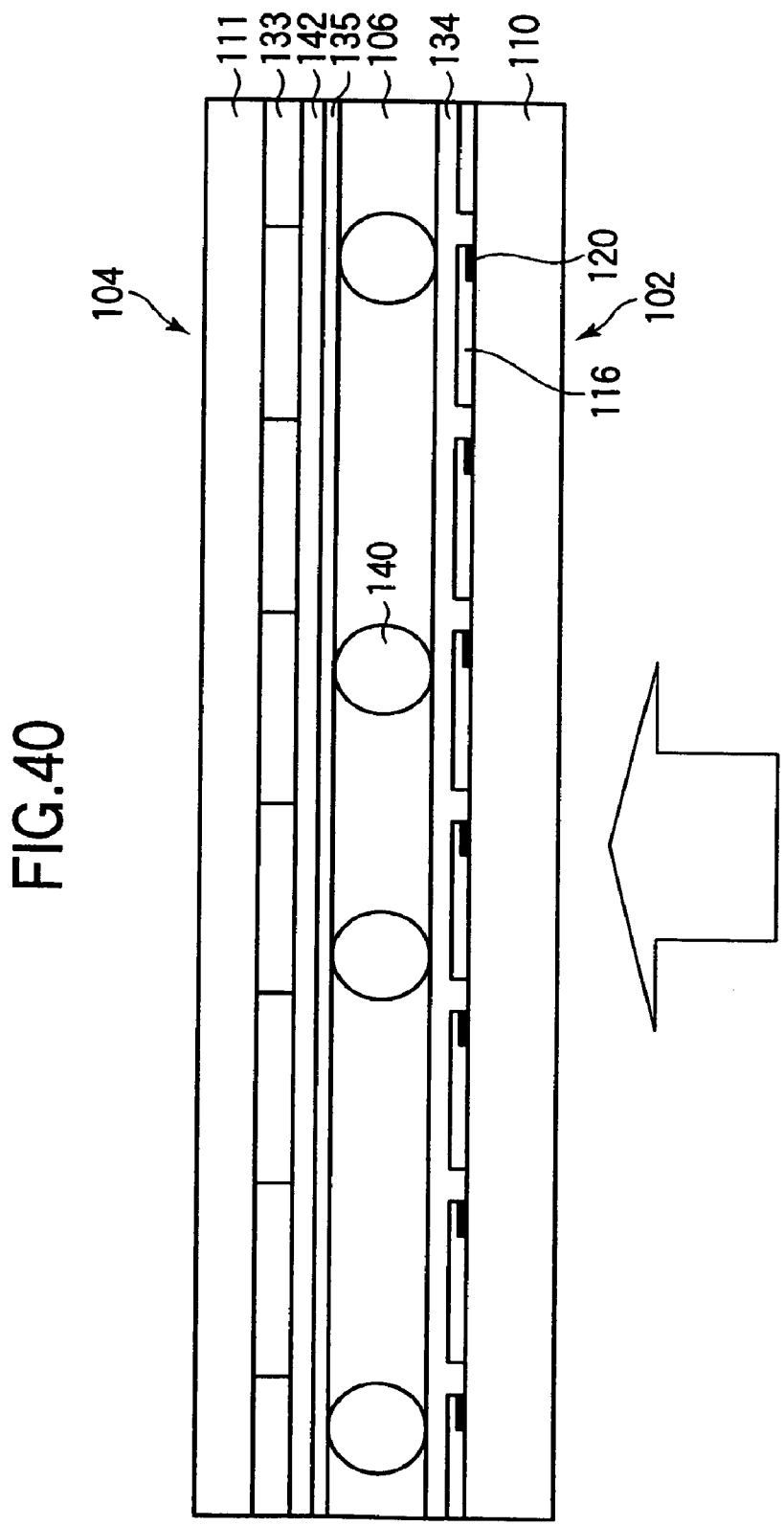
FIG. 40 is a sectional view showing a configuration of a liquid crystal display panel which constitutes a base of the fourth mode for carrying out the invention.

FIG. 40 shows a schematic sectional configuration of a liquid crystal display panel. As shown in FIG. 40, a liquid crystal 106 is sealed between a TFT substrate 102 and an opposite substrate 104 which are combined in a face-to-face relationship. TFTs 120, pixel electrodes 116 and a vertical alignment film 134 are formed on a glass substrate 110 constituting the TFT substrate 102. Color filter (CF) resin layers 133, a common electrode 142 and an alignment film 135 are formed on a glass substrate 111 constituting the opposite substrate 104. A cell gap is maintained between the substrates 102 and 104 by spherical spacers 140 dispersed on the TFT substrate 102 or opposite substrate 104.

When light (UV light) is radiated in the direction of the thick arrow in FIG. 40 with a voltage applied to the liquid crystal 106, a monomer or oligomer added in the liquid crystal 106 is polymerized to form a polymer. Thus, a predetermined pre-tilt angle is obtained as an initial state of alignment of liquid crystal molecules. The pre-tilt angle is smaller, the higher the voltage applied to the liquid crystal 106 when the polymer is formed.

When an AC voltage is applied between the common electrode 142 and storage capacitor bus lines 118, a circuit is formed at each pixel, the circuit comprising a liquid crystal capacitance Clc and a storage capacitor Cs which are coupled in series and across which the AC voltage is applied. The voltage applied to the liquid crystal 106 when a predetermined AC voltage is applied is expressed by the following equation where Zlc represents the impedance of the liquid crystal capacitance Clc, and Zc represents the impedance of the storage capacitor Cs.

Voltage Applied to Liquid Crystal=$Zlc/(Zlc+Zc)\times$ AC voltage  (Equation 1)

Next, the liquid crystal display in the present mode for carrying out the invention will be described with reference to FIG. 41. In order to ensure that areas having different pre-tilt angles of liquid crystal molecules will be formed in one pixel, a different voltage must be applied to each of the areas when the monomer or oligomer mixed in the liquid crystal 106 is polymerized. In the present mode for carrying out the invention, a plurality of pixel electrodes electrically insulated from each other or a plurality of pixel electrodes connected to each other through high resistance are formed in one pixel. For example, a plurality of pixel electrodes and a plurality of TFTs connected to the plurality of pixel electrodes, respectively, are formed in one pixel. Areas in which the pixel electrodes are formed are divisional areas which are a plurality of divisions of the pixel region.

When the liquid crystal 106 is irradiated with UV light, an AC voltage is applied between the common electrode 142 and the storage capacitor bus lines 118. At this time, the voltage applied to the liquid crystal 106 in each of the divisional areas is determined by the liquid crystal capacitance Clc and the storage capacitor Cs as indicated by Equation 1. As a result, a plurality of different voltages can be applied to the liquid crystal 106 in one pixel.

Figure 41:
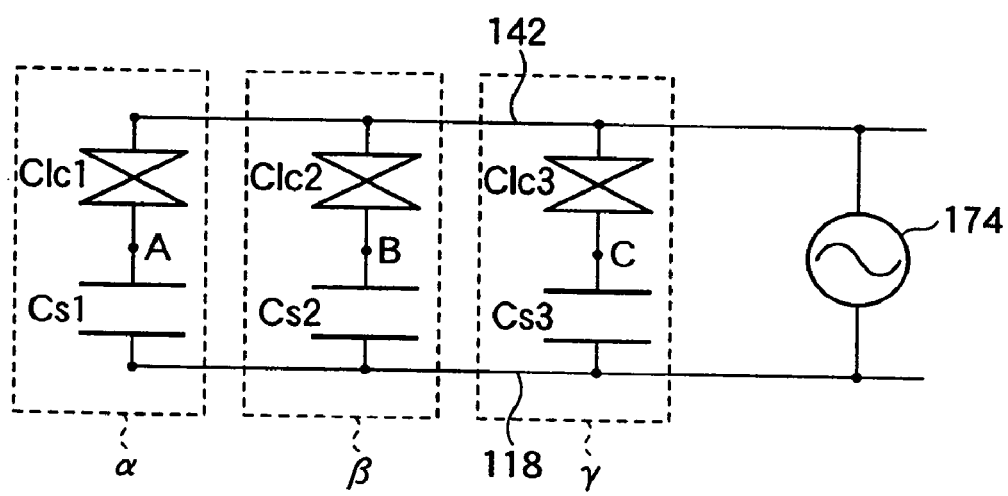
FIG. 41 shows an equivalent circuit of one pixel of a liquid crystal display in the fourth mode for carrying out the invention.

FIG. 41 shows an equivalent circuit of one pixel of the liquid crystal display, three divisional areas being formed in the single pixel. As shown in FIG. 41, the single pixel is divided into three divisional areas $\alpha$, $\beta$ and $\gamma$. The divisional area $\alpha$ has a liquid crystal capacitance Clc1 and a storage capacitor Cs1 which are connected in series. The divisional area $\beta$ has a liquid crystal capacitance Clc2 and a storage capacitor Cs2 which are connected in series. The divisional area $\gamma$ has a liquid crystal capacitance Clc3 and a storage capacitor Cs3 which are connected in series.

The common electrode 142 constitutes one electrode of each of the liquid crystal capacitances Clc1 to Clc3. A first pixel electrode formed at the divisional area $\alpha$ constitutes another electrode of the liquid crystal capacitance Clc1 and constitutes one electrode of the storage capacitor Cs1. A second pixel electrode formed at the divisional area $\beta$ constitutes another electrode of the liquid crystal capacitance Clc2 and constitutes one electrode of the storage capacitor Cs2. A third pixel electrode formed at the divisional area $\gamma$ constitutes another electrode of the liquid crystal capacitance Clc3 and constitutes one electrode of the storage capacitor Cs3. The storage capacitor bus line 118 constitutes another electrode of each of the storage capacitors Cs1 to Cs3. The pairs of the liquid crystal capacitance Clc1 and the storage capacitor Cs1, the liquid crystal capacitance Clc2 and the storage capacitor Cs2, and the liquid crystal capacitance Clc3 and the storage capacitor Cs3 are parallel-connected to each other.

When the monomer or oligomer mixed in the liquid crystal 106 is polymerized to form a polymer, the liquid crystal 106 is irradiated with, for example, UV light while applying an AC voltage between the common electrode 142 and the storage capacitor bus lines 118 by an AC power source 174.

Although not shown, a source electrode of a first TFT is connected to a connection point A; a source electrode of a second TFT is connected to a connection point B; and a source electrode of a third TFT is connected to a connection point C. Gate electrodes of the first through third TFTs are connected to the same gate bus line, and drain electrodes of the TFTs are connected to the same drain bus line. The first through third TFTs are all in an off-state in which high resistance is maintained during the polymer forming step.

When the high resistance state of the TFT is insufficient, a leakage current can be prevented by, for example, applying a low voltage to the gate bus line or using a plurality of TFTs in a case wherein p-Si is used. Further, a leakage current can be prevented by increasing the frequency of the AC voltage applied during polymerization.

Liquid crystal displays and methods of manufacturing the same in the present mode for carrying out the invention will now be described with reference to specific embodiments.
<Embodiment 4-1>

Figure 42:
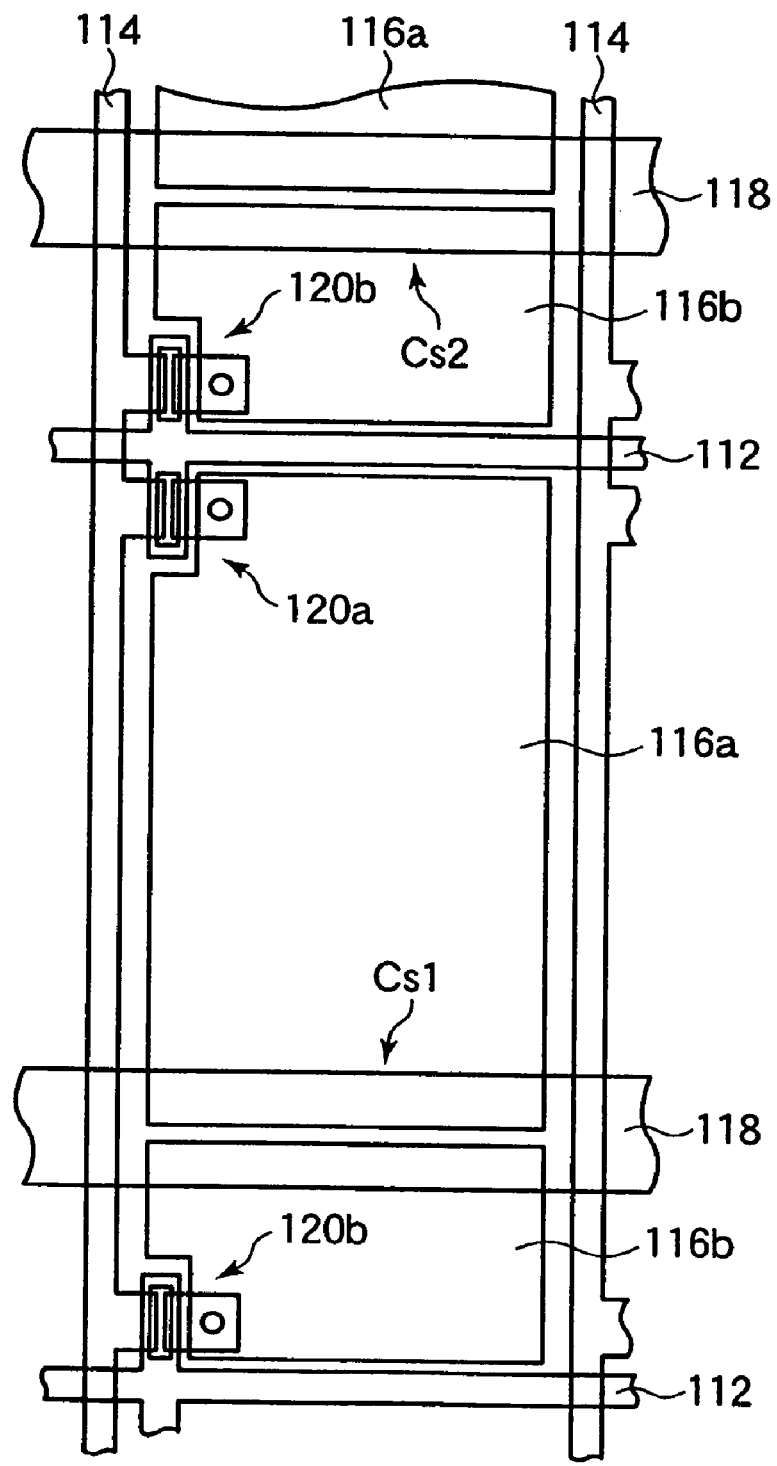
FIG. 42 shows a configuration of a liquid crystal display according to Embodiment 4-1 in the fourth mode for carrying out the invention.
Figure 43:
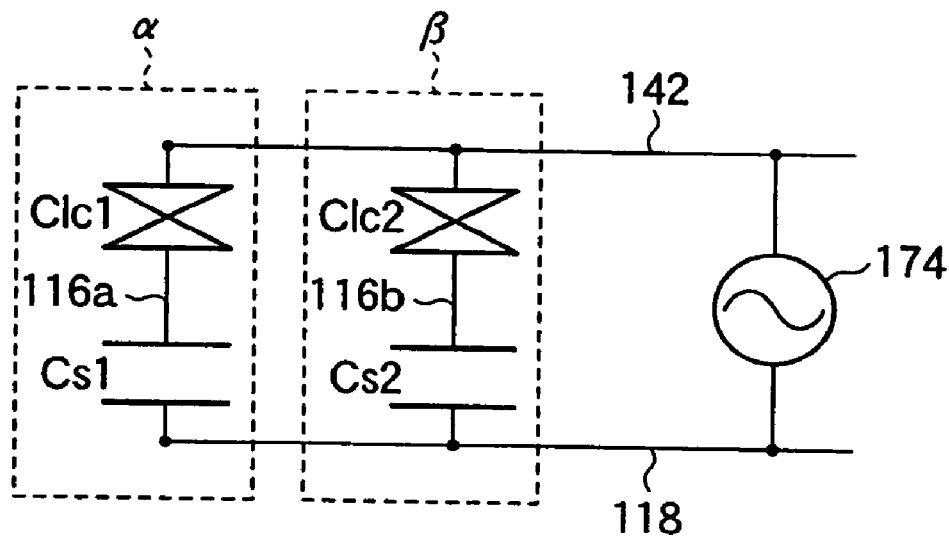
FIG. 43 shows an equivalent circuit of one pixel of the liquid crystal display according to Embodiment 4-1 in the fourth mode for carrying out the invention.

First, a liquid crystal display according to Embodiment 4-1 in the present mode for carrying out the invention will be described with reference to FIGS. 42 to 46. FIG. 42 shows a configuration of the liquid crystal display of the present embodiment. FIG. 43 shows an equivalent circuit of one pixel of the liquid crystal display of the present embodiment. As shown in FIGS. 42 and 43, two pixel electrodes 116a and 116b are formed at one pixel such that they are separated from each other with a gate bus line 112 interposed between them. The area where the pixel electrode 116a is formed constitutes a divisional area $\alpha$, and the area where the pixel electrode 116b is formed constitutes a divisional area $\beta$. The pixel electrode 116a is electrically connected to a source electrode of a TFT 120a, and the pixel electrode 116b is electrically connected to a source electrode of a TFT 120b. Gate electrodes of the TFTs 120a and 120b are electrically connected to the same gate bus line 112, and drain electrodes of the TFTs are electrically connected to the same drain bus line 114.

A common electrode 142 (not shown in FIG. 42) constitutes one electrode of each of liquid crystal capacitances Clc1 and Clc2. The pixel electrode 116a constitutes another electrode of the liquid crystal capacitance Clc1 and constitutes one electrode of a storage capacitor Cs1. The pixel electrode 116b constitutes another electrode of the liquid crystal capacitance Clc2 and constitutes one electrode of a storage capacitor Cs2. A storage capacitor bus line 118 constitutes another electrode of each of the storage capacitors Cs1 and Cs2. The pair of the liquid crystal capacitance Clc1 and the storage capacitor Cs1 and the pair of the liquid crystal capacitance Clc2 and the storage capacitor Cs2 are parallel-connected to each other.

What is required to achieve different pre-tilt angles of liquid crystal molecules in the two areas α and β is to fabricate the liquid crystal display panel such that each of the divisional areas has a different capacitance ratio between the liquid crystal capacitance Clc and the storage capacitor Cs, thereby allowing different voltages to be applied to the liquid crystal 106. That is, the liquid crystal display panel is to be fabricated to satisfy the following expression.

$$Cs1/(Cs1+Clc1) \neq Cs2/(Cs2+Clc2)$$

For example, in order to apply voltages to the liquid crystal 106 in the divisional areas α and β such that there will be a difference of 10 V, the AC voltage is set at ±30 V, and ratios Clc1:Cs1 and Clc2:Cs2 are set at 200 fF:150 fF (1 fF=$10^{-15}$ F) and 50 fF:164 fF, respectively. Thus, a voltage of ±13 V is applied to the liquid crystal 106 in the divisional area α, and a voltage of ±23 V higher than that in the divisional area α is applied to the liquid crystal 106 in the divisional area β. Therefore, the pre-tilt angle in the divisional area β becomes smaller than the pre-tilt angle in the divisional area α.

In order to make the capacitances formed in the divisional areas α and β (the sums of Clc and Cs) equal to each other, for example, the AC voltage is set at ±23 V, and ratios Clc1:Cs1 and Clc2:Cs2 are set at 200 fF:150 fF and 50 fF:300 fF, respectively. Thus, a voltage of ±10 V is applied to the liquid crystal 106 in the divisional area α, and a voltage of ±20 V is applied to the liquid crystal 106 in the divisional area β. Therefore, the pre-tilt angle in the divisional area β becomes smaller than the pre-tilt angle in the divisional area α.

Figure 44:
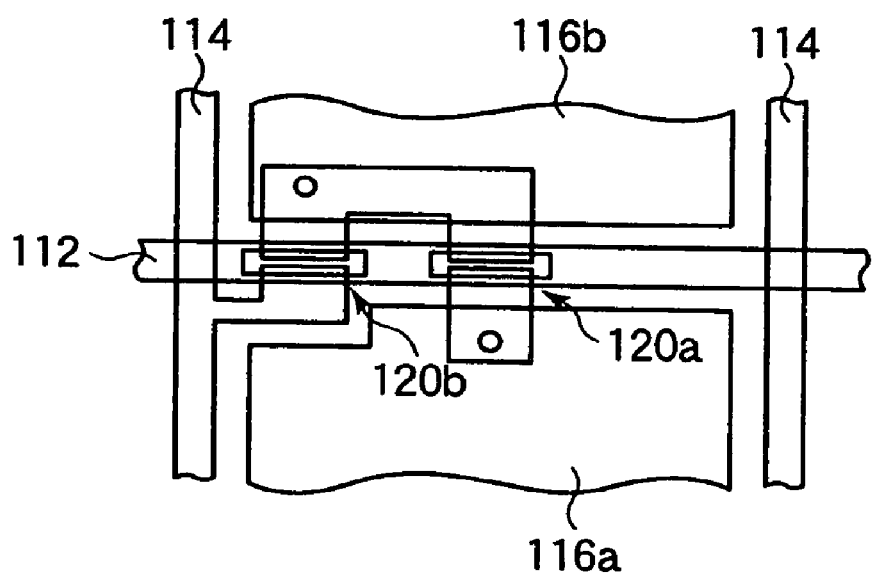
FIG. 44 shows a modification of the configuration of the liquid crystal display of Embodiment 4-1 in the fourth mode for carrying out the invention.

FIG. 44 shows a modification of the configuration of the liquid crystal display of the present embodiment. In the present modification, as shown in FIG. 44, a TFT 120b is formed between a drain bus line 114 and a pixel electrode 116b, and a TFT 120a is formed between the pixel electrode 116b and a pixel electrode 116a. That is, a drain electrode of the TFT 120b is connected to the drain bus line 114, and a source electrode of the TFT is connected to the pixel electrode 116b. A drain electrode of the TFT 120a is connected to the pixel electrode 116b, and a source electrode of the TFT is connected to the pixel electrode 116a. Gate electrodes of the TFTs 120a and 120b are parts of the same gate bus line 112. The pixel electrodes 116a and 116b are separated from each other with the TFT 120a interposed between them. For example, when TFTs formed using p-Si are used, three or more divisional areas may be formed, and TFTs connected to respective divisional areas may be connected in series.

Figure 45:
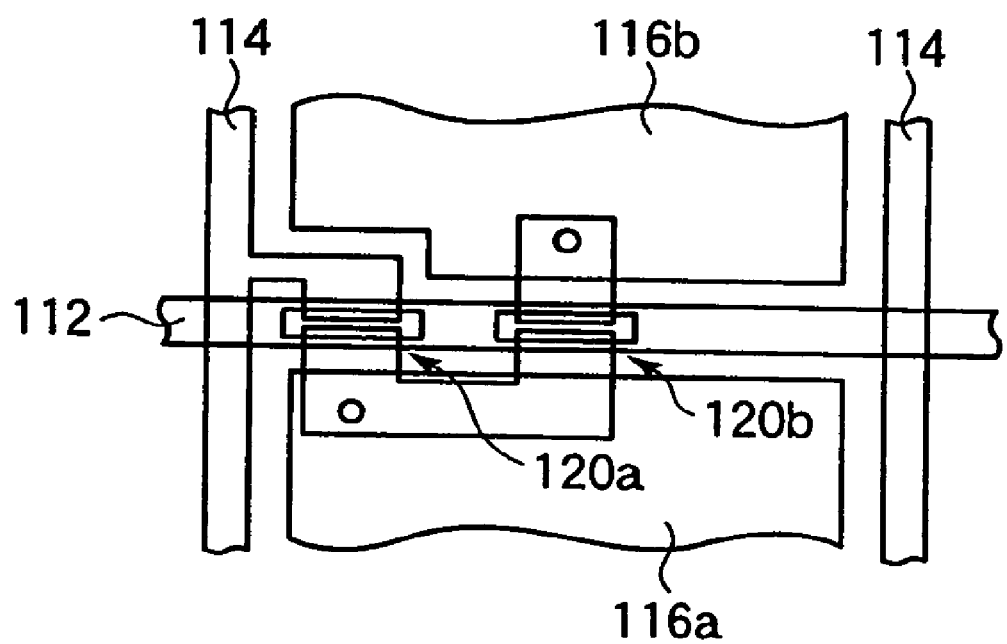
FIG. 45 shows another modification of the configuration of the liquid crystal display of Embodiment 4-1 in the fourth mode for carrying out the invention.

FIG. 45 shows another modification of the configuration of the liquid crystal display of the present embodiment. In the present modification, as shown in FIG. 45, a TFT 120a is formed between a drain bus line 114 and a pixel electrode 116a, and a TFT 120b is formed between the pixel electrode 116a and a pixel electrode 116b. That is, a drain electrode of the TFT 120a is connected to the drain bus line 114, and a source electrode of the TFT is connected to the pixel electrode 116a. A drain electrode of the TFT 120b is connected to the pixel electrode 116a, and a source electrode of the TFT is connected to the pixel electrode 116b. Gate electrodes of the TFTs 120a and 120b are parts of the same gate bus line 112. The pixel electrodes 116a and 116b are separated from each other with the TFT 120b interposed between them.

Figure 46:
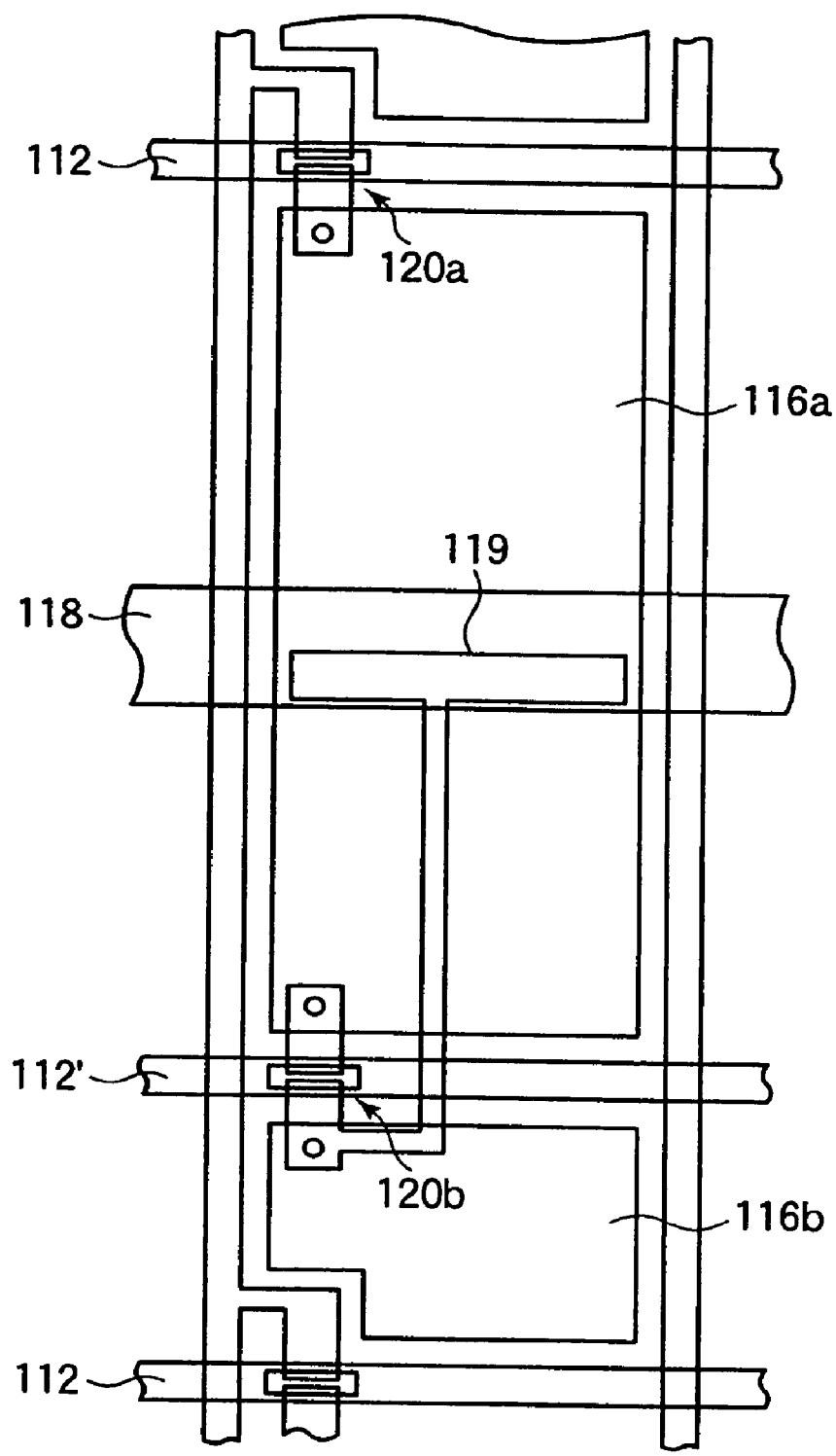
FIG. 46 shows still another modification of the configuration of the liquid crystal display of Embodiment 4-1 in the fourth mode for carrying out the invention.

FIG. 46 shows still another modification of the configuration of the liquid crystal display of the present embodiment. In the present modification, as shown in FIG. 46, a TFT 120b is formed between a pixel electrode 116a and a pixel electrode 116b. A gate electrode of a TFT 120a is part of a gate bus line 112, and a gate electrode of the TFT 120b is part of another gate bus line 112'. A storage capacitor Cs1 is formed between the pixel electrode 116a and a storage capacitor bus line 118, and a storage capacitor Cs2 is formed between a storage capacitor electrode 119 electrically connected to the pixel electrode 116a and the storage capacitor bus line 118. The pixel electrodes 116a and 116b are separated from each other with the TFT 120b interposed between them. The TFT 120b is in the off-state at the step of irradiating the liquid crystal 106 with UV light. A predetermined voltage is always applied to the gate bus line 112' during actual driving, and the TFT 120b is always in an on-state during actual driving.

In the present embodiment, since a different pre-tilt angle can be achieved in each of a plurality of divisional areas, it is possible to avoid the problem that a displayed image appears whitish when viewed in a direction oblique to the display screen, which allows preferable display characteristics to be achieved.

<Embodiment 4-2>

A liquid crystal display according to Embodiment 4-2 in the present mode for carrying out the invention will now be described with reference to FIG. 47. When a liquid crystal display is actually driven, a final pixel potential at each pixel electrode is under influence of a voltage waveform on each bus line. In particular, a pixel potential frequently undergoes a significant fluctuation under the influence of a gate waveform. In the present embodiment, the influence of fluctuations of a pixel potential is suppressed by properly setting the values of parasitic capacitances Cgs between two divisional areas α and β, for example.

Figure 47:
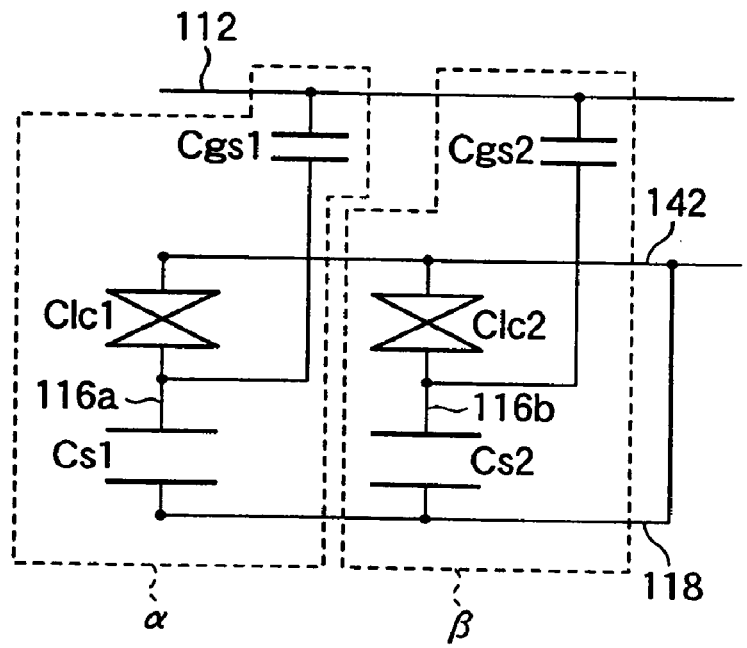
FIG. 47 shows an equivalent circuit of one pixel of a liquid crystal display according to Embodiment 4-2 in the fourth mode for carrying out the invention.

FIG. 47 shows an equivalent circuit of one pixel of a liquid crystal display according to the present embodiment. As shown in FIG. 47, a divisional area α having a pixel electrode 116a formed therein and a divisional area β having a pixel electrode 116b formed therein are formed in the single pixel. A common electrode 142 and a storage capacitor bus line 118 are connected after a monomer or oligomer in a liquid crystal 106 is polymerized. In general, a feed-through voltage attributable to a gate waveform during actual driving has different values at the pixel electrodes 116a and 116b. In order to make the values of the feed-through voltage at the pixel electrodes 116a and 116b substantially equal to each other, what is required is to design the magnitudes of parasitic capacitances Cgs1 and Cgs2 such that the following expression is true.

$$Cgs1/(Cs1+Clc1)=Cgs2/(Cs2+Clc2)$$

According to the present embodiment, any reduction in the display quality of the liquid crystal display can be prevented. Even when the feed-through voltage values at the pixel electrodes 116a and 116b are not equal to each other, any reduction in display quality can be suppressed by designing the magnitudes of the parasitic capacities Cgs1 and Cgs2 such that the following expression is true.

$$0.7<[Cgs1/(Cs1+Clc1)]/[Cgs2/(Cs2+Clc2)]<1.3$$

<Embodiment 4-3>

Figure 48:
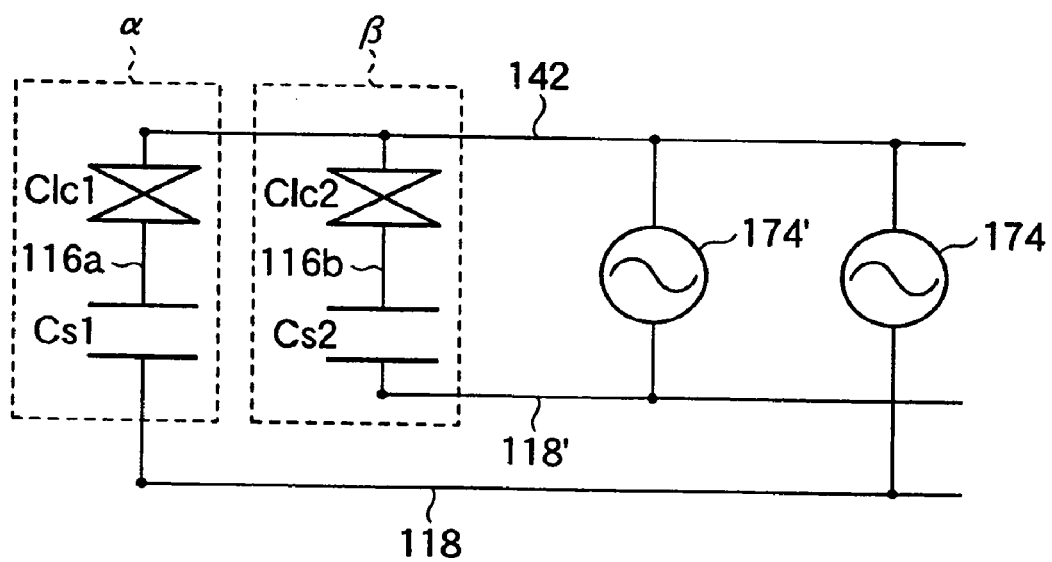
FIG. 48 shows an equivalent circuit of one pixel of a liquid crystal display according to Embodiment 4-3 in the fourth mode for carrying out the invention.

A liquid crystal display according to Embodiment 4-3 in the present mode for carrying out the invention will now be described with reference to FIG. 48. FIG. 48 shows an equivalent circuit of one pixel of the liquid crystal display of the present embodiment. As shown in FIG. 48, in the present embodiment, storage capacitor bus lines 118 and 118' are formed for divisional areas α and β, respectively. A TFT 120 which is formed at each pixel must be designed in consideration of balance between (1) a voltage applied to a liquid crystal 106 during polymerization, (2) the capability of driving the pixel during actual driving and (3) the ratio of the same to a pixel capacitance that compensates for various irregularities. When the storage capacitor bus lines 118 and 118' are independently formed for each of the divisional areas α and β, AC voltages having different amplitudes and frequencies can be applied to the liquid crystal 106 in each of the divisional areas α and β using a plurality of AC power sources 174 and 174', which will significantly relax the restriction pointed out in the above item (1).

<Embodiment 4-4>

Figure 49:
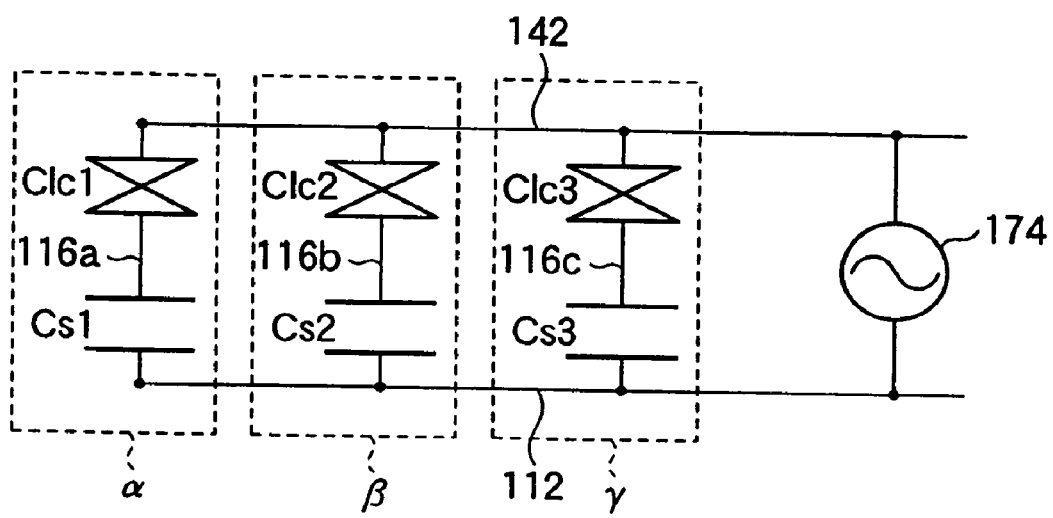
FIG. 49 shows an equivalent circuit of one pixel of a liquid crystal display according to Embodiment 4-4 in the fourth mode for carrying out the invention.

A liquid crystal display according to Embodiment 4-4 in the present mode for carrying out the invention will be described with reference to FIG. 49. FIG. 49 shows an equivalent circuit of one pixel of the liquid crystal display of the present embodiment. As shown in FIG. 49, the liquid crystal display of the present embodiment has a Cs-on-Gate structure in which a gate bus line 112 constitutes one electrode of a storage capacitor Cs. Storage capacitances Cs1 to Cs3 are formed between respective pixel electrodes 116*a* to 116*c* and the gate bus line 112. The present embodiment is similar to Embodiment 4-1 in that a different voltage can be applied to a liquid crystal 106 in each divisional area by fabricating the liquid crystal panel such that each divisional area has a different capacitance ratio between a liquid crystal capacitance Clc and a storage capacitor Cs. It is also possible to combine storage capacitors Cs formed between the pixel electrodes 116*a* to 116*c* and the gate bus line 12 and storage capacitors Cs formed between the pixel electrodes 116*a* to 116*c* and a storage capacitor bus line 118.

The present mode for carrying out the invention makes it possible to provide a liquid crystal display which can achieve high display characteristics.

(Fifth Mode for Carrying Out the Invention)

A method of manufacturing a liquid crystal display in a fifth mode for carrying out the invention will now be described with reference to FIGS. 50 to 55D. The present mode for carrying out the invention relates to a method of manufacturing a VA mode liquid crystal display in which the alignment of the liquid crystal is regulated.

MVA-LCDs have been proposed as liquid crystal displays having a wide viewing angle (see Patent Document 3, for example). In an MVA-LCD, liquid crystal molecules are aligned substantially perpendicularly to a substrate surface when no voltage is applied. When a voltage is applied, liquid crystal molecules are divided into four areas in one pixel and are tilted in four different directions, respectively. Viewing angle characteristics in those areas are mixed, and a wide viewing angle is consequently achieved.

On the contrary, Methods for providing liquid crystal molecules with a pre-tilt angle include a method in which a liquid crystal display panel is filled with a liquid crystal composition including a polymerizable resin (a resin which is polymerized into a polymer liquid crystal) and in which the resin is polymerized by irradiating it with light while applying a voltage to the liquid crystal to obtain a pre-tilt angle having an azimuth in the direction in which liquid crystal molecules are inclined (see Japanese patent application No. 2002-90523 made by the present applicant, for example). A pre-tilt angle obtained using this method varies depending on the voltage applied to the liquid crystal at the time of irradiation with light. Specifically, the pre-tilt angle of liquid crystal molecules tends to become smaller (or the angle of inclination from a direction perpendicular to the substrate surface increases), the higher the applied voltage.

In an MVA-LCD, when white or black is displayed, a contrast ratio of 10 or more is achieved at upward, downward, leftward and rightward viewing angles at an inclination of 80°. In an MVA-LCD, it is required to determine the direction of alignment of liquid crystal molecules in advance by forming bank-shaped alignment regulating structures constituted by a resin on at least either substrate.

However, a common MVA-LCD has a problem in that it has low chromatic reproducibility relative to viewing angles. The problem is encountered when liquid crystal molecules are aligned in a plurality of directions. When azimuths of alignment of liquid crystal molecules are opposite to each other (or 180° different from each other), there is a difference between T-V characteristics at the respective azimuths when viewed in an oblique direction. When the LCD is actually viewed in an oblique direction, it will have T-V characteristics which are a combination of the T-V characteristics at the respective azimuths. Although no problem therefore occurs in display of black and white, when a color image is displayed, there will be significant differences in color tones between a view in a direction square to the display and a view in an oblique direction.

It is therefore required to reduce changes in T-V characteristics that occur when the display screen is viewed in an oblique direction. Especially, inversion of T-V characteristics that occurs at low gradations must be eliminated and, if not eliminated, differences in luminance at low gradations must be reduced.

As a method for solving this, studies are being made on a technique for improving gradation/viewing angle characteristics in which a plurality of T-V characteristics are combined in one pixel to moderate waviness of a T-V curve when viewed in an oblique direction. There are various possible methods for varying T-V characteristics in one pixel. Let us now consider realizing a state in which liquid crystal molecules have a plurality of pre-tilt angles in one pixel.

In the present mode for carrying out the invention, the following method is used to vary a pre-tilt angle in one pixel utilizing the phenomenon that a pre-tilt angle of a liquid crystal mixed with a polymeric component changes as a result of a change of a voltage applied to the liquid crystal when irradiating it with light.

(1) When a liquid crystal is irradiated with light, only part of one pixel is allowed to be irradiated using a mask instead of uniformly irradiating the pixel as a whole.

(2) When the area irradiated with light is moved, the applied voltage is changed.

A plurality of pre-tilt angles can be provided in one pixel using the above-described method. A plurality of T-V characteristics can be thus provided in one pixel, and differences in viewing angle characteristics between a view in an oblique direction and a view in a square direction can be reduced when the characteristics are combined. This contributes to a reduction of drifts of chromaticity in the view in an oblique direction. The present mode for carrying out the invention will now be described with reference to specific embodiments.

<Embodiment 5-1>

Figure 50:
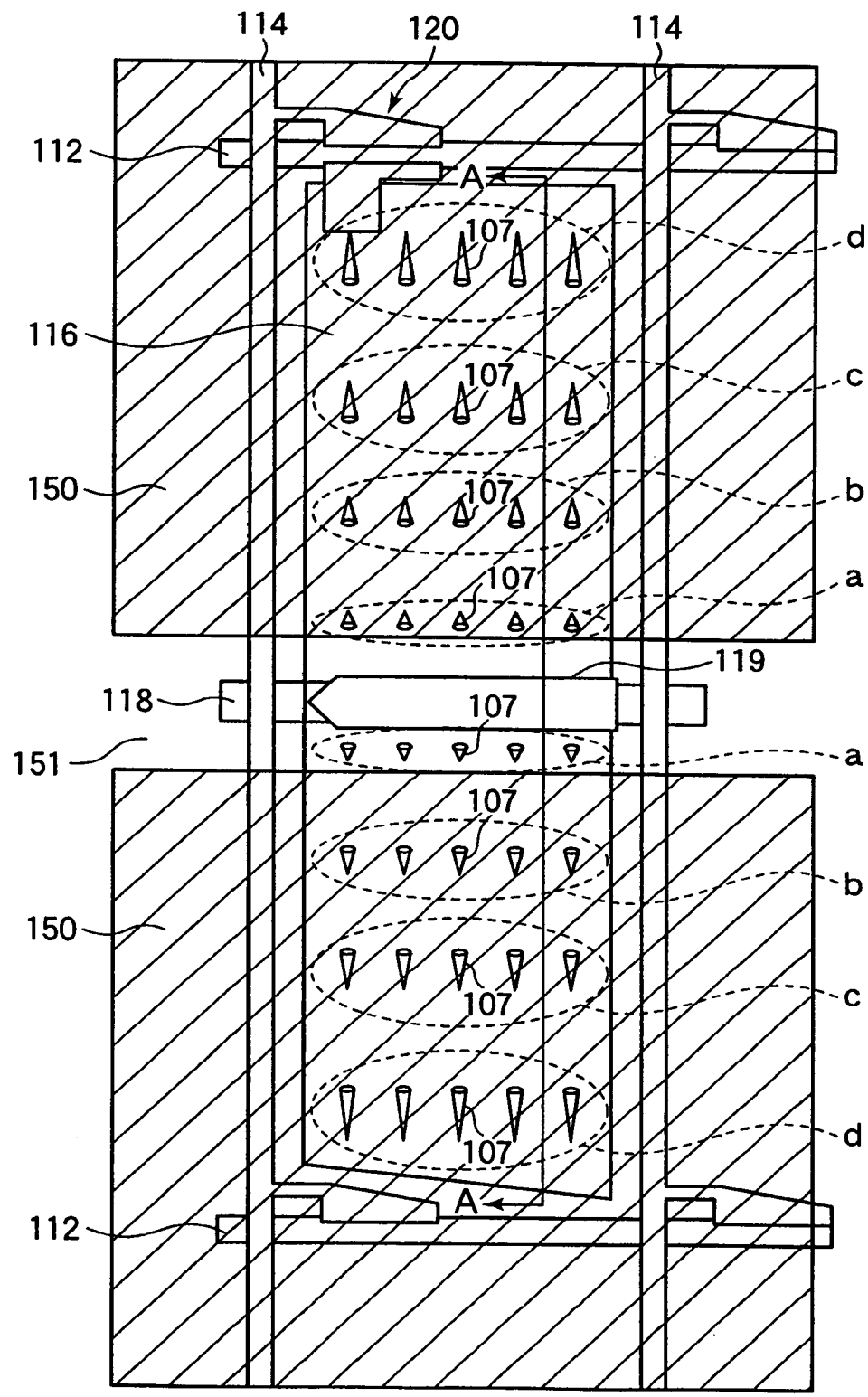
FIG. 50 shows a configuration of a liquid crystal display fabricated using a method of manufacturing a liquid crystal display according to Embodiment 5-1 in a fifth mode for carrying out the invention.
Figure 51:
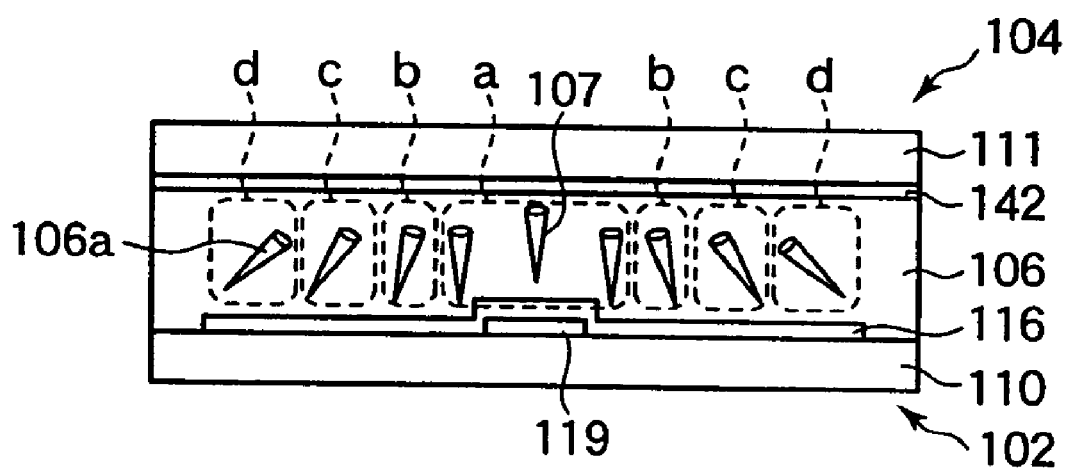
FIG. 51 is a sectional view showing a schematic configuration of the liquid crystal display taken along the line A-A in FIG. 50.

First, a method of manufacturing a liquid crystal display according to Embodiment 5-1 in the present mode for carrying out the invention will be descried with reference to FIGS. 50 to 52D. FIG. 50 shows a configuration of one pixel of a liquid crystal display fabricated using the method of manufacturing a liquid crystal display according to the present embodiment. FIG. 51 shows a schematic sectional configuration of the liquid crystal display taken along the line A-A in FIG. 50. As shown in FIGS. 50 and 51, one pixel of the liquid crystal display has two alignment regions in which liquid crystal molecules 107 are tilted in different directions.

Drain bus lines 114 and gate bus lines 112 both having a width of 7 μm are formed on a TFT substrate 102. Pixel electrodes 116 which are solid electrodes constituted by ITOs are formed at pixel regions defined by the bus lines 112 and 114. For example, the pitch of the pixels in the longitudinal direction thereof (or the direction in which the drain bus lines 114 extend, which holds true hereinafter) is 300 μm. On the contrary, for example, the pitch of the pixels in the transverse direction thereof (or the direction in which the gate bus lines 112 extend, which holds true hereinafter) is 100 μm. Storage capacitor electrodes 119 are provided substantially in the middle of the pixel regions.

A pixel electrode 116 may be formed with, for example, fine slits extending in a plurality of directions in order to control the alignment of a liquid crystal 106. A pixel electrode 116 may be formed by combining a plurality of electrode units which are in one or plural types of configurations and which are adjacent to each other with slits interposed between them.

Although not shown, a black matrix (BM) having a width of 23 μm in the longitudinal direction thereof are provided on an opposite substrate 104 provided opposite to the TFT substrate 102, the black matrix having pitches of 300 μm and 100 μm which are the same the pixel pitches. CF resin layers in red, green and blue are formed at each opening of the black matrix. A common electrode 142 which is a solid electrode constituted by an ITO is formed throughout the substrate over the CF resin layers. A liquid crystal (a liquid crystal composition) 106 including a polymerizable resin (which is polymerized into a polymer liquid crystal) is charged and sealed between the substrates 102 and 104.

The liquid crystal display panel having the above-described configuration is irradiated with light from the side of the opposite substrate 104 to polymerize the polymeric component. A pixel is partially irradiated with light using a mask (photo-mask) 150 instead of irradiating the pixel as a whole with light. Specifically, the mask 150 used here has openings 151 in the form of slits having a width of, for example, 20 μm and extending in the horizontal direction in the figure. The width of the opening 151 is smaller than the width of the pixel region in the vertical direction in the figure. The openings 151 are provided at a pitch of 300 μm which is the same as the pixel pitch.

Figure 52A:
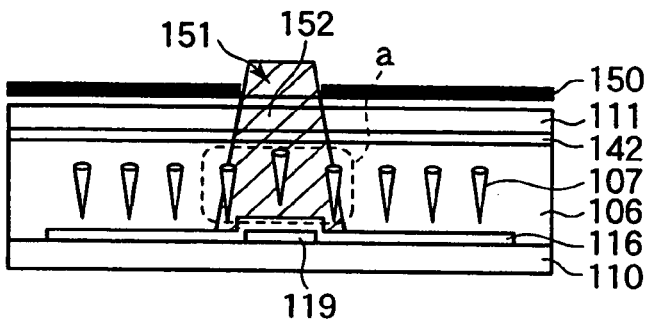
FIGS. 52A to 52D are sectional views showing the method of manufacturing the liquid crystal display according to Embodiment 5-1 in the fifth mode for carrying out the invention.

FIGS. 52A to 52D are sectional views showing the method of manufacturing the liquid crystal display according to the present embodiment. First, as shown in FIG. 52A, the mask 150 is placed directly above the opposite substrate 104 with a central section of a pixel region aligned with an opening 151. When scattered light 152 is projected from above the mask 150, the liquid crystal 106 in an area a is irradiated with the light 152 through the opening 151 to polymerize the polymeric component. At this time, a voltage of 0 V is applied (no voltage is applied) to the liquid crystal 106. In the area a, the pre-tilt angle becomes the vertical (90°) because the polymeric component is polymerized with no voltage applied.

Figure 52B:
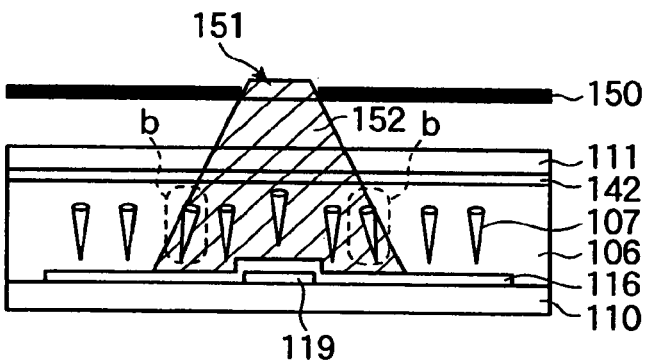

Next, as shown in FIG. 52B, the mask 150 is elevated relative to the liquid crystal display panel (to provide an interval of 50 μm between the bottom surface of the mask 150 and the top surface of the opposite substrate 104, for example) without making any change in the positional relationship between the central section of the pixel region and the opening 151 in a plan view. Since the interval between the mask 150 and the liquid crystal panel increases, the area irradiated with the light 152 through the opening 151 is increased, and an area b will now be irradiated with the light 152 in addition to the area a. At this time, for example, a voltage of 2.5 V is applied to the liquid crystal 106. As a result, the area b is irradiated with the light 152 in a state in which liquid crystal molecules 107 are inclined. Since the area b is thus irradiated with light while the liquid crystal is inclined, a predetermined pre-tilt angle is achieved in the direction in which the liquid crystal molecules are inclined. No change occurs in the pre-tilt angle which has already been achieved in the area a.

Figure 52C:
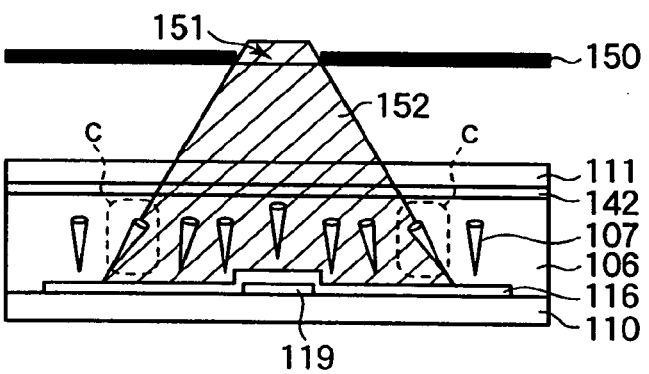
Figure 52D:
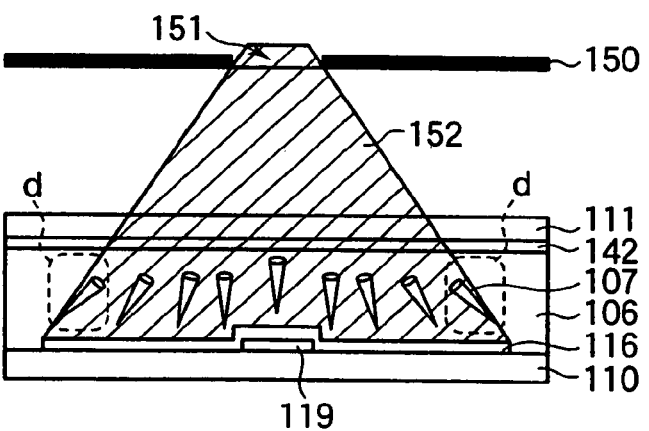
Figure 53A:
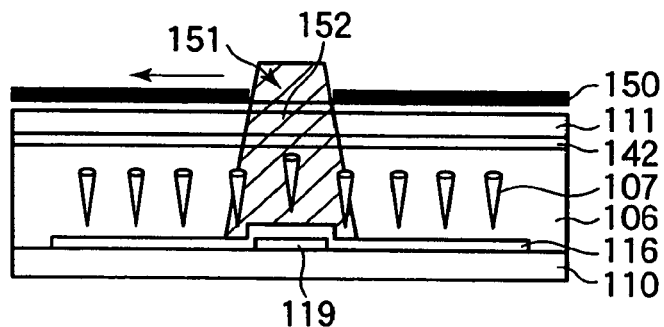
FIGS. 53A to 53D are sectional views showing a method of manufacturing a liquid crystal display according to Embodiment 5-2 in the fifth mode for carrying out the invention.
Figure 53B:
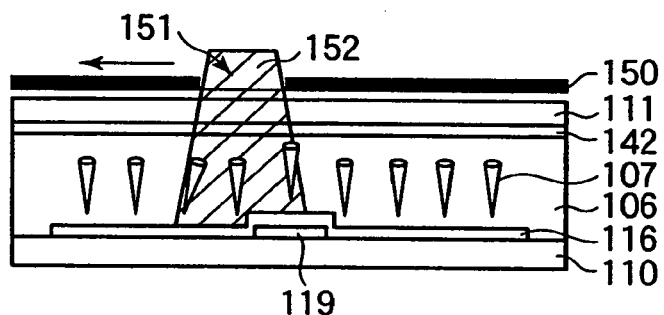
Figure 53C:
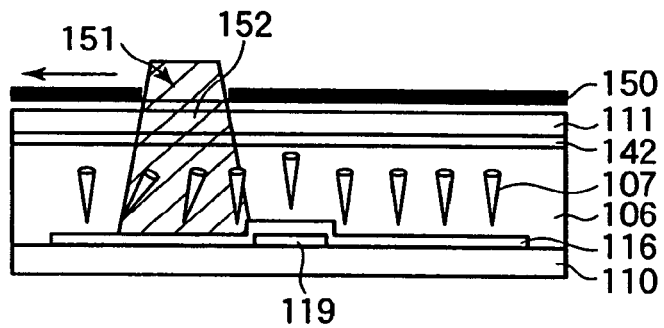
Figure 53D:
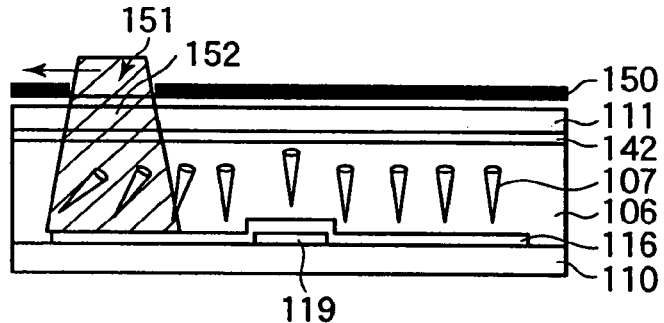

Thereafter, as shown in FIGS. 52C and 52D, the range irradiated with the light 152 is gradually extended, and the voltage applied to the liquid crystal 106 is gradually increased. As a result, liquid crystal molecules 107 in the area a in the middle of the pixel are provided with a great pre-tilt angle, and liquid crystal molecules in areas b, c and d are provided with respective pre-tilt angles that become smaller in the order in which the areas are listed above. That is, since liquid crystal molecules 107 in one pixel can be provided with a plurality of pre-tilt angles, the single pixel has a plurality of T-V characteristics. This makes it possible to improve chromatic characteristics when viewed in an oblique direction.

<Embodiment 5-2>

A method of manufacturing a liquid crystal display according to Embodiment 5-2 in the present mode for carrying out the invention will now be described with reference to FIGS. 53A to 53D. FIGS. 53A to 53D are sectional views showing the method of manufacturing a liquid crystal display according to the present embodiment. The present embodiment is characterized in that a mask 150 is moved in a direction different from that in Embodiment 5-1. As shown in FIGS. 53A to 53D, in the present embodiment, the mask 150 is moved from a central section of a pixel region in the longitudinal direction of the same (the horizontal direction in FIGS. 53a to 53D) to move the range of irradiation with light 152 gradually, and a voltage applied to a liquid crystal 106 is gradually increased. As a result, liquid crystal molecules 107 in an area a in the middle of the pixel is provided with a great pre-tilt angle, and liquid crystal molecules 107 in areas b, c and d are provided with respective pre-tilt angles which gradually decrease in the order in which the areas are listed above. That is, since liquid crystal molecules 107 in one pixel can be provided with a plurality of pre-tilt angles, the single pixel has a plurality of T-V characteristics. This makes it possible to improve chromatic characteristics when viewed in an oblique direction.

<Embodiment 5-3>

Figure 54A:
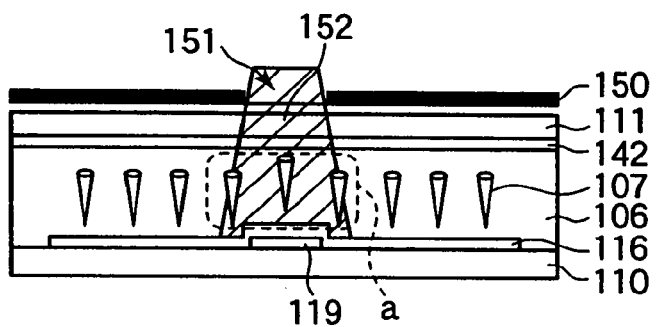
FIGS. 54A to 54D are sectional views showing a method of manufacturing a liquid crystal display according to Embodiment 5-3 in the fifth mode for carrying out the invention.
Figure 54B:
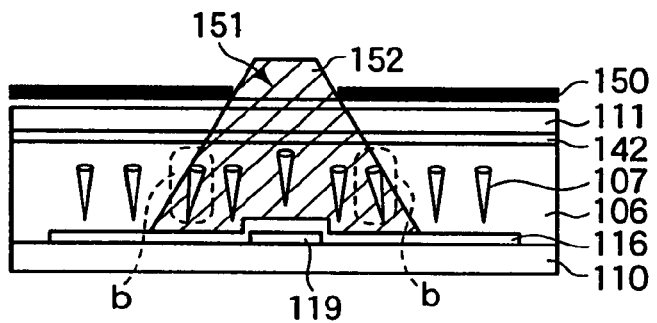
Figure 54C:
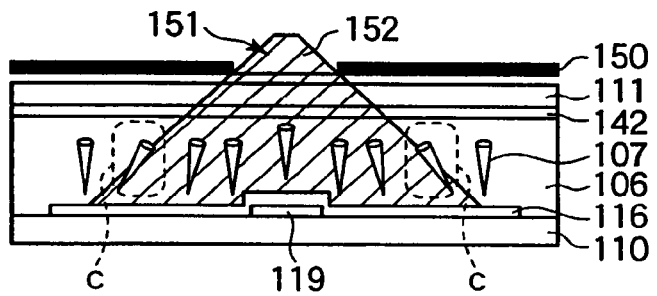
Figure 54D:
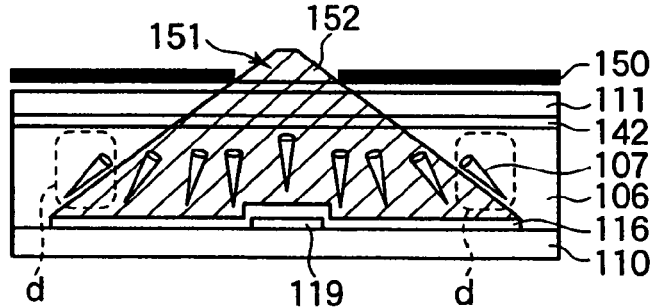

A method of manufacturing a liquid crystal display according to Embodiment 5-3 in the present mode for carrying out the invention will now be described with reference to FIGS. 54A to 54D. FIGS. 54A to 54D are sectional views showing the method of manufacturing a liquid crystal display according to the present embodiment. In comparison to Embodiment 5-1, the present embodiment is characterized in that an optical system capable of controlling scattering of light to change scattering of light 152 without moving a mask 150. As shown in FIG. 54A, an opening 151 in the mask 150 is smaller in width than a pixel region and positioned above a central section of the pixel. At an initial phase, since the scattering of the light 152 is relatively small, the area irradiated with the light 152 is small. Thereafter, the scattering of the light is gradually increased as shown in FIGS. 54B to 54D, and a voltage applied to a liquid crystal 106 is gradually increased. As a result, liquid crystal molecules 107 in an area a in the middle of the pixel is provided with a great pre-tilt angle, and liquid crystal molecules 107 in areas b, c and d are provided with respective pre-tilt angles which gradually decrease in the order in which the areas are listed above. That is, since liquid crystal molecules 107 in one pixel can be provided with a plurality of pre-tilt angles, the single pixel has a plurality of T-V characteristics. This makes it possible to improve chromatic characteristics when viewed in an oblique direction.

<Embodiment 5-4>

A method of manufacturing a liquid crystal display according to Embodiment 5-4 in the present mode for carrying out the invention will now be described with reference to FIGS. 55A to 55D. FIGS. 55A to 55D are sectional views showing the method of manufacturing a liquid crystal display according to the present embodiment. The present embodiment includes a step of forming a mask 154 constituted by, for example, a metal layer on a surface of a glass substrate 111 constituting an opposite substrate 104 which is to be irradiated by light (the top surface in FIGS. 55A to 55D) before radiating light 152. The present embodiment also includes a step of removing the mask 154 after a polymeric component in a liquid crystal 106 is polymerized by irradiating it with the light 152. The present embodiment also employs an optical system capable of controlling scattering of light similarly to Embodiment 5-3 to change scattering of the light 152.

Figure 55A:
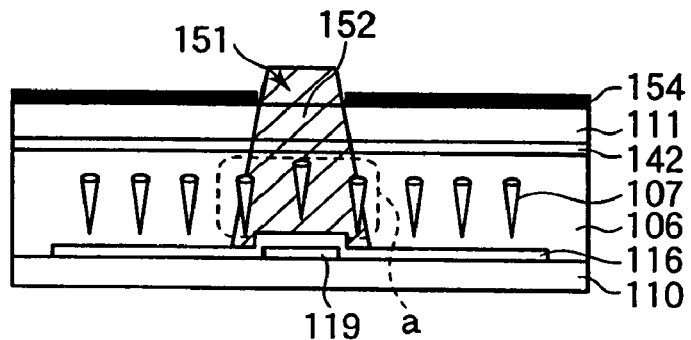
FIGS. 55A to 55D are sectional views showing a method of manufacturing a liquid crystal display according to Embodiment 5-4 in the fifth mode for carrying out the invention.
Figure 55B:
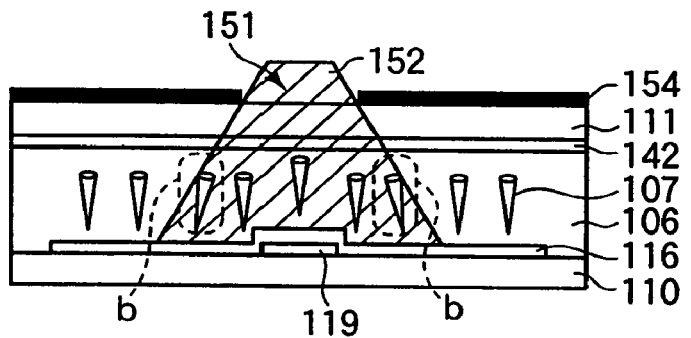
Figure 55C:
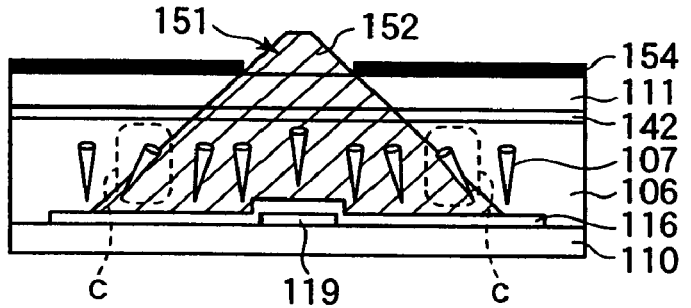
Figure 55D:
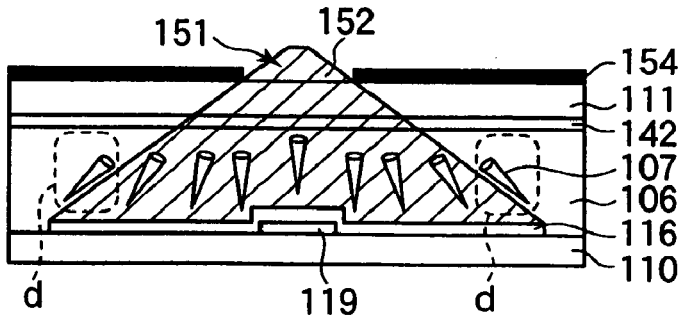

As shown in FIG. 55A, the mask 154 is formed with an opening 151 having a smaller width than the width of a pixel region, located above a central section of the pixel region. At an initial phase, since the scattering of the light 152 is relatively small, the area irradiated with the light 152 is small. Thereafter, the scattering of the light is gradually increased as shown in FIGS. 55B to 55D, and a voltage applied to the liquid crystal 106 is gradually increased. As a result, liquid crystal molecules 107 in an area a in the middle of the pixel is provided with a great pre-tilt angle, and liquid crystal molecules 107 in areas b, c and d are provided with respective pre-tilt angles which become smaller in the order in which the areas are listed above. Thereafter, the mask 154 formed on the glass substrate 111 is removed. In the present embodiment, since liquid crystal molecules 107 in one pixel can be provided with a plurality of pre-tilt angles, the single pixel has a plurality of T-V characteristics. This makes it possible to improve chromatic characteristics when viewed in an oblique direction.

The invention is not limited to the above-described modes for carrying out the same and may be modified in various ways.

For example, although transmissive liquid crystal displays have been referred to as examples in the above-described mode for carrying out the invention, the invention is not limited to them and may be applied to other types of liquid crystal displays such as reflective types and transflective types.

Although liquid crystal displays having color filters on an opposite substrate 104 have been referred to as examples in the above-described modes for carrying out the invention, the invention is not limited to them and may be applied to liquid crystal displays having the so-called CF-on-TFT structure in which color filters are formed on a TFT substrate 102.

(Sixth Mode for Carrying Out the Invention)

The present mode for carrying out the invention relates to a liquid crystal display and, particularly, to a multi-domain vertical alignment (MVA) type liquid crystal display in which the direction of alignment of a liquid crystal at the time of application of a voltage is controlled such that it becomes a plurality of directions utilizing structures formed on the substrates. In the field of MVA type liquid crystal displays, it is desired to improve the stability of liquid crystal alignment without sacrificing ease of manufacture and display performance and to make improvements with respect to response characteristics and display defects.

Recently, liquid crystal displays have been put in a wide variety of applications by taking advantage of their features such as low profiles, light weights, drivability at low voltages and low power consumption.

However, liquid crystal panels are presently inferior to CRTs in display characteristics when viewed in an oblique direction or viewing angle characteristics. Therefore, there is a demand for liquid crystal panels having high viewing angle characteristics. A liquid crystal display has low viewing angle characteristics because an angle that a light beam incident upon the panel makes with liquid crystal molecules varies depending on the direction of incidence. Multi-domain vertical alignment (MVA) liquid crystal panels have been put in use as liquid crystal panels having high viewing angle characteristics, and a configuration of the same is disclosed in Japanese Patent Laid-Open No. JP-A-11-242225.

Figure 56:
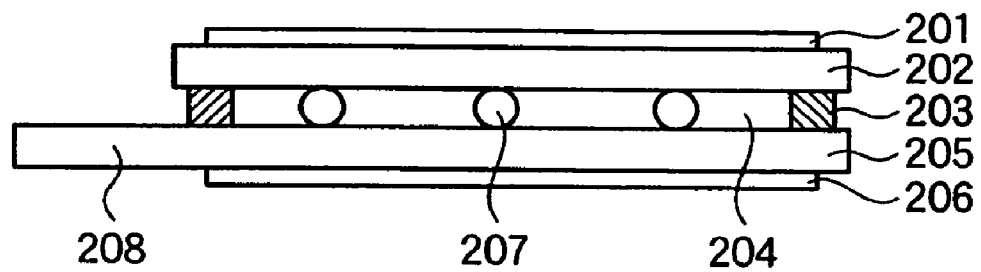
FIG. 56 shows a sectional shape of a liquid crystal display.

FIG. 56 shows an example of a sectional shape of a vertical alignment (VA) type liquid crystal display. The liquid crystal display is obtained by combining two glass substrates 202 and 205 with spacers 207 disposed between them to provide a predetermined thickness, sealing the substrates at the peripheries thereof with a seal material 203, and thereafter injecting a liquid crystal to form and enclose a liquid crystal layer 204 therein. Polarizers 201 and 206 are provided on both sides of the combined substrates 202 and 205. Further, a phase difference film may be provided. An electrode pattern for driving is formed on a surface of at least either of the two glass substrates 202 and 205 (the substrate 205 in this case), and drive signals are applied from the outside through terminals provided at the section indicated by reference number 208. Vertical alignment films are formed on electrodes on the glass substrates in an MVA type display.

Figure 57:
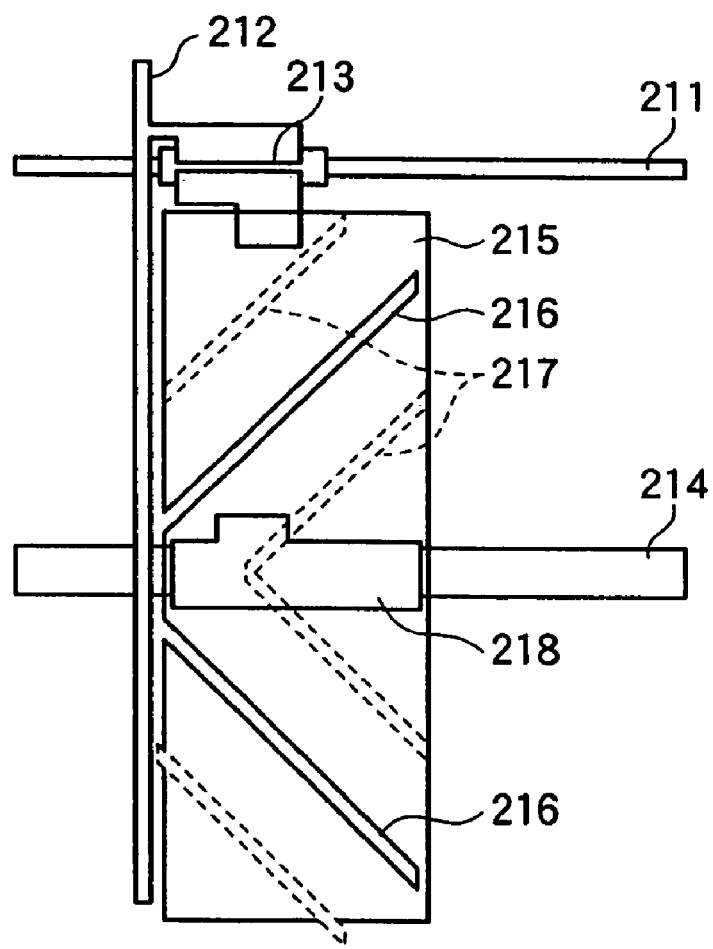
FIG. 57 shows an example of an electrode pattern of an MVA type liquid crystal display according to the related art.

FIG. 57 shows an example of an electrode pattern of an MVA type liquid crystal display. In TFT type liquid crystal displays that are presently the mainstream from the technical point of view, a plurality of gate bus lines 211 are provided in parallel with each other; a plurality of drain bus lines 212 are provided in parallel with each other in a direction perpendicular to the drain bus lines 211; pixel electrodes 215 are provided in regions partitioned by the gate bus lines 211 and the drain bus lines 212; and TFTs 213 for driving the pixel electrodes 215 are provided at intersections between the gate bus lines 211 and the drain bus lines 212. Further, Cs bus lines 214 are provided between the gate bus lines 211, and auxiliary capacitor electrodes 218 are provided in parts of the pixel electrodes 215 that overlap the bus lines 214.

Figure 58A:
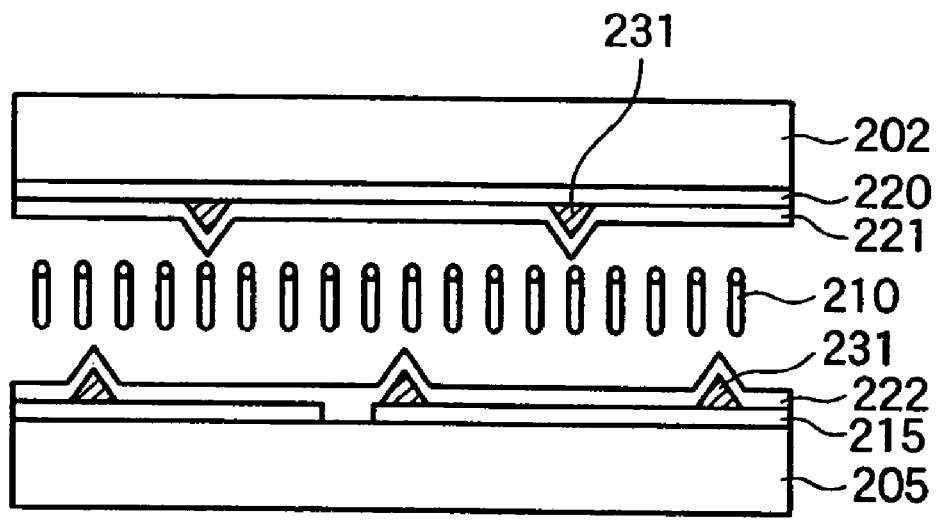
FIGS. 58A and 58B illustrate alignment control exercised by structures of an MVA type liquid crystal display.
Figure 58B:
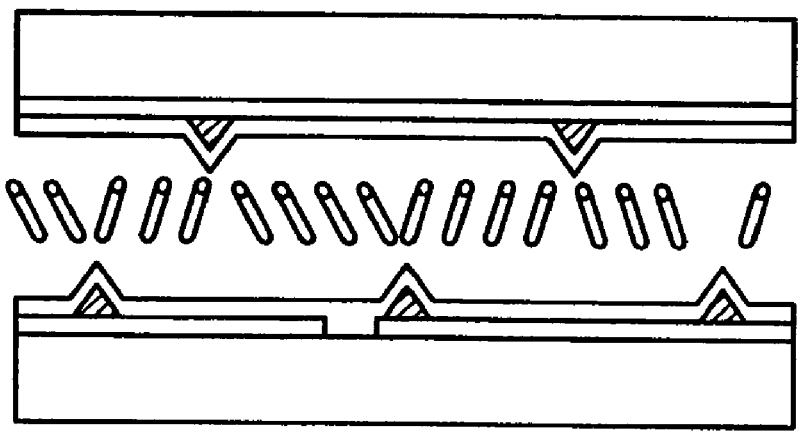

FIGS. 58A and 58B illustrate alignment control exercised by structures (protrusions (banks) on electrodes in this case) of an MVA type liquid crystal display. FIG. 58A shows a state in which no voltage is applied, and FIG. 58B shows a state in which a voltage is applied. As shown in FIG. 58A, a transparent opposite electrode 220 which spreads throughout a display surface is formed on a glass substrate 202. Protrusions 231 are formed on the electrodes, and a vertical alignment film 222 is formed on the same. Pixel electrodes 215 are formed on a glass substrate 205. Protrusions 231 are formed on the electrodes, and a vertical alignment film 222 is further formed on the same.

As shown in FIG. 58A, in the no voltage applied state, i.e., when no voltage is applied between the pixel electrodes 215 and the opposite electrode 220, liquid crystal molecules 210 are aligned substantially perpendicularly to the substrates 202 and 205. However, the liquid crystal molecules are aligned at a slight inclination in the vicinity of the protrusions 231 under the influence of inclined surfaces of the protrusions. As shown in FIG. 58B, when a voltage is applied between the pixel electrodes 215 and the opposite electrode 220, the liquid crystal molecules 210 are tilted by an electric field. Although the tilting direction (alignment direction) is not regulated by simply applying the voltage, the liquid crystal molecules 210 in the vicinity of the protrusions 231 are tilted toward a direction perpendicular to the surfaces of the protrusions 231 when no voltage is applied as described above, and neighboring liquid crystal molecules are therefore aligned according to those pre-tilted liquid crystal molecules. That is, there are different alignment directions originating in the protrusions 231 that serve as boundaries. Since the an alignment direction originating in a protrusion on the glass substrate 202 is the same as an alignment direction originating in a protrusion on the glass substrate 205 adjacent to the protrusion on the substrate 202, a stable state of alignment is established between the protrusions on the two glass substrates adjacent to each other. Such a technique for forming areas having different directions of alignment of a liquid crystal is referred to as "domain division technique", and an area in which liquid crystal molecules are aligned in the same direction is referred to as "domain".

While FIGS. 58A and 58B show an example in which protrusions that are dielectric bodies provided on electrodes are used as structures for alignment controlling, it is possible to use electrode slits provided by removing parts of electrodes in a display area or recesses on dielectric layers provided on the electrodes as structures for alignment control on the electrodes.

Figure 59:
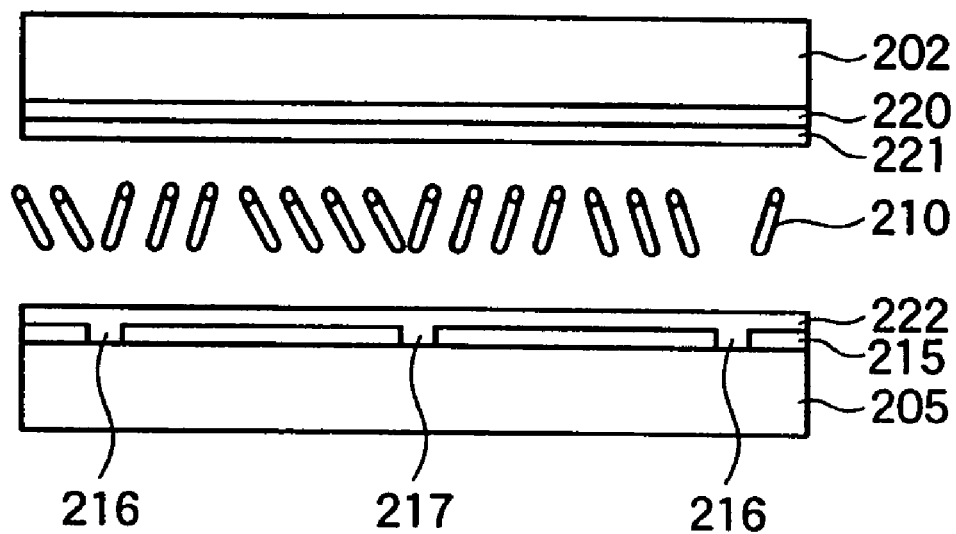
FIG. 59 shows another example of structures (electrode slits)

FIG. 59 shows an example in which electrode slits 216 provided on a pixel electrode 215 are used as structures for alignment control. As illustrated, the electrode slits 216 and an a region 217 between pixel electrodes 215 adjacent to each other serve as structures for alignment control to divide the alignment direction of liquid crystal molecules.

In the electrode pattern in FIG. 57, the pixel electrode slits 216 and the protrusions 217 provided on the opposite substrate are alternately disposed in parallel with each other, and the extending directions of the pixel electrode slits 216 and the protrusions 217 in the upper and lower halves of the pixel are 90° different from each other. As a result, the single pixel region is divided into areas in which the liquid crystal is inclined in respective four directions, i.e., four domains. When four domains are formed in one pixel region as thus described, viewing angle biases can be averaged compared to those in a case where the liquid crystal is inclined only in one direction, which allows a significant improvement of viewing angle characteristics.

Domain dividing structures may be provided on both substrates or on either substrate. Although the protrusions in FIGS. 58A and 58B are formed on both of substrates by way of example, they may be provided only on either of the substrates. Similarly, although the electrode slits in FIG. 59 are provided on either of the substrates, they may be provided on both of the substrates. Further, both of electrode slits and protrusions may be provided as shown in FIG. 57.

Figure 60:
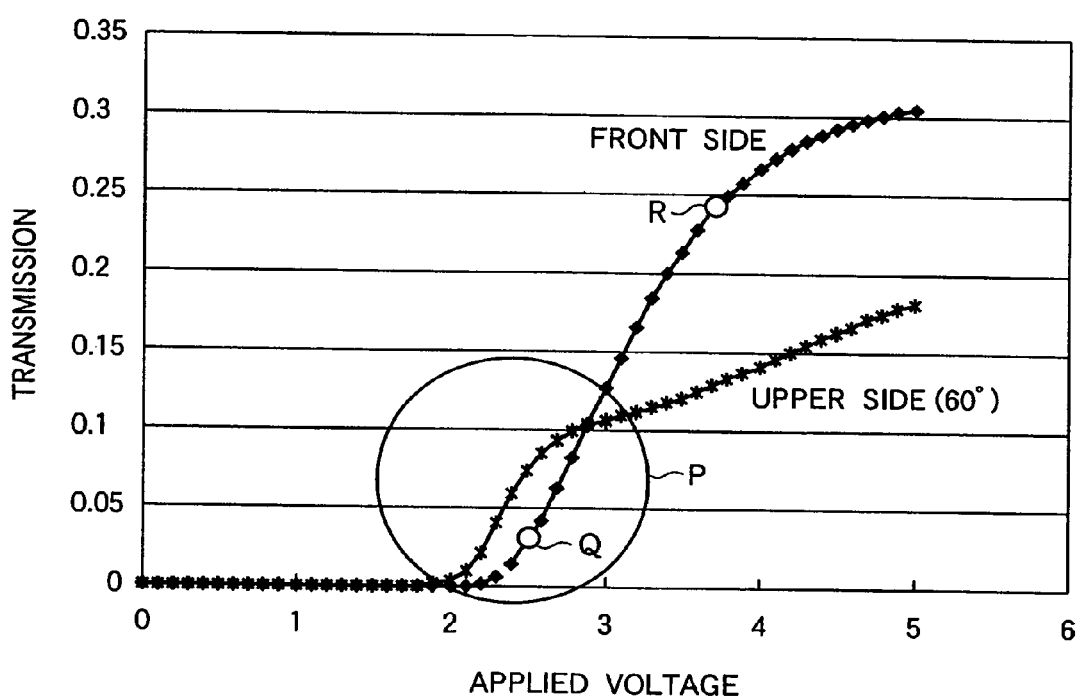
FIG. 60 shows a difference in applied voltage/transmittance (T-V) characteristics of an MVA type liquid crystal display according to the related art depending on the viewing angle.

FIG. 60 shows results of measurement of applied voltage/transmittance characteristics (T-V characteristics) of an MVA type liquid crystal display taken from a direction square to the display and a direction at an upward angle of 60° from the same. There is a problem in that a distortion in luminance transition occurs in the portion indicated by the circle P in the figure. For example, the point having a relatively low luminance which is indicated by Q in the graph representing the view in the square direction becomes brighter at the upward angle of 60°. On the contrary, the point having a relatively high luminance indicated by R becomes darker. As a result, the difference in luminance between those points disappears in the view in the oblique direction. This phenomenon most significantly appears as changes in colors. The color of an image discolors into a whitish tint when viewed in an oblique direction. An examination of gradation histograms of three colors, R, G and B of the image indicates that the image becomes whitish because the distribution of red having a relatively high brightness changes darker, and green and blue which are originally dark become brighter. The phenomenon is herein referred to as whitish discoloration.

Figure 61:
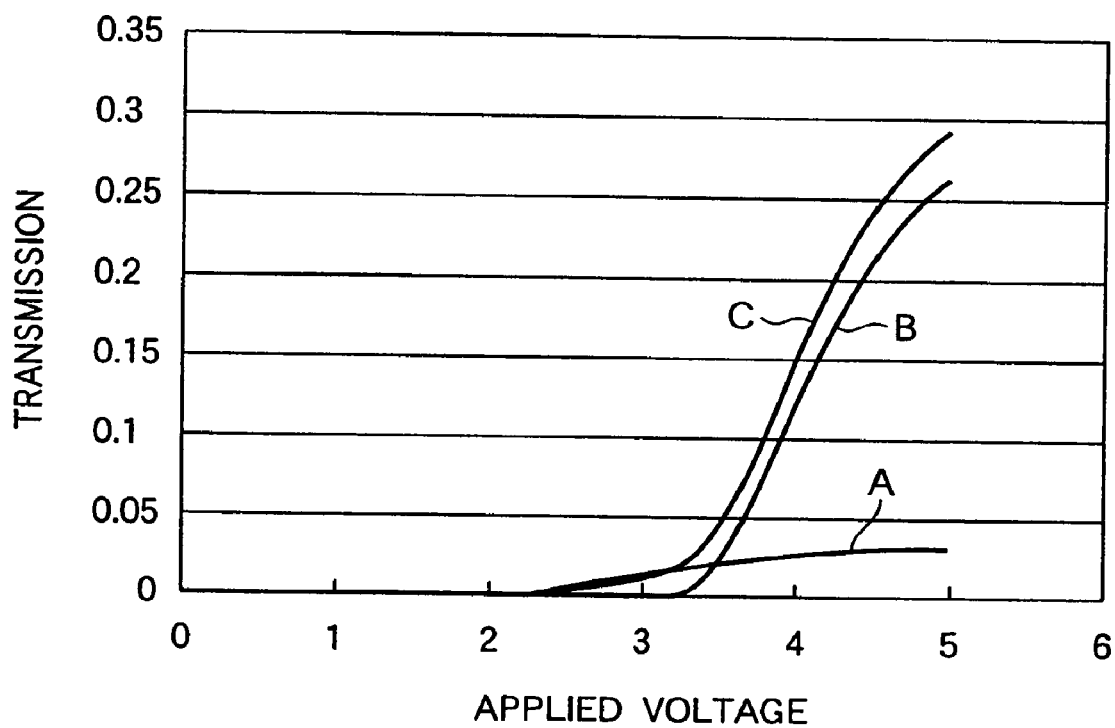
FIG. 61 illustrates the principle of an HT method for improving viewing angle characteristics by providing parts having different threshold voltages in one pixel.

As an approach for mitigation of the whitish discoloration, a method is known in which one pixel is formed by a plurality of sub-pixels and in which all sub-pixels are capacitively coupled in terms of electrical relationship. When a voltage is applied through a transistor, since the potential is divided according to the capacitance ratio between the sub-pixels, a different voltage is applied to each of the sub-pixels to provide the sub-pixels with different T-V characteristics. As a result, as shown in FIG. 61, transmittance at bright pixels starts increasing at relatively low applied voltages, and transmittance at darker pixels starts increasing at higher applied voltages. By setting the ratio between the brighter pixels and darker pixels appropriately, the brighter pixels will have transmittance characteristics indicated by A; the darker pixels will have transmittance characteristics indicated by B; and composite transmittance characteristics C will be provided by the pixels as a whole. Since a characteristics distortion is thus distributed among the plurality of sub-pixels, the distortion becomes less perceptible. Such a method is referred to as "HT (halftone/grayscale) method utilizing capacitive coupling".

However, the HT method utilizing capacitive coupling has a problem in that it involves a very complicated structure which is liable to cause defects and difficult to manufacture and in that it results in a significant reduction of an aperture ratio.

The HT method utilizing capacitive coupling is also problematic in that it involves a high driving voltage. This is because a voltage loss is caused by capacitive coupling, and the driving voltage increases with the number of divisions. An increase in the driving voltage necessitates a driver IC having a higher withstand voltage, which is disadvantageous in terms of cost.

Further, according to the HT method utilizing capacitive coupling, characteristics are digitally synthesized because a potential difference is provided from sub-pixel to sub-pixel. This results in a problem that the method provides characteristics lower than an ideal state in which a change occurs in a linear manner with a slope.

Since the HT method utilizing capacitive coupling has so significant problems as thus described although it is effective, no product is currently being manufactured by employing the method.

It is an object of the present mode for carrying out the invention to implement the HT method using a simpler configuration in an MVA type liquid crystal display.

In the present mode for carrying out the invention, attention is paid to the fact that a threshold voltage of an MVA type liquid crystal display varies depending on the density of structures used therein, and the HT method is implemented by varying the threshold voltage in one pixel region by varying the density of structures in the pixel. In an MVA type liquid crystal display, structures as alignment control units are used, and the density of the structures can be varied by changing the pattern of the structures. It is therefore possible to vary the density of the structures easily without, for example, increasing manufacturing steps, and the HT method can be thus implemented by varying the threshold voltage locally.

Figure 62A:
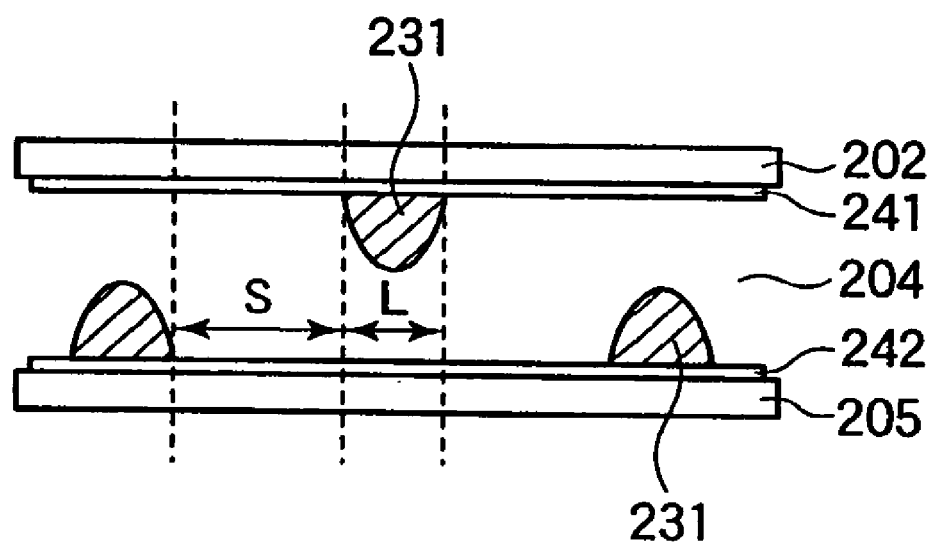
FIGS. 62A and 62B illustrate a definition of the disposing density of structures (protrusions)
Figure 62B:
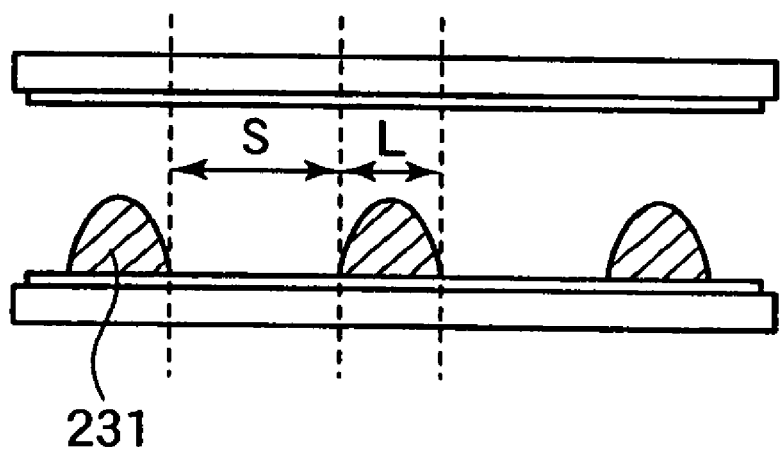

FIGS. 62A and 62B illustrate disposing densities of protrusions used as alignment controlling structures. FIG. 62A shows a case in which protrusions 231 each extending in one direction are alternately provided on electrodes 241 and 242 on two substrates 202 and 205. Although not shown, vertical alignment films are formed on the electrodes and protrusions. The width of the protrusions 231 is represented by L, and an interval between adjoining protrusions 231 is represented by S. FIG. 62B shows a case in which protrusions 231 extending in one direction are provided only on an electrode on one of substrates. In this case again, a vertical alignment film is formed on the electrode and the protrusions. The width of the protrusions 231 is represented by L, and an interval between adjoining protrusions 231 is represented by S.

Figure 63:
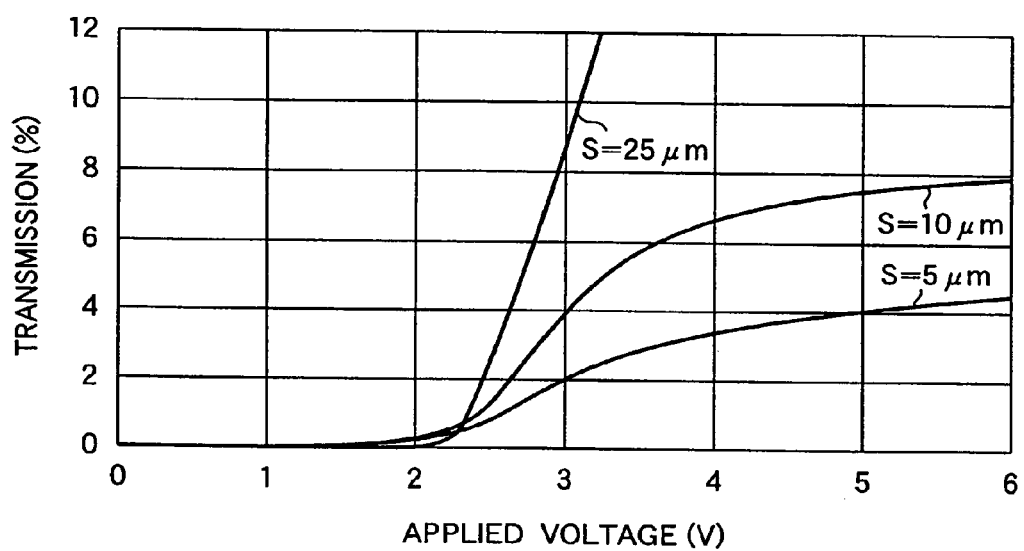
FIG. 63 shows a difference in T-V characteristics attributable to intervals between protrusions in a configuration in which the protrusions are disposed on both substrates.

FIG. 63 shows T-V characteristics of an MVA type liquid crystal display having protrusions as shown in FIG. 62A as alignment controlling structures, obtained while varying the interval S between adjoining protrusions. In this apparatus, the thickness (cell thickness) of the liquid crystal layer was 4 µm; the height of the protrusions (banks) was 1.5 µm; the width L of the protrusions was 5 µm a negative liquid crystal manufactured by Merck was used as the liquid crystal; and vertical alignment films manufactured by JSR Corporation were used as alignment films.

Figure 64:
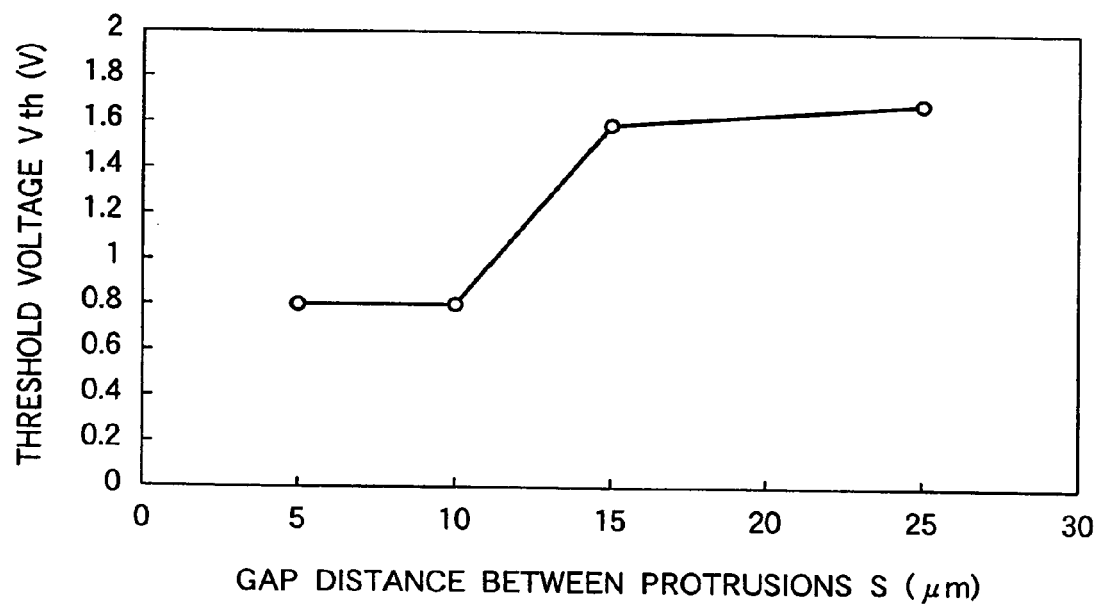
FIG. 64 shows changes in a threshold voltage attributable to intervals between protrusions.

FIG. 64 shows changes in a threshold voltage relative to the interval S between the adjoining protrusions. FIGS. 63 and 64 indicate that when the interval S between the adjoining protrusions is decreased below 10 µm, the threshold voltage is decreased by 0.5 V to 1 V from values at intervals S in the range from 15 to 25 µm. That is, the threshold voltage decreases when the interval S between the adjoining protrusions is about three times the cell thickness or less.

Figure 65A:
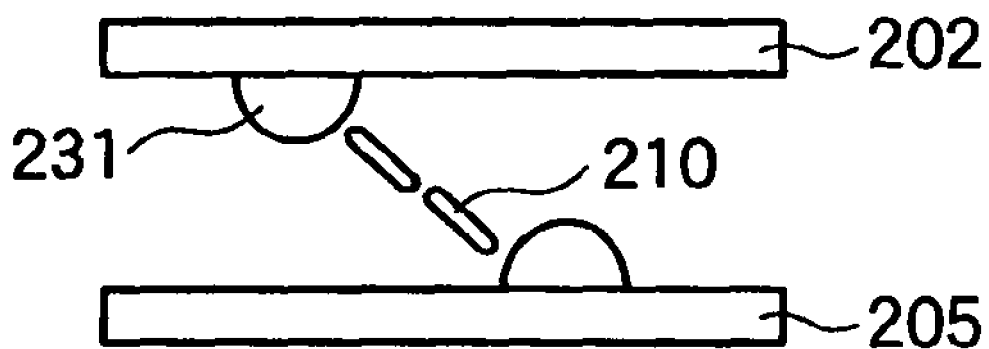
FIGS. 65A and 65B illustrate different aligning operations that depend on intervals between protrusions.
Figure 65B:
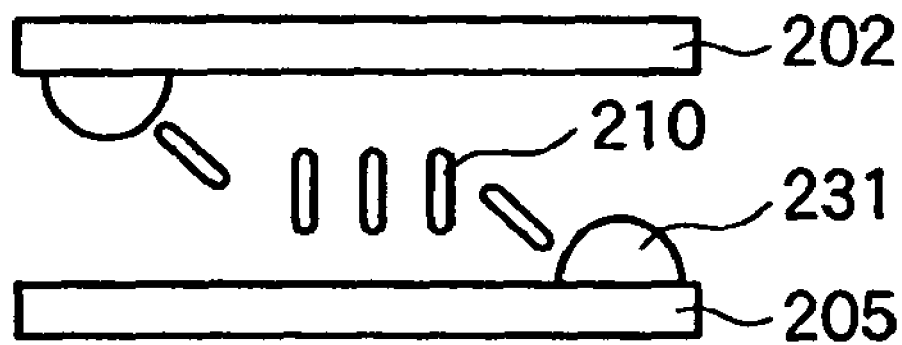

FIGS. 65A and 65B illustrate the reason of this. As shown in FIG. 65A, when the interval S is small, liquid crystal molecules 210 between the adjoining protrusions 231 are tilted (pre-tilted) even when no voltage is applied. Thus, the liquid crystal molecules 210 can be tilted at a lower voltage. As shown in FIG. 65B, when the interval S is greater than the above-described condition, the liquid crystal molecules 210 between the adjoining protrusions 231 are less susceptible to the influence of the protrusions and are aligned substantially perpendicularly to the substrate surfaces when no voltage is applied. The vertically aligned area is unlikely to be tilted because the longitudinal direction of the liquid crystal molecules is in parallel with the direction of an electric field, and no reduction of the threshold therefore occurs. This results in an operation similar to that in an ordinary MVA type liquid crystal display in which tilting is triggered by a pre-tilt of the liquid crystal in the vicinity of protrusions.

Figure 66:
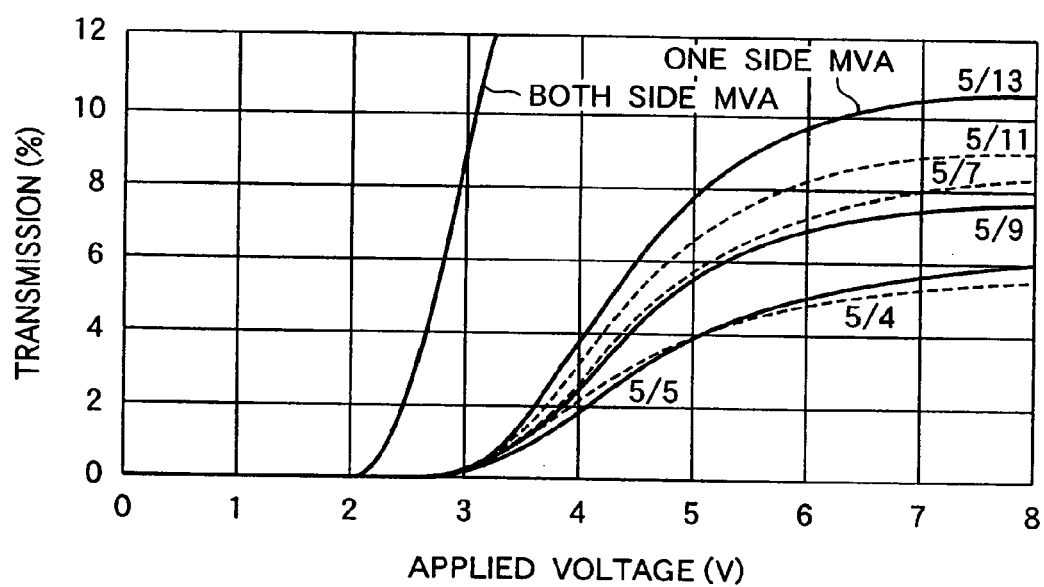
FIG. 66 shows a difference in T-V characteristics attributable to intervals between protrusions in a configuration in which the protrusions are disposed on one substrate.

FIG. 66 shows T-V characteristics of an MVA type liquid crystal display having protrusions as shown in FIG. 62B as alignment controlling structures, obtained while varying the interval S between adjoining protrusions. The condition of this apparatus was otherwise similar to that in FIG. 63. The thickness (cell thickness) of the liquid crystal layer was 4 µm; the height of the protrusions (banks) was 1.5 µm; the width L of the protrusions was 5 µm; MJ961213 was used as the liquid crystal; and JALS-684 was used as the alignment film.

FIG. 66 indicates that when the protrusions (banks) are provided only on one of the substrates, a reduction in the interval S between the protrusions results in a threshold voltage 0.8 V higher than the threshold voltage of an MVA according to the related art in which upper and lower protrusions are provided at a greater interval.

Figure 67C:
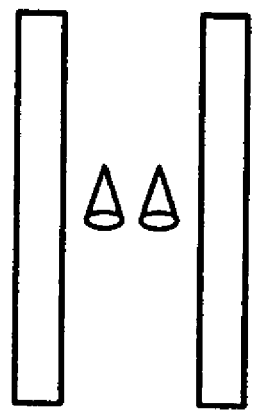
FIGS. 67A to 67C illustrate behaviors of liquid crystal molecules in an area in which an interval between protrusions is small.
Figure 67B:
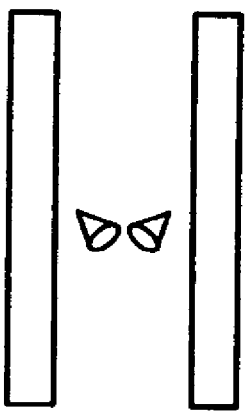
Figure 67A:
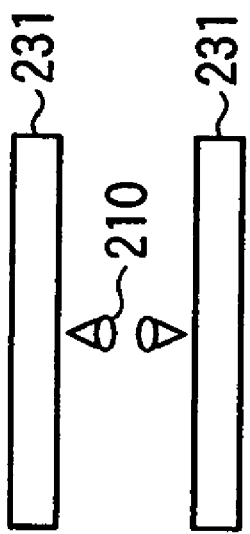

FIGS. 67A to 67C illustrate behaviors of a liquid crystal in a case wherein protrusions (banks) are provided only on one substrate in a high density. In this case, liquid crystal molecules behave according to a principle completely different from that of the behaviors of liquid crystal molecules described with reference to FIGS. 65A and 65B. As shown in FIG. 67A, liquid crystal molecules 210 are very slightly tilted at an orientation perpendicular to protrusions (banks) 231 when a small voltage is applied. This is considered attributable to the fact that they cannot be sufficiently tilted because the adjacent protrusions 231 are located very close to each other although the orientations of their tilts relative to the adjacent protrusions are 180° different. Therefore, substantially no light is transmitted. When the applied voltage is increased in this state, although the liquid crystal molecules 210 are tilted further, they cannot be tilted in the directions of the 180° different alignment orientations because the adjacent protrusions 231 are located very close. As a result, as shown in FIG. 67B, the orientations of the tilts of the liquid crystal gradually change from the directions at 90° to the direction in which the protrusions extend, and the alignment orientations become inclined relative to the extending direction of the protrusions. The liquid crystal molecules cannot be sufficiently tilted still in this state. When the applied voltage is further increased, the alignment orientations become parallel to the extending direction of the protrusions as shown in FIG. 67C. The liquid crystal molecules can be sufficiently tilted in this state. It is considered that the liquid crystal molecules are difficult to tilt with a low applied voltage because their alignment is oppositely oriented by the adjacent protrusions as thus described and that the threshold voltage is consequently increased.

As described above, a threshold voltage can be reduced by about 0.5 V to 1 V by providing protrusions on both substrates as shown in FIG. 62A and by setting the interval S between the protrusions equal to or smaller than about three times the cell thickness, and the threshold voltage can be increased by about 0.8 V by providing protrusions only on one substrate as shown in FIG. 62B and setting the interval S between the protrusions smaller. Therefore, viewing angle characteristics can be improved using the HT method by disposing protrusions as shown in FIGS. 62A and 62B to provide a first area having a high threshold voltage and a second area having a low threshold voltage in one pixel region.

The first area and the second area may be provided on either or both of first and second substrates. When only either of the first and second substrates has the first area and the second area, no structure to be used as an alignment controlling unit is provided on the other substrate or, if provided, linear structures are provided in a face-to-face relationship with the second area on the substrate.

When the first area and the second area are provided on both of the first and second substrates, they are disposed such that the first area on the first substrate faces the second area on the second substrate and the first area on the second substrate faces the second area on the first substrate.

A plurality of linear structures provided in the first area and a plurality of linear structures provided in the second area may be substantially in parallel with each other, and they may alternatively extend in directions orthogonal to each other.

The structures may be provided as protrusions protruding into the liquid crystal layer, recesses which are sunk oppositely to the liquid crystal layer or electrode slits which are local blanks in electrodes in a display area. It is desirable for any of the structures that at least any of the width, the pitch of arrangement and the electrical resistance of the structures is varied between the first and second areas to achieve desired threshold voltage characteristics.

<Embodiment 6-1>

An MVA type liquid crystal display of the present embodiment is similar in configuration to MVA type liquid crystal displays according to the related art except for the pattern of protrusions (banks) used as alignment regulating structures. Various exemplary patterns may be employed for protrusions (banks) of the MVA type liquid crystal display of the present embodiment.

Figure 68A:
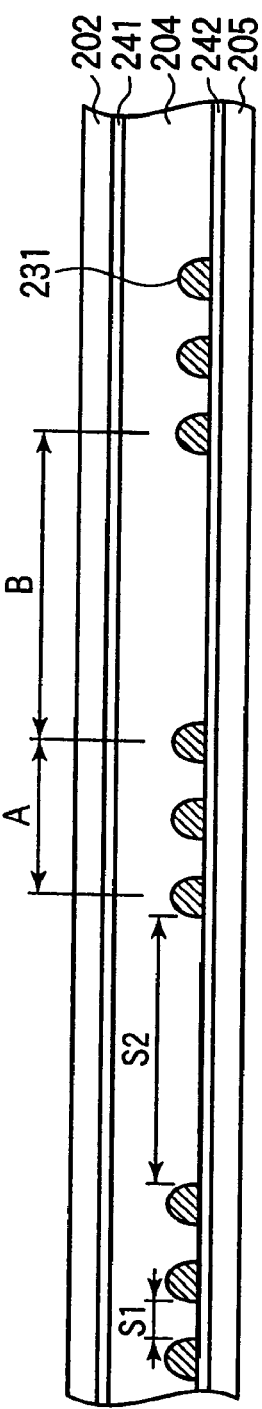
FIGS. 68A to 68C show examples of disposition of protrusions according to Embodiment 6-1 in a sixth mode for carrying out the invention.
Figure 68B:
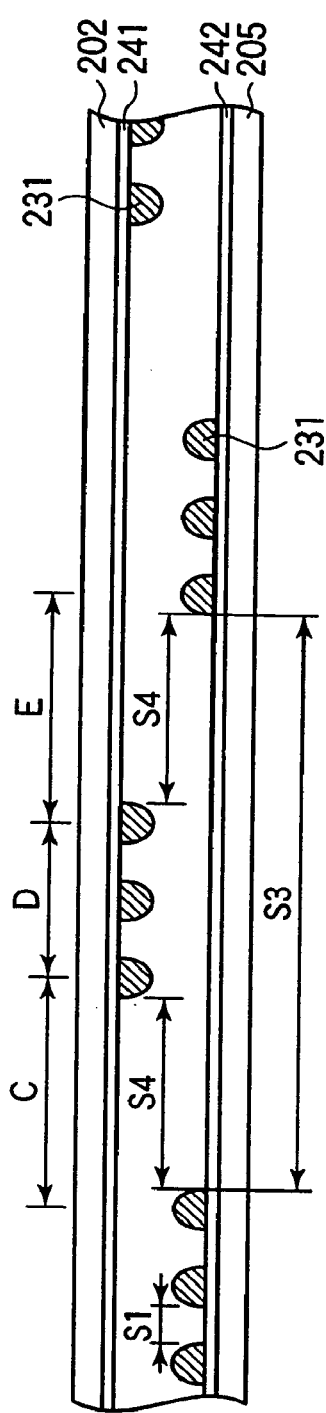
Figure 68C:
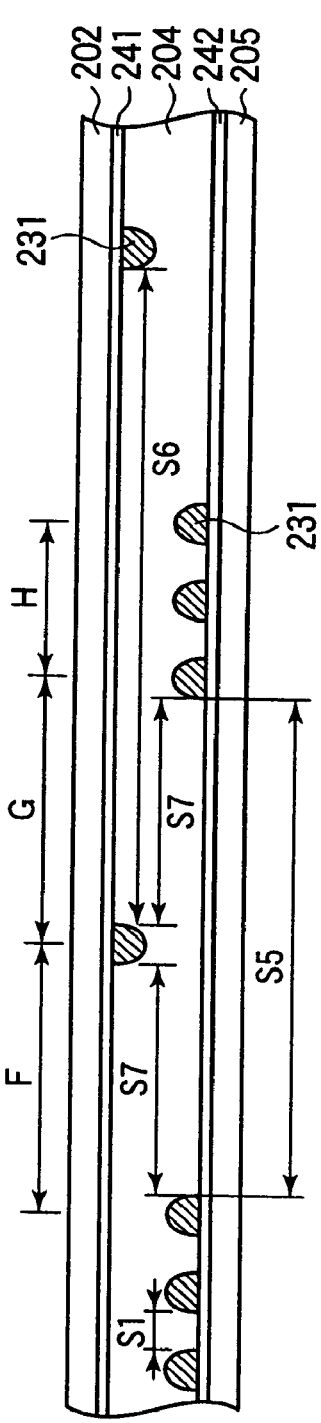

FIGS. 68A to 68C show sections of patterns for the protrusions (banks) of the MVA type liquid crystal display of the present embodiment. FIGS. 69A and 69B show plan configurations of patterns for the protrusions (banks) of the MVA type liquid crystal display of the present embodiment. As shown in FIGS. 68A to 69B, in the present embodiment, a plurality of protrusions (banks) 231 extend in the same direction in parallel with each other.

In the example shown in FIG. 68A, protrusions 231 are provided only on an electrode 242 on one substrate 205. As illustrated, three protrusions 231 disposed close to each other at intervals S1 are grouped, and resultant groups are disposed at greater intervals S2. The protrusions have a width of 3 μm, and the interval S1 is, for example, 3 μm, and the interval S2 is, for example, 30 μm. A threshold voltage is high in an area A in which the protrusions are disposed close to each other, and a threshold voltage in an area B in which intervals between adjoining protrusions are greater is lower than the threshold voltage in the area A. In the area B, since alignment orientations exerted by the protrusions on both sides are 180° different from each other, a domain boundary is formed in the middle. Since the position of the domain boundary cannot be controlled, this example has a problem in that domain sizes are unstable.

In the example shown in FIG. 68B, three protrusions 231 disposed close to each other at intervals S1 on each of electrodes 241 and 242 on two substrates 202 and 205 are grouped; resultant groups are disposed at greater intervals S3; and groups each comprising three protrusions 231 provided on the upper and lower substrates adjacent to each other are disposed such that they are at equal intervals S4. For example, the interval S1 is 3 μm, and the interval S4 is 25 μm. A threshold voltage is high in an area D in which the protrusions are disposed close to each other, and a threshold voltage in areas C and E in which intervals between adjoining protrusions are greater is lower than the threshold voltage in the area D. A stable domain can be formed in one direction in the areas C and E, and alignment orientations in the areas C and D are 180° different from each other. The interval S4 is set at 10 μm or less to make a threshold voltage difference between the areas C and E smaller.

In the example shown in FIG. 68C, three protrusions 231 disposed close to each other at intervals S1 on an electrode 242 on one substrate 205 are grouped, and resultant groups are disposed at greater intervals S5. Individual protrusions 231 are formed at still greater intervals S6 on an electrode 241 on another substrate 202, and protrusions 231 on the upper and lower substrates adjacent to each other are disposed such that they are at equal intervals S7. For example, the interval S1 is 3 μm, and the interval S7 is 25 μm. A threshold voltage is high in an area H in which the protrusions are disposed close to each other, and a threshold voltage in areas F and G in which intervals between adjoining protrusions are greater is lower than the threshold voltage in the area H. A stable domain can be formed in one direction in the areas F and G, and alignment orientations in the areas F and G are 180° different from each other. Also in this case, the interval S7 is set at 10 μm or less to make a threshold voltage difference between the areas F and G smaller.

FIGS. 69A and 69B illustrate examples of plan configurations of patterns for the protrusions of the present embodiment. FIG. 69A shows an example in which protrusions (banks) extend in parallel with shorter sides of a rectangular pixel electrode 215, FIG. 69A corresponding to the sectional configuration shown in FIG. 68A or 68B. In a case as shown in FIG. 68A, groups of protrusions 231A and groups of protrusions 231B are both disposed on one substrate. In a case as shown in FIG. 68B, groups of protrusions 231A are disposed on one substrate, and groups of protrusions 231B are disposed on another substrate. When either of the groups of protrusions 231A and the groups of protrusions 231B is replaced with individual protrusions (banks), the example corresponds to the example shown in FIG. 68C. A threshold voltage is high in the area of each group in which three protrusions are provided close to each other, and the threshold voltage is lower in an area in which adjacent protrusions belonging to different groups are at a greater interval.

FIG. 69B shows an example similar to the example in FIG. 57, in which protrusions (banks) extending in directions at 45° and −45° to a side of a rectangular pixel electrode 215 are present in a pixel region. Three parallel protrusions (banks) 231A close to each other and one protrusion 231C are provided on one substrate, and a protrusion 231B is provided on another substrate. A threshold voltage is high in the area of the group of the protrusions 231A in which the three protrusions are provided close to each other, and the threshold voltage is lower in the area between the group of the protrusions 231A and the protrusion 231B and in the area between the protrusions 231B and 231C. The pattern of the protrusions shown as a plan view in FIG. 69B may be provided using protrusions having a sectional configuration as shown in FIG. 68A, 68B or 68C.

Examples of sectional configurations and plan configurations of patterns of protrusions according to the present embodiment have been described with reference to FIGS. 68A to 69B, and various modifications may be made to the sectional configurations and plan configurations of patterns of protrusions according to the present embodiment.

Figure 70:
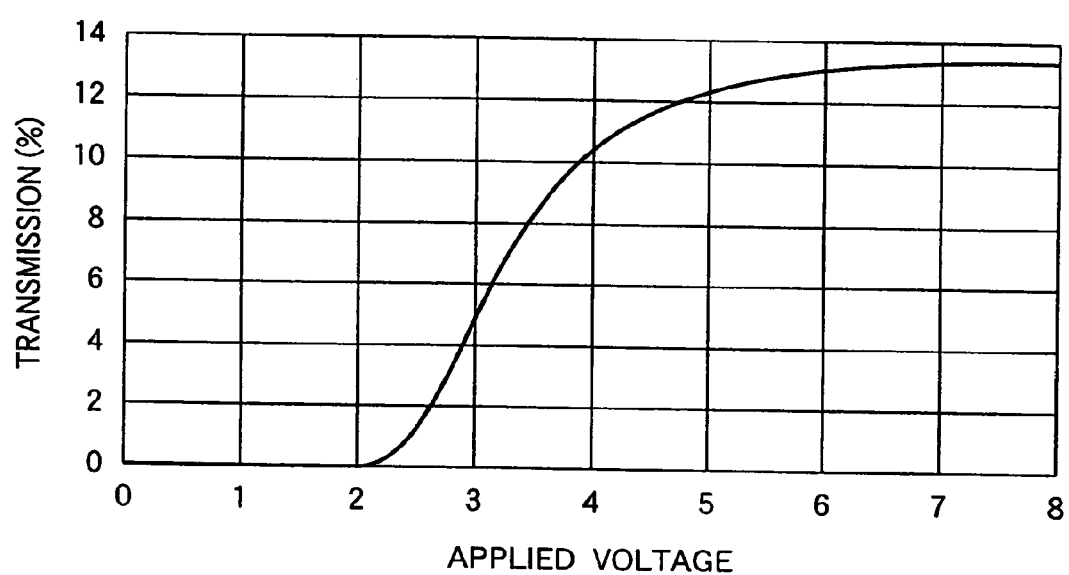
FIG. 70 shows T-V characteristics of Embodiment 6-1 in the sixth mode for carrying out the invention.

FIG. 70 shows values of T-V characteristics actually measured on a display having a sectional configuration as shown in FIG. 68B, a cell thickness of 4 μm, a protrusion width of 3 μm, a protrusion height of 1.5 μm, protrusion intervals S1 of 3 μm and protrusion intervals S4 of 25 μm. A negative liquid crystal manufactured by Merck was used as the liquid crystal; vertical alignment films manufactured by JSR Corporation were used as the alignment films; and areas D having a high threshold voltage occupied 48% of the entire measured region in terms of area ratio. The result was in preferable agreement with simulation values calculated using the graphs shown in FIGS. 63 and 66.

<Embodiment 6-2>

Figure 71:
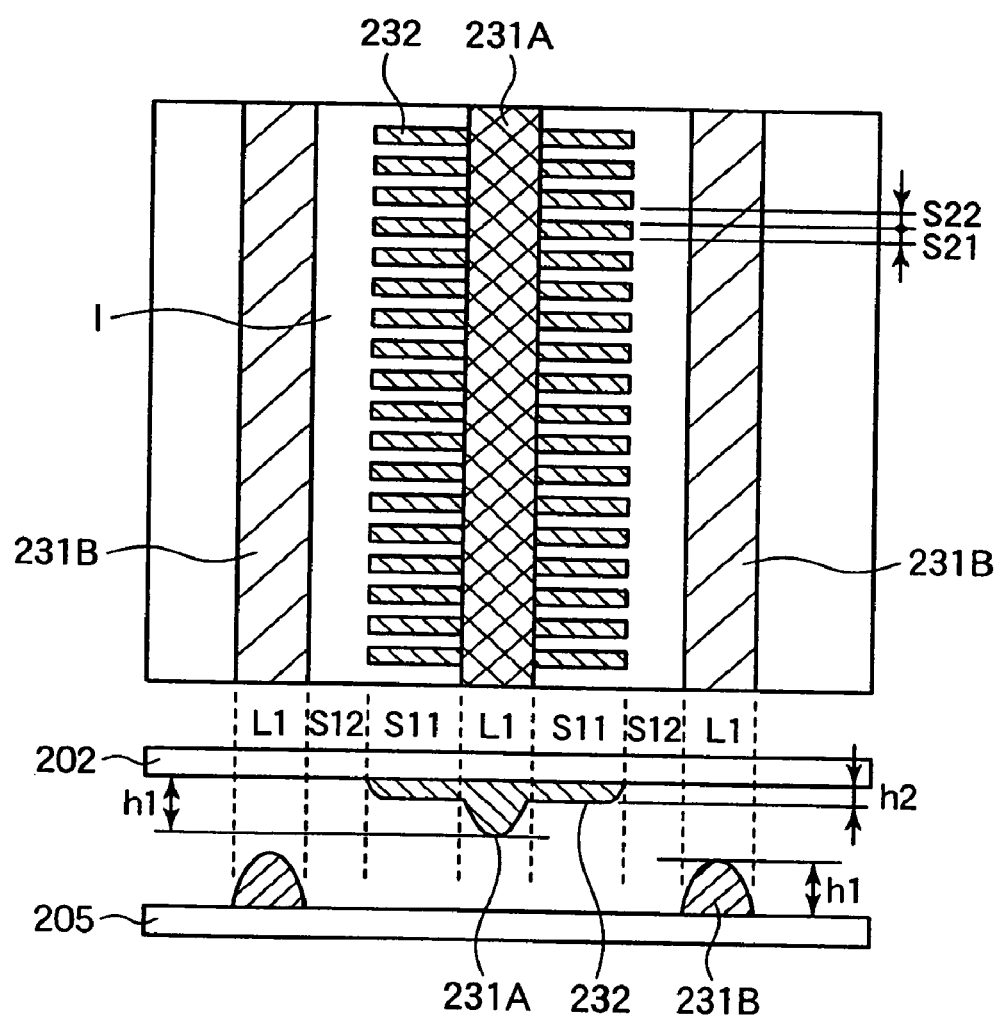
FIG. 71 shows configurations and patterns of protrusions according to Embodiment 6-2 in the sixth mode for carrying out the invention.

FIG. 71 shows a section of a pattern of protrusions (banks) of an MVA type liquid crystal display according to Embodiment 6-2. In the present embodiment, protrusions (banks) 231A and 231B having a width L1 extending in a first direction are alternately provided on substrates 202 and 205 at great intervals S11+S12, and protrusions 232 having a width S21 extending in a second direction that is perpendicular to the first direction are provided on both sides of protrusions 231A on the substrate 202 at small intervals S22. The height of the protrusions 231A and 231B is represented by h1, and the height and length of the protrusions 232 are represented by h2 and S11, respectively. For example, the cell thickness is 4 μm; L1 is 10 μm; S11 is 5 μm; S12 is 20 μm; h1 is 1.5 μm; and h2 is 0.5 μm.

In the apparatus of the present embodiment, since the height of the protrusions 232 was small, a threshold voltage in areas in a face-to-face relationship with the protrusions 232 was lower than a normal threshold voltage in areas I between the protrusions just as seen in the area between the protrusions in FIG. 62A. In this case, therefore, an operation according to the HT method took place between the areas having the normal threshold voltage and the areas having the threshold voltage lower than the same.

On the contrary, the threshold voltage in the area in a face-to-face relationship with the protrusions 232 increased beyond the threshold voltage in the areas I when h2 was set equal to h1 or 1.5 µm. In this case, an operation according to the HT method took place between the areas having the normal threshold voltage and the areas having the threshold voltage higher than the same.

When the height h2 was tapered in the direction away from the protrusions 231A, the threshold voltage in the areas in a face-to-face relationship with the protrusions 232 was slightly decreased.

While the above embodiment was described on an assumption that the alignment controlling structures were protrusions constituted by dielectric bodies on electrodes, it is possible to use electrode slits 216 which are local blanks in electrodes in a display area as shown in FIG. 57A instead of the protrusions constituted by dielectric bodies.

Figure 72:
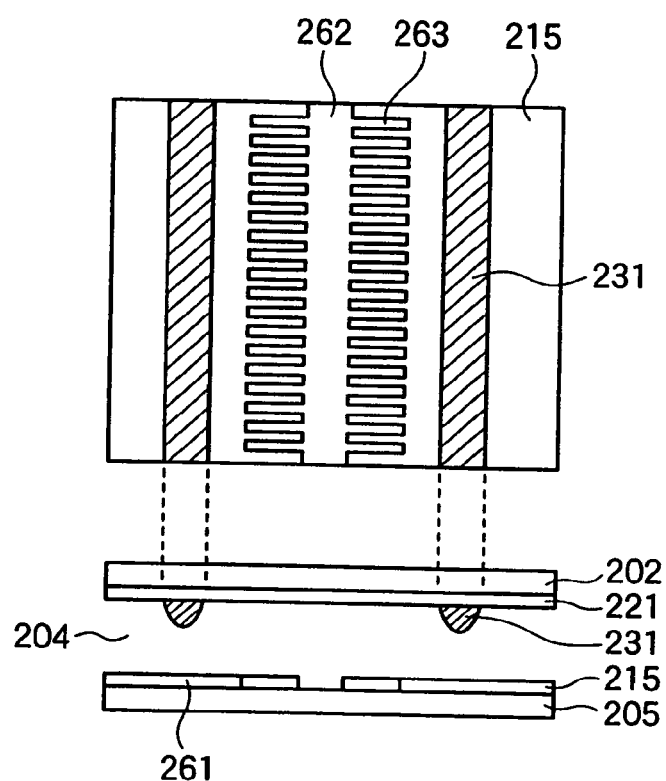
FIG. 72 shows configurations and patterns of other structures according to Embodiment 6-2 in the sixth mode for carrying out the invention.

FIG. 72 shows a modification of Embodiment 6-2. The present modification is configured by replacing the protrusions 231A and 232 in the configuration of Embodiment 6-2 in FIG. 72 with an electrode slit 262 which is provided on a pixel electrode 215 on a TFT substrate 205 and fine slits 263 having a pattern corresponding to the protrusions 232 provided on both sides of the electrode slit 262 as illustrated. Protrusions 231 corresponding to the protrusions 231B are provided on a CF substrate 202. As a result, effects similar to those of Embodiment 6-2 are achieved. However, the amounts of changes in the threshold voltage caused by the structures are smaller than those in a case wherein protrusions constituted by dielectric bodies are provided on electrodes as in Embodiment 6-2.

Figure 73:
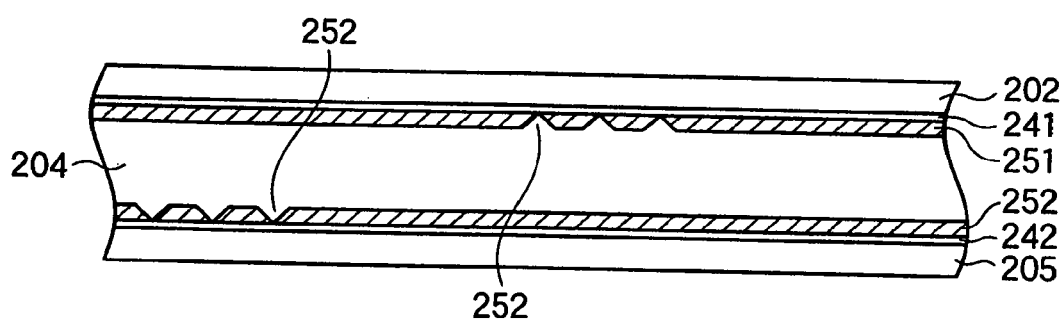
FIG. 73 shows another example of structures (recesses).

As shown in FIG. 73, it is also possible to use recesses 252 that are depressed parts of dielectric layers 251 and 252 provided on electrodes 241 and 242 on substrates 202 and 205, the recesses being sunk in directions opposite to a liquid crystal layer 204. However, the arrangement is less effective compared to protrusions constituted by dielectric bodies provided on the electrodes.

The invention is advantageous when applied to vertical alignment (VA) type displays and, in particular, multi-domain vertical alignment (MVA) type displays, and embodiments described above are applications of the invention to MVA type liquid crystal displays. However, the idea of allowing flexible control of T-V characteristics (gradation characteristics) using an area ratio between areas having structures therein can be applied to any type of liquid crystal display.

As described above, the present mode for carrying out the invention makes it possible to control T-V characteristics (gradation characteristics) freely by forming areas having different threshold voltages in one pixel. There is a little limitation on the ratio between the areas, and an arbitrary ratio can therefore be set easily. Desired characteristics can be achieved by making small changes in design values. Further, such a setting can be made with substantially no increase in manufacturing steps.

In the present mode for carrying out the invention, the viewing angle characteristics of a liquid crystal display can be improved to make them close to the characteristics of a CRT, and the range of application of a liquid crystal display is thus expanded.

What is claimed is:

1. A liquid crystal display comprising:
    a pair of substrates provided opposite to each other;
    a liquid crystal sealed between the pair of substrates;
    alignment regulating structures formed on at least one of the pair of substrates for regulating the alignment of the liquid crystal; and
    a plurality of pixel regions having both of a first area in which the alignment regulating structures are disposed at first intervals and which has a first threshold voltage for driving of the liquid crystal and a second area in which the alignment regulating structures are disposed at second intervals smaller than the first intervals and which has a second threshold voltage lower than the first threshold voltage,
    wherein each of the first intervals is a distance between adjacent alignment regulating structures along a direction parallel to one of the substrates in the first area and each of the second intervals is a distance between adjacent alignment regulating structures along a direction parallel to one of the substrates in the second area.

2. A liquid crystal display according to claim 1, wherein the liquid crystal is aligned in four directions in the second area of one pixel region, each of the directions being at a differential angle of about 90°.

3. A liquid crystal display according to claim 2, wherein the liquid crystal is substantially radially aligned in the second area.

4. A liquid crystal display according to claim 1, wherein the second intervals are 15 µm or less.

5. A liquid crystal display according to claim 1, wherein the alignment regulating structures are formed on both of the substrates, and the adjacent alignment regulating structures includes one alignment regulating structure on one of the pair of substrates and another alignment regulating structure on the other of the pair of substrates.

6. A liquid crystal display according to claim 1, further comprising:
    a pixel electrode on one of said substrates; and
    a common electrode on the other of said substrates,
    wherein, the distance between said pixel electrode and said common electrode in the first area is essentially the same as the distance between said pixel electrode and said common electrode in the second area.

7. A vertical alignment type liquid crystal display comprising a liquid crystal layer provided between a first substrate and a second substrate, liquid crystal molecules being aligned substantially perpendicularly to the first and second substrates when no voltage is applied, at least one of the first and second substrates having an alignment controlling unit for controlling the direction of alignment of the liquid crystal in the liquid crystal layer, wherein:
    the alignment controlling unit is a plurality of linear structures disposed in parallel with each other;
    at least one of the first and second substrates has a first area in which intervals between adjacent ones of the linear structures are small and a second area in which intervals between adjacent ones of the linear structures are greater than those in the first area; and
    a threshold voltage is high in a region of the liquid crystal layer facing the first area and is low in a region of the liquid crystal layer facing the second area, the liquid crystal molecules start tilting at the threshold voltage to cause the transmittance of the liquid crystal layer to change when a voltage is applied to the liquid crystal layer, wherein each of the first intervals is a distance between adjacent linear structures along a direction parallel to one of the substrates in the first area and each of the second intervals is a distance between adjacent linear structures along a direction parallel to one of the substrates in the second area.

8. A liquid crystal display according to claim 7, wherein only one of the first and second substrates has the first area and the second area, and the other has a linear structure provided opposite to the second area.

9. A liquid crystal display according to claim 7, wherein only one of the first and second substrates has the first area and the second area.

10. A liquid crystal display according to claim 7, wherein both of the first and second substrates have the first area and the second area and are disposed such that the first area on the first substrate faces the second area on the second substrate and such that the first area on the second substrate faces the second area on the first substrate.

11. A liquid crystal layer according to claim 7, wherein the plurality of linear structures disposed in parallel in the first area and the second area are substantially in parallel with each other.

12. A liquid crystal layer according to claim 7, wherein the plurality of linear structures disposed in parallel in the first area and the second area extend orthogonally to each other.

13. A liquid crystal display according to claim 7, wherein the structure is a protrusion protruding into the liquid crystal layer, a recess that is sunk oppositely to the liquid crystal layer or an electrode slit that is a local blank in an electrode in a display area.

14. A liquid crystal display according to claim 13, wherein the structure is protrusions protruding into the liquid crystal layer and wherein any of the width, the pitch of arrangement and the electrical resistance of the protrusions is different between the first area and the second area.

15. A liquid crystal display according to claim 13, wherein the structure is electrode slits that are local blanks in the electrode in the display area and wherein any of the width, the pitch of arrangement and the electrical resistance of the electrode slits is different between the first area and the second area.

16. A liquid crystal display according to claim 13, wherein the structure is recesses that are sunk oppositely to the liquid crystal layer and wherein any of the width, the pitch of arrangement and the electrical resistance of the recesses is different between the first area and the second area.

17. A liquid crystal display according to claim 7, wherein the alignment regulating structures are formed on both of the substrates, and the adjacent alignment regulating structures includes one alignment regulating structure on one of the pair of substrates and another alignment regulating structure on the other of the pair of substrates.

18. A liquid crystal display according to claim 7, further comprising:
a pixel electrode on one of said substrates; and
a common electrode on the other of said substrates,
wherein, the distance between said pixel electrode and said common electrode in the first area is essentially the same as the distance between said pixel electrode and said common electrode in the second area.

19. A vertical alignment type liquid crystal display comprising a liquid crystal layer provided between a first substrate and a second substrate, liquid crystal molecules being aligned substantially perpendicularly to the first and second substrates when no voltage is applied, the first substrate having an alignment controlling unit for controlling the direction of alignment of the liquid crystal in the liquid crystal layer, wherein:
the alignment controlling unit is a plurality of linear structures disposed in parallel with each other;
the first substrate has a first area in which intervals between adjacent ones of the linear structures are small and a second area in which intervals between adjacent ones of the linear structures are greater than those in the first area; and
a region of the liquid crystal layer facing the first area and a region of the liquid crystal layer facing the second area have different threshold voltages at which the liquid crystal molecules start tilting to cause the transmittance of the liquid crystal layer to change when a voltage is applied to the liquid crystal layer,
wherein each of the first intervals is a distance between adjacent linear structures along a direction parallel to the first substrate in the first area and each of the second intervals is a distance between adjacent linear structures along a direction parallel to the first substrate in the second area.

20. A liquid crystal display according to claim 19, further comprising:
a pixel electrode on one of said substrates; and
a common electrode on the other of said substrates,
wherein, the distance between said pixel electrode and said common electrode in the first area is essentially the same as the distance between said pixel electrode and said common electrode in the second area.

* * * * *